United States Patent [19]
Yamada et al.

[11] Patent Number: 5,712,948
[45] Date of Patent: Jan. 27, 1998

[54] MAGNETIC RECORDING AND REPRODUCING APPARATUS WHICH REPLACES AN INSERTED AUDIO SIGNAL WITH A PRECEDING FIELD OF A REPRODUCED FM VIDEO SIGNAL

[75] Inventors: Masako Yamada; Hideki Kaneko; Sadayuki Inoue; Ikuo Ohkuma, all of Kyoto, Japan

[73] Assignee: Mitsubishi Denki Kabushiki Kaisha, Tokyo, Japan

[21] Appl. No.: 396,430

[22] Filed: Feb. 28, 1995

Related U.S. Application Data

[62] Division of Ser. No. 802,741, Dec. 5, 1991, Pat. No. 5,432,649.

[30] Foreign Application Priority Data

| Dec. 6, 1990 | [JP] | Japan | 2-400690 |
| Apr. 10, 1991 | [JP] | Japan | 3-077705 |
| Jun. 26, 1991 | [JP] | Japan | 3-154287 |
| Sep. 26, 1991 | [JP] | Japan | 3-247243 |
| Sep. 26, 1991 | [JP] | Japan | 3-247244 |
| Oct. 14, 1991 | [JP] | Japan | 3-264325 |

[51] Int. Cl.[6] .............. H04N 5/92; H09N 5/928
[52] U.S. Cl. .............. 386/95; 386/96; 386/98; 386/100; 386/104
[58] Field of Search .............. 358/310, 335, 358/342, 341, 343, 311; 360/33.1, 35.1, 18, 19.1, 20, 21; 386/1, 21, 29, 39, 40, 45, 54, 75, 95–108, 113, 125–126; H04N 5/92, 5/76, 5/78, 5/91, 9/79

[56] References Cited

U.S. PATENT DOCUMENTS

| 3,446,914 | 5/1969 | Hodge | 358/145 X |
| 4,374,398 | 2/1983 | Yamashita et al. | 358/198 X |
| 4,748,517 | 5/1988 | Shibata et al. | 360/19.1 X |
| 4,872,066 | 10/1989 | Yamagata et al. | 358/336 |
| 4,903,129 | 2/1990 | Bell et al. | 358/198 X |
| 5,103,315 | 4/1992 | Kufta et al. | 358/198 |
| 5,103,349 | 4/1992 | Sochor | 358/336 |
| 5,181,125 | 1/1993 | Kawakami | 360/19.1 X |
| 5,210,618 | 5/1993 | De Haan | 360/38.1 |

FOREIGN PATENT DOCUMENTS

| 01288078 | 11/1989 | Japan. |
| 01296783 | 11/1989 | Japan. |
| 01309483 | 12/1989 | Japan. |

*Primary Examiner*—Thai Tran

[57] ABSTRACT

A magnetic recording and reproducing apparatus wherein synchronizing separation of a reproduction video signal can be performed accurately and a stabilized reproduction video signal can be obtained. The magnetic recording and reproducing apparatus includes a switch device for selectively inserting, upon recording, a PCM modulated audio signal into a blanking period of an FM modulated video signal, a PCM region signal generator for identifying a region of a PCM modulated audio signal in a reproduction signal reproduced by a rotary head and generating a control signal representative of a PCM audio signal region, an FM demodulator for FM demodulating a reproduction signal from the rotary head into a reproduction FM demodulation signal, and a clip circuit for clipping a lower end portion of a PCM audio signal region of a reproduction FM demodulation signal from the FM demodulator in accordance with a control signal generated from the PCM region signal generator.

8 Claims, 64 Drawing Sheets

WHITE CLIP CIRCUIT

PEDESTAL CLIP CIRCUIT

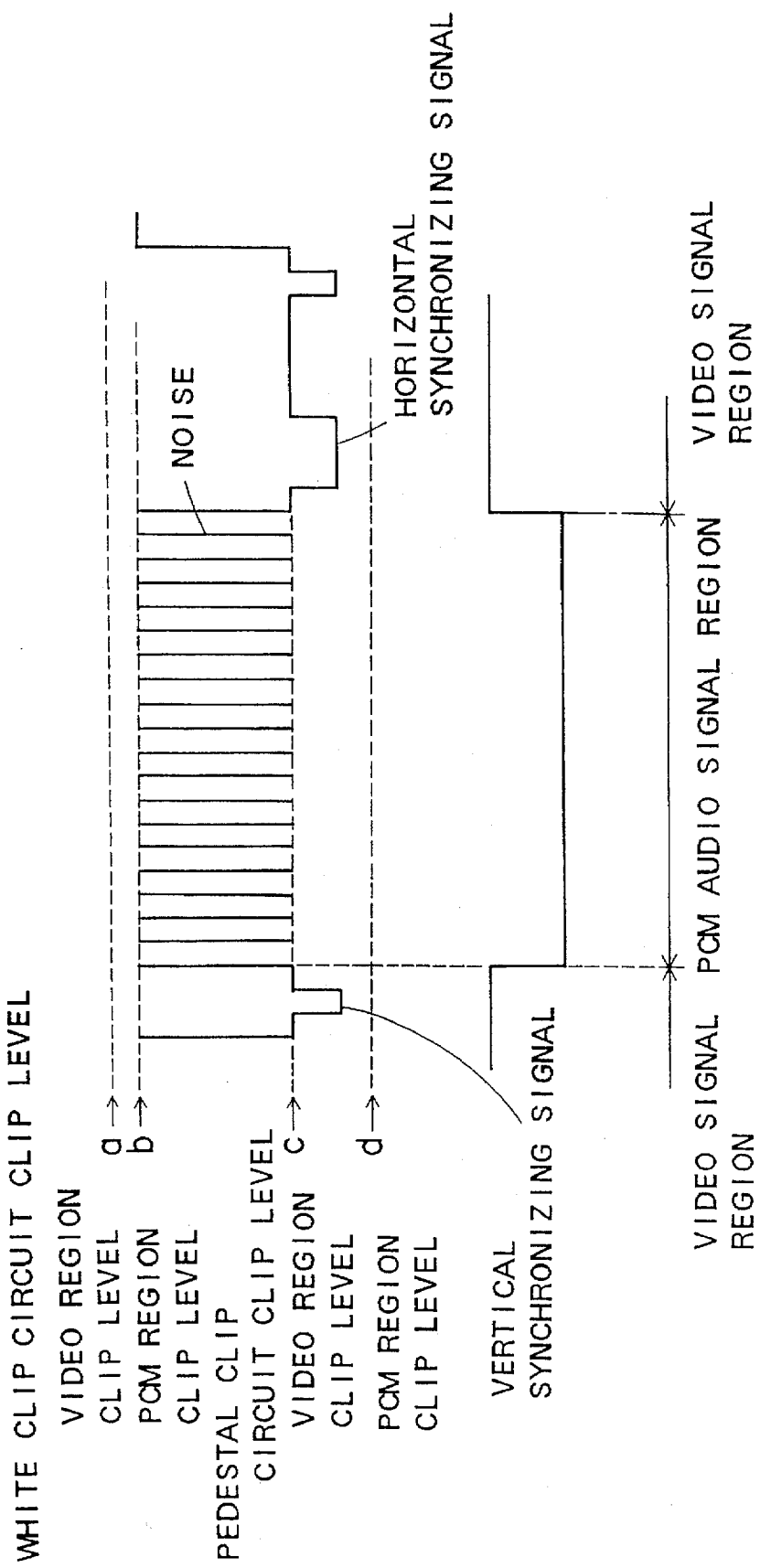

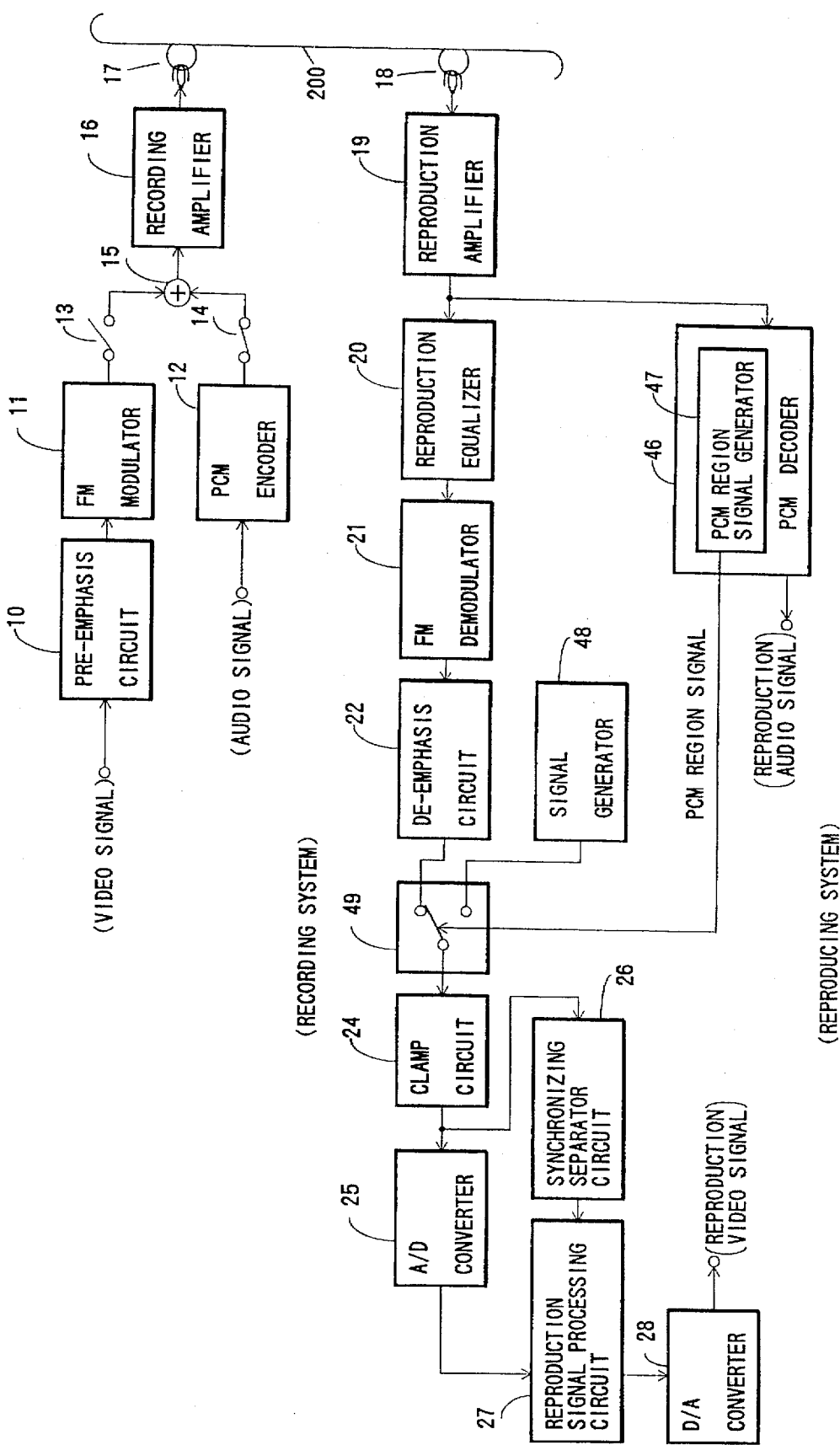

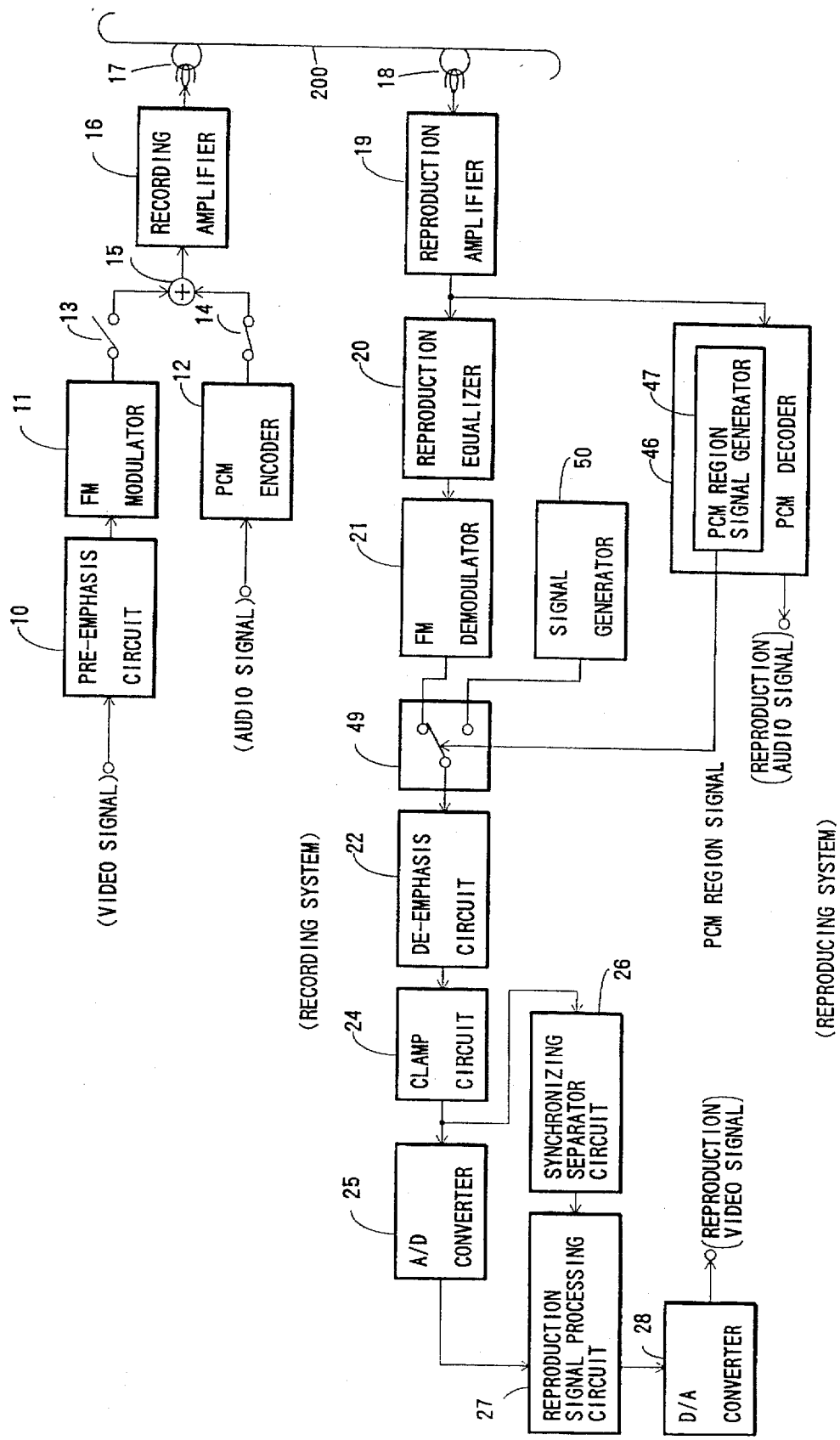

FIG. 20
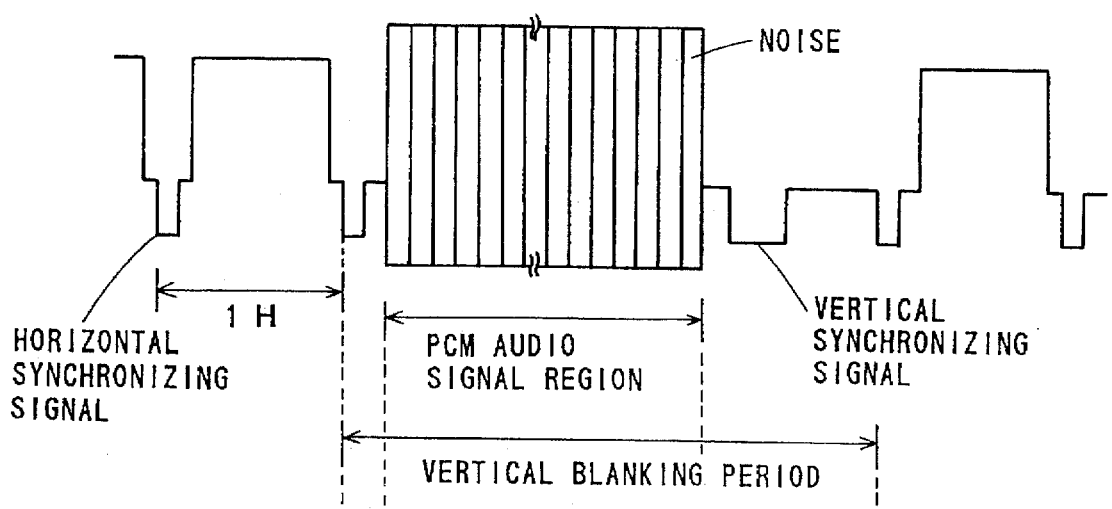
(a)
NOISE
1 H
HORIZONTAL
SYNCHRONIZING
SIGNAL
PCM AUDIO
SIGNAL REGION
VERTICAL
SYNCHRONIZING
SIGNAL
VERTICAL BLANKING PERIOD
(b)
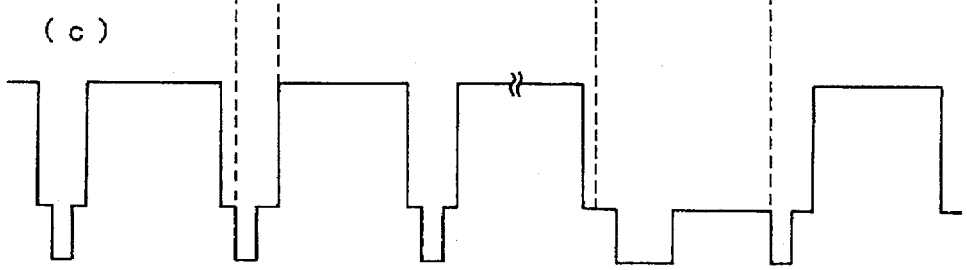
(c)

HORIZONTAL SCANNING PERIOD

HORIZONTAL SYNCHRONIZING SIGNAL
HORIZONTAL SCANNING PERIOD
PCM AUDIO SIGNAL REGION
VERTICAL SYNCHRONIZING SIGNAL
VIDEO SIGNAL | VERTICAL BLANKING PERIOD | VIDEO SIGNAL

FIG. 39
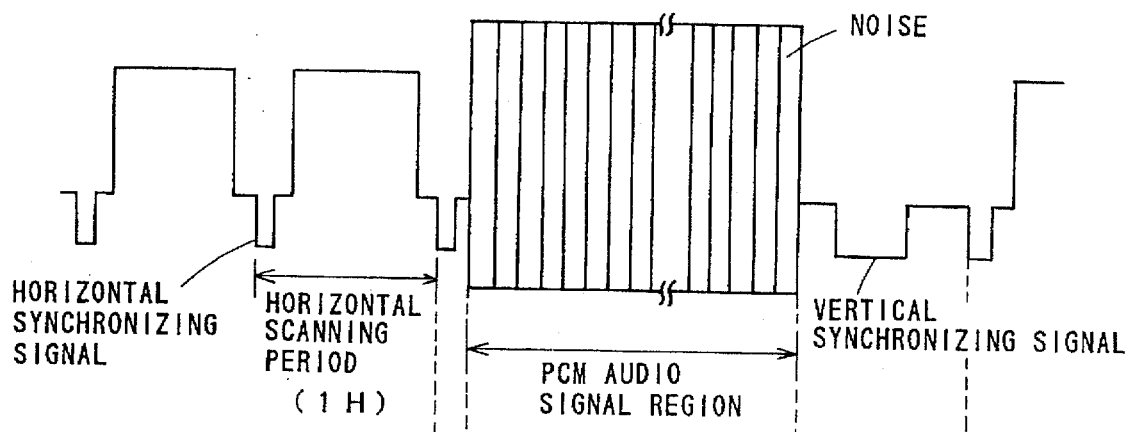
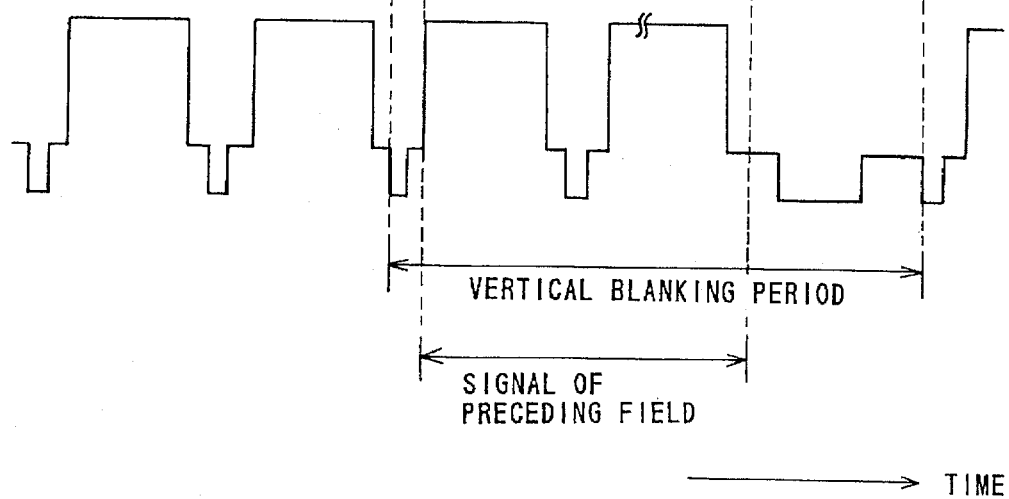

FIG. 63
(a) HIGH FREQUENCY EMPHASIZED VIDEO SIGNAL
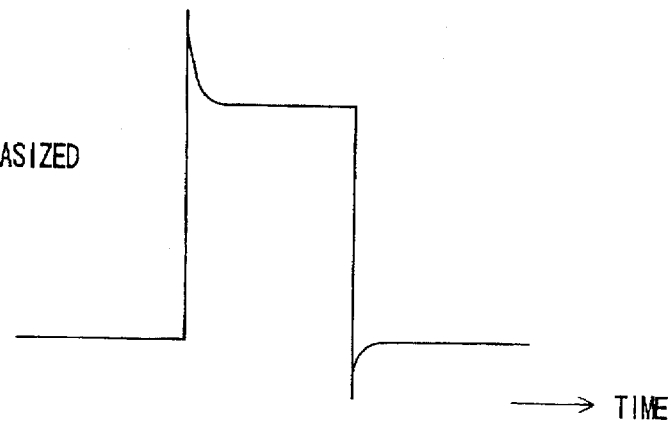
→ TIME
(b) REPRODUCTION FM SIGNAL OF HEAD AMPLIFIER OUTPUT
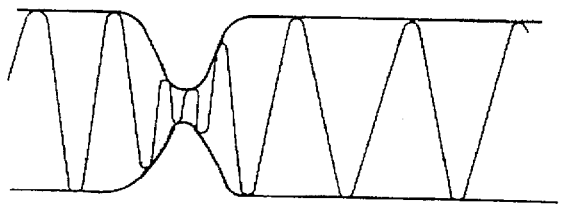
(c) REPRODUCTION FM SIGNAL OF REPRODUCTION EQUALIZER OUTPUT
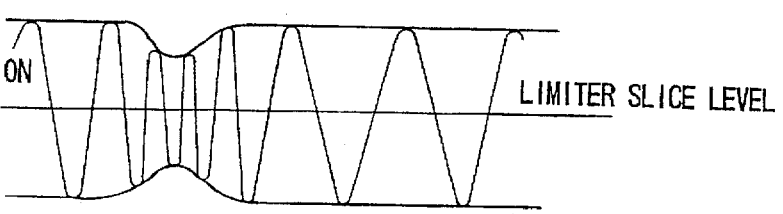
LIMITER SLICE LEVEL
(d) REPRODUCTION FM SIGNAL OF LIMITER OUTPUT
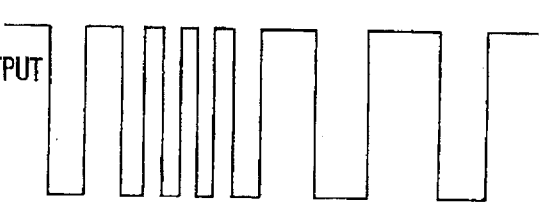

MAGNETIC RECORDING AND REPRODUCING APPARATUS WHICH REPLACES AN INSERTED AUDIO SIGNAL WITH A PRECEDING FIELD OF A REPRODUCED FM VIDEO SIGNAL

This application is a divisional of application Ser. No. 07/802,741, filed on Dec. 5, 1991 now U.S. Pat. No. 5,432,549, the entire contents of which are hereby incorporated by reference.

BACKGROUND OF THE INVENTION

1. Field of the Invention

The present invention relates to a magnetic recording and reproducing apparatus, and more particularly to a magnetic recording and reproducing apparatus of the type wherein a video signal is FM (frequency modulation) modulated and a digital audio signal (hereinafter referred to as PCM (pulse code modulation) audio signal) is time division multiplexed into a blanking period of the FM video signal to produce a recording signal and then the recording signal is recorded onto and reproduced from a magnetic record medium by means of a rotary magnetic head.

2. Description of the Prior Art

Magnetic recording and reproducing apparatus are already known wherein a PCM audio signal is inserted into a blanking period of an FM video signal to produce a recording signal and the thus produced recording signal is recorded onto and then reproduced from a magnetic record medium by means of a rotary head. An exemplary one of such conventional magnetic recording and reproducing apparatus is shown in FIG. 52. Referring to FIG. 52, the magnetic recording and reproducing apparatus shown is a video tape recorder and includes a recording system including a pre-emphasis circuit 10 for emphasizing high frequency components of a video signal, an FM modulator 11 for FM modulating a video signal, a PCM encoder 12 for processing an input audio signal by shuffling, addition of an error correction code and so forth and time base compressing the thus processed audio signal so as to allow an audio signal for one field period to be inserted into a vertical blanking period of an FM video signal to PCM modulate the audio signal, a pair of changing over switches 13 and 14 for alternatively selecting, upon recording, an FM modulated video signal and a PCM modulated audio signal, an adder 15 for adding an FM modulated video signal and a PCM modulated audio signal outputted from the changing over switches 13 and 14, respectively, a recording amplifier 16 for amplifying an output signal of the adder 15, and a recording video head 17 in the form of a rotary head for recording an output signal of the recording amplifier 16 onto a magnetic record medium in the form of a magnetic tape 200.

The magnetic recording and reproducing system further includes a reproducing system including a reproducing video head 18 in the form of a rotary head, a reproduction amplifier 19 for amplifying an output signal of the reproducing video head 18, a PCM decoder 23 for decoding an output signal of the reproduction amplifier 19, that is, for detecting a PCM audio signal inserted in a vertical blanking period of a reproduction signal and processing the detected PCM audio signal by error correction, de-shuffling and so forth to restore an original audio signal, a reproduction equalizer 20 for compensating for a frequency characteristic of a reproduction FM video signal, an FM demodulator 21 for FM demodulating a reproduction FM video signal, a de-emphasis circuit 22 having a reverse characteristic to that of the pre-emphasis circuit 10, a clamp circuit 24, an analog to digital (A/D) converter 25 for converting a reproduction video signal from an analog signal into a digital signal, a synchronizing separator circuit 26 for separating a synchronizing signal from a reproduction video signal, a reproduction signal processing circuit 27 for processing a reproduction signal by time base correction, dropout compensation and so forth in accordance with a synchronizing separation signal from the synchronizing separator circuit 26, and a digital to analog (D/A) converter 28.

The magnetic recording and reproducing apparatus operates in the following manner. Referring also to FIG. 53 at the top of which a video tape is diagrammatically shown on which a recording signal in which a PCM audio signal is inserted in a vertical blanking period Of a video signal is recorded, an video signal inputted, upon recording, to the recording system by way of a video signal input terminal 100 is first supplied to the pre-emphasis circuit 10, at which high frequency components thereof are emphasized, and then to the FM modulator 11, at which it is FM modulated to obtain an FM video signal. Meanwhile, an audio signal inputted to the recording system by way of an audio signal input terminal 101 is supplied to the PCM encoder 12, at which the process of shuffling, addition of an error correction code and so forth is performed therefor and then time base compressing process is performed for the thus processed audio signal in order to allow the audio signal for one field period to be later inserted into a fixed portion of a vertical blanking period of the FM video signal as seen in FIG. 53. The PCM encoder 12 outputs the thus PCM modulated audio signal therefrom. The PCM modulated audio signal from the PCM encoder 12 and the FM modulated video signal from the FM modulator 11 are then alternatively selected by the switches 13 and 14, that is, selectively transmitted to the adder 15 in accordance with a suitable changing over operation of the switches 13 and 14 so that they are added to each other such that the PCM audio signal may be recorded in a recording area which is provided at a fixed portion of a vertical blanking period of an FM modulated video signal as seen in FIG. 54 thereby to produce a recording signal. The recording signal is supplied to the recording amplifier 16, at which the FM video signal and the PCM audio signal thereof are amplified. The composite recording signal of the FM video signal and the PCM audio signal is then recorded onto a magnetic tape 200 by means of the recording video head 17.

On the other hand, upon reproduction, such FM video signal and PCM audio signal recorded in a mixed condition on the magnetic tape 200 are reproduced from the magnetic tape 200 by means of the reproducing video head 18 and amplified as a reproduction signal by the reproduction amplifier 19. The thus amplified reproduction signal is transmitted to the reproduction equalizer 20 and also to the PCM decoder 23. At the PCM decoder 23, a PCM audio signal for one field inserted in a vertical blanking period of such reproduction signal is detected and then processed by time base elongation, error correction, de-shuffling, error modification and so forth to restore an original audio signal. The thus restored original audio signal by the PCM decoder 23 is then outputted as a reproduction output audio signal of the reproducing system by way of a reproduction audio signal output terminal 103.

In the meantime, the reproduction equalizer 20 compensates for a frequency characteristic of the reproduction FM video signal in the reproduction signal received from the reproduction amplifier 19, and an output of the reproduction equalizer 20 is inputted to and FM demodulated by the FM demodulator 21. The FM demodulated video signal is then inputted to the de-emphasis circuit 22, at which high frequency components thereof, which were emphasized upon recording, are de-emphasized to restore an original video signal. The thus restored reproduction video signal is then inputted to the clamp circuit 24, at which it is clamped so that it may have a voltage within a voltage range applicable for the A/D converter 25 at a next stage. It is to be noted that, at the clamp circuit 24, a synchronizing signal of the reproduction video signal is separated to produce a clamp pulse and a leading end portion of the synchronizing signal of the reproduction video signal is clamped to a predetermined dc voltage level in response to such clamp pulse. The thus clamped reproduction video signal from the clamp circuit 24 is then converted from an analog signal to a digital signal by the A/D converter 25 and then transmitted to the reproduction signal processing circuit 27. The clamped reproduction video signal is also transmitted to the synchronizing separator circuit 26, at which a synchronizing signal is separated therefrom. The reproduction signal processing circuit 27 performs reproduction signal processing such as time base correction and dropout compensation of the reproduction video signal from the A/D converter 25 in accordance with a synchronizing separation output of the synchronizing separator circuit 26, and an output reproduction video signal of the reproduction signal processing circuit 27 is converted from a digital signal back into an analog signal by the D/A converter 28 and outputted as a reproduction output video signal of the reproducing system by way of a reproduction video signal output terminal 102.

In the conventional magnetic recording and reproducing apparatus in the form of a video tape recorder described above, an FM modulated video signal and a PCM audio signal are added, upon recording, to each other in accordance with a suitable changing over operation in a fixed portion of a blanking period of the FM video signal. On the other hand, upon reproduction, a reproduction FM video signal and a PCM audio signal, which was mixed with such FM video signal upon recording, are FM demodulated as they are. Consequently, a reproduction video signal including such reproduction FM video signal and PCM audio signal presents such an output signal waveform as shown in FIG. 54 as if it includes noises in a PCM audio signal region.

Further, before processing such as FM demodulation of a reproduction signal in which a PCM audio signal is inserted is performed, an FM video signal and such PCM audio signal are separated from each other. In this instance, a period of a PCM audio signal region of the reproduction FM video signal from which the PCM audio signal has been separated makes a no signal portion, and if the reproduction FM video signal having such no-signal portion is FM demodulated, then the waveform of the FM demodulated video signal presents such an output signal waveform as shown in FIG. 54 as if it includes noises in its PCM audio signal region which is a no-signal portion similarly as described above.

If such a noise signal waveform as seen in FIG. 54 is included in a PCM audio signal region of a reproduction FM video signal, normal synchronizing separation cannot be performed with such reproduction FM video signal. In particular, where the clamp circuit 24, which constitutes together with the A/D converter 25, synchronizing separator circuit 26, reproduction signal processing circuit 27 and D/A converter 28 a time base corrector by which a time base variation of a reproduction video signal caused by elongation of a video tape or the like is time base corrected by detection of an interval of time between adjacent synchronizing signals to re-set a synchronizing signal to a correct position, is constructed such that it separates a synchronizing signal of a reproduction video signal to produce a clamp pulse and clamps an end of a synchronizing signal in accordance with such clamp pulse, if such a noise waveform is included in a PCM audio signal region, correct synchronizing separation cannot be performed with such reproduction video signal, but the clamp circuit 24 will perform a clamping operation at a lower end of a noise portion in the PCM audio signal region. Consequently, the clamp circuit at the input of the analog to digital converter does not operate normally and a time base correcting operation cannot be performed appropriately, which makes a reproduction picture image unstable or abnormal.

Another exemplary conventional magnetic recording and reproducing apparatus is shown in FIG. 55. Referring to FIG. 55, the magnetic recording and reproducing apparatus shown includes a recording system including an analog to digital (A/D) converter 1 for converting an input video signal from an analog signal into a digital signal, a first synchronizing separator circuit 2 for separating a synchronizing signal from an input video signal, a recording signal processing circuit 3 for performing such recording signal processing as to insert blanking data, which make, upon reproduction, a reference signal for such processing as time base correction, into a video signal in accordance with a synchronizing signal from the first synchronizing separator 2, a vertical blanking data generator 4 for generating, in accordance with a synchronizing separation signal from the first synchronizing separator circuit 2, blanking data for a vertical blanking period of a video signal, a gate pulse for enabling vertical blanking data to be inserted into video signal data from the recording signal processing circuit 3 and a timing pulse for inserting a PCM audio signal into an FM video signal, a selector 5 for inserting vertical blanking data from the vertical blanking data generator 4 into video signal data from the recording signal processing circuit 3, and a digital to analog (D/A) converter 6 for converting an output signal of the selector 5 from a digital signal into an analog signal. The recording system of the magnetic recording and reproducing apparatus further includes an FM modulator 11, a PCM encoder 12, a pair of switches 13 and 14, an adder 15, a recording amplifier 16 and a recording video head 17, which are similar to the FM modulator 11, PCM encoder 12, switches 13 and 14, adder 15, recording amplifier 16 and recording video head 17, respectively, of the recording system of the magnetic recording and reproducing apparatus shown in FIG. 52. It is to be noted that the pre-emphasis circuit 10 of the magnetic recording and reproducing apparatus of FIG. 52 is omitted from the magnetic recording and reproducing apparatus of FIG. 55 and an output digital signal of the D/A converter 6 is inputted to the FM modulator 11.

The magnetic recording and reproducing apparatus further includes a reproducing system which is similar in construction to but only different from the reproducing system of the magnetic recording and reproducing apparatus shown in FIG. 52 in that it does not include the de-emphasis circuit 22. It is to be noted that, since the recording system includes the first synchronizing separator circuit 2, the synchronizing separator circuit 26 may be hereinafter referred to as second synchronizing separator circuit.

In operation, an input video signal is first converted from an analog signal into a digital signal by the A/D converter 1 and then outputted to the recording signal processing circuit 3. Meanwhile, the input video signal is inputted also to the first synchronizing separator circuit 2, at which a synchronizing signal is separated from the input video signal. At the recording signal processing circuit 3, such recording signal processing as to insert blanking data, which make, upon reproduction, a reference signal for such processing as time base correction, into a video signal is performed in accordance with an output signal from the first synchronizing separator 2, and the thus processed signal is transmitted from the recording signal processing circuit 3 to the selector 5. Meanwhile, at the vertical blanking data generator 4, vertical blanking data for a video signal are generated with reference to the output of the first synchronizing separator circuit 2 and outputted to the selector 5. Here, the vertical blanking data generator 4 further operates to generate a gate pulse for enabling vertical blanking data to be inserted into video signal data outputted from the recording signal processing circuit 3 and a timing pulse for inserting a PCM audio signal into an FM video signal.

At the selector 5, the vertical blanking data received from the vertical blanking data generator 4 are inserted into the video signal data received from the recording signal processing circuit 3 with reference to a gate pulse from the vertical blanking data generator 4. Then, an output of the selector 5 is converted from a digital signal into an analog signal by the D/A converter 6. A typical waveform of such recording video signal outputted from the D/A converter 6 is shown in FIG. 56. The recording video signal outputted from the D/A converter 6 is subsequently supplied to the FM modulator 11 while an input audio signal is supplied to the PCM encoder 12, whereafter the video signal and audio signal are processed by the FM modulator 11 and PCM encoder 12, switches 13 and 14, adder 15 and recording amplifier 16 and recorded onto a magnetic tape 200 by means of the recording video head 17 in a similar manner as in the magnetic recording and reproducing apparatus of FIG. 52 described hereinabove. It is to be noted here that changing over operations of the switches 13 and 14 are performed in response to a timing pulse transmitted thereto from the vertical blanking data generator 4. Also the PCM encoder 12 operates in response to such timing pulse from the vertical blanking data generator 4.

The thus recorded video signal and audio signal are reproduced from the magnetic tape 200 by means of the reproducing video head 18 and processed in a similar manner as in the reproducing system of the magnetic recording and reproducing apparatus of FIG. 52 except that an FM demodulated reproduction video signal from the FM demodulator 21 is supplied directly to the clamp circuit 24 without being processed by any de-emphasis circuit because pre-emphasis has not been performed for a recording video signal in the recording system.

Also in the conventional magnetic recording and reproducing apparatus of FIG. 55, an FM modulated video signal and a PCM audio signal are added, upon recording, to each other in accordance with a suitable changing over operation such that the PCM audio signal is inserted into a fixed portion of a blanking period of the FM video signal. On the other hand, upon reproduction, a reproduction FM video signal and a reproduction PCM audio signal, which was mixed with such FM video signal upon recording, are FM demodulated as they are. On the other hand, since a PCM audio signal has a waveform of pulses, it includes wide band signal components, and consequently, it is not certain what waveform a video signal after demodulation has in a PCM audio signal region as seen from a waveform shown in FIG. 54. Rather, it has such a signal waveform as if it includes noises in a PCM audio signal region.

Further, also in such a case that an FM video signal and such PCM audio signal are separated from each other as seen from a waveform (b) of FIG. 57 before processing such as FM demodulation of a reproduction signal in which a PCM audio signal is inserted as seen from another waveform (a) of FIG. 57 is performed, a period of a PCM audio signal region of the reproduction FM video signal (waveform (b) of FIG. 57) from which the PCM audio signal has been removed makes a no-signal portion, and if the reproduction FM video signal having such no-signal portion is FM demodulated, then the waveform of the FM demodulated video signal presents such an output signal waveform (c) as shown in FIG. 57 as if it includes noises in its PCM audio signal region which is the no-signal portion, similarly as described.

If such a noise signal waveform (c) as seen in FIG. 57 is included in a PCM audio signal region of a reproduction FM video signal, normal synchronizing separation cannot be performed with such reproduction FM video signal. In particular, where the clamp circuit 24 at a preceding stage to the A/D converter 25 is constructed such that it separates a synchronizing signal of a reproduction video signal to produce a clamp pulse and clamps an end of a synchronizing signal in accordance with such clamp pulse, if such a noise waveform (c) as seen in FIG. 57 is included in a PCM audio signal region, correct synchronizing separation cannot be performed with such reproduction video signal, but the clamp circuit 24 will perform a clamping operation at a lower end of a noise portion in the PCM audio signal region. Consequently, the clamp circuit 24 at the input of the analog to digital converter 25 will not operate normally and a time base correcting operation cannot be performed appropriately, which makes a reproduction picture image unstable or abnormal.

Further, it is not certain what waveform a video signal has, after demodulation, in a PCM audio signal region of a reproduction video signal, and if a noise is outputted at a higher level than a white level of a video signal or at a level lower than an end of a synchronizing signal as seen in FIG. 54 or else a dc component is included, such noise will cause a sag, by which the reproduction video signal is partially varied in hue. Consequently, a good reproduction video signal cannot be obtained.

A further exemplary conventional magnetic recording and reproducing apparatus is shown in FIG. 59. Referring to FIG. 59, the magnetic recording and reproducing apparatus shown includes a recording system which is similar in construction to the recording system of the magnetic recording and reproducing apparatus shown in FIG. 55 except that it includes a recording signal processing circuit 7 in place of the recording signal processing circuit 3, vertical blanking data generator 4 and selector 5 of the magnetic recording and reproducing apparatus of FIG. 55 and additionally includes a pre-emphasis circuit 10 connected to the recording signal processing circuit 7. The recording signal processing circuit 7 performs recording signal processing such as to insert blanking data into an input video signal with reference to a synchronizing signal outputted from the first synchronizing separator circuit 2. The recording signal processing circuit 7 further operates to generate a timing pulse for inserting a PCM audio signal into an FM video signal. Such timing signal is transmitted to the PCM encoder 12 and switches 13 and 14. An input video signal processed by the recording signal processing circuit 7 is inputted to the D/A converter 6, at which it is converted from a digital signal into an analog signal. An analog output video signal of the D/A converter 6 is inputted to the pre-emphasis circuit 10, at which high frequency components thereof are emphasized, and then inputted to the FM modulator 11. It is to be noted that the magnetic recording and reproducing apparatus includes a pair of rotary heads 29a and 29b which each acts as a recording head upon recording and as a reproducing head upon reproduction.

The magnetic recording and reproducing apparatus further includes a reproducing system which is also similar in construction to the reproducing system of the magnetic recording and reproducing apparatus of FIG. 55 in that it includes a pair of reproduction amplifier 19a and reproduction amplifier 19b and a PCM decoder 31 in place of the single reproduction amplifier 19 and the PCM decoder 23, respectively, and additionally includes a head changing over circuit 30 interposed between the reproduction amplifiers 19a and 19b and head changing over circuit 30, a limiter 32 interposed between the reproduction equalizer 20 and FM demodulator 21 and a de-emphasis circuit 22 interposed between the FM demodulator 21 and clamp circuit 24. The reproduction amplifiers 19a and 19b amplify reproduction signals from the rotary heads 29a and 29b, respectively, and the thus amplified reproduction signals are selectively received by the head changing over circuit 30 in response to a head changing over signal. The PCM decoder 31 may be similar in construction to the PCM decoder 23 described hereinabove. The limiter 32 receives an output reproduction FM video signal of the reproduction equalizer 20 and removes amplitude variation components from the received reproduction FM video signal. The de-emphasis circuit 22 has a reverse characteristic to that of the pre-emphasis circuit 10 of the recording system.

Referring to FIG. 60, the rotary heads 29a and 29b are shown as viewed from above. The rotary heads 29a and 29b are mounted on a rotary drum 44 in an angularly spaced relationship by 180 degrees from each other. A magnetic tape 200 is wrapped over about 180 degrees around an outer periphery of the rotary drum 44 under the guidance of a pair of guide pins 45a and 45b and fed in a direction indicated by an arrow mark by the rotary drum 44 when the rotary drum 44 rotates in a counterclockwise direction in FIG. 60.

In operation, an input video signal is first converted from an analog signal into a digital signal by the A/D converter 1 and then outputted to the recording signal processing circuit 3. At the recording signal processing circuit 3, such recording signal processing as to insert blanking data is performed in accordance with a synchronizing separation output of the first synchronizing separator 2. The recording signal processing circuit 3 also generates and outputs a timing pulse for inserting a PCM audio signal into an FM video signal. An output recording signal of the recording signal processing circuit 3 is converted from a digital signal into an analog signal by the D/A converter 6 and then inputted to the pre-emphasis circuit 10, at which high frequency components thereof are emphasized. The recording video Signal is subsequently inputted to the FM modulator 11 while an input audio signal is supplied to the PCM encoder 12, whereafter the video signal and audio signal are processed by the FM modulator 11 and PCM encoder 12, switches 13 and 14, adder 15 and recording amplifier 16 in a similar manner as in the magnetic recording and reproducing apparatus of FIGS. 52 and 55 described hereinabove and then recorded onto a magnetic tape 200 by means of the rotary heads 29a and 29b. It is to be noted here that changing over operations of the switches 13 and 14 are performed in response to a timing pulse transmitted thereto from the recording signal processing circuit 7. Also the PCM encoder 12 operates in response to such timing pulse from the vertical blanking data generator 4.

In this instance, since the magnetic tape 200 is wrapped over a little greater than 180 degrees as seen in FIG. 60 on the outer periphery of the rotary drum 44, even if recording electric current flows always through the rotary heads 29a and 29b, recording on the magnetic tape 200 takes place only while a rotary head is in contact with the magnetic tape 200 within the angular range. Accordingly, the magnetic tape has such record pattern as illustrated in FIG. 61 wherein information is recorded in two regions a and b while the rotary drum 44 makes one full rotation such that a recording signal for one field is recorded onto one track. It is to be noted that, in FIG. 61, reference character a denotes a track recorded by the rotary head 29a while reference character b denotes a track recorded by the other rotary head 29b. Further, since a PCM audio signal is recorded in a time division multiplexed condition in a vertical blanking period of an FM video signal, such PCM audio signal is recorded at each of hatched portions of the tracks a and b.

The thus recorded FM video signal and PCM audio signal are reproduced from the magnetic tape 200 by means of the rotary heads 29a and 29b and then amplified by the reproducing amplifiers 19a and 19b. Then, the reproduction signals outputted from the reproduction amplifiers 19a and 19b are alternatively selected by the head changing over circuit 30 in response to a head changing over signal such that a reproduction signal of a rotary head which is currently in contact with the magnetic head 200 may be selected to form such a single reproduction signal as shown by a waveform (c) of FIG. 62 as seen from waveforms (a) and (b) of FIG. 62. The reproduction signal from the head changing over circuit 30 is then transmitted to the reproduction equalizer 20 and also to the PCM decoder 31. At the PCM decoder 31, a PCM audio signal for one field inserted in a vertical blanking period of the received reproduction signal is detected and then such signal processing as error correction, de-shuffling, error modification and so forth is performed for the thus detected PCM audio signal to restore an original audio signal. The thus restored audio signal is outputted as an output signal of the recording system from the PCM decoder 31.

Generally, when an FM signal is recorded or reproduced by means of an electromagnetic converting system employing a tape and a head, lower side band waves are emphasized while upper side band waves are suppressed, and consequently, a modulation index is varied and an imbalance of side band waves is produced simultaneously. As a result, a reproduction FM signal which corresponds to a rising portion (waveform (a) in FIG. 63) of a video signal having high frequency components emphasized by the pre-emphasis circuit 10 is distorted significantly as seen from a waveform (b) of FIG. 63. Thus, at the reproduction equalizer 20, lower side band waves are suppressed while upper side band waves are emphasized in Such a frequency characteristic as, for example, shown in FIG. 64 thereby to compensate for a frequency characteristic of the reproduction FM video signal. As a result, an output of the reproduction equalizer 20 is reduced in distortion as seen from a waveform (c) of FIG. 63. The output of the reproduction equalizer 20 is transmitted to the limiter 32, at which amplitude variation components of the reproduction FM video signal are removed. The limiter 32 thus develops such an output as shown by a waveform (d) in FIG. 63.

The reproduction signal outputted from the limiter 32 is inputted to and FM demodulated by the FM demodulator 21, and then high frequency components which were emphasized upon recording are de-emphasized by the de-emphasis circuit 22 to obtain a reproduction video signal which are reduced in high frequency noises. The thus obtained reproduction video signal is then inputted to the clamp circuit 24 and thereafter processed by the clamp circuit 24, A/D converter 25, second synchronizing separator circuit 26, reproduction signal processing circuit 27 and D/A converter 28 to produce an output analog reproduction video signal in a similar manner as in the recording system of the magnetic recording and reproducing apparatus of FIG. 52 described hereinabove.

Also in the conventional magnetic recording and reproducing apparatus, a PCM audio signal is time division multiplexed, upon recording, into a vertical blanking period of an FM modulated video signal, and upon reproduction, such reproduction FM video signal and PCM audio signal mixed with such FM video signal are FM demodulated as they are. On the other hand, since a PCM audio signal is a waveform of pulses, it includes wide band signal components, and consequently, a PCM audio signal band will overlap with a video signal band as seen from FIG. 65. In such case, if a reproduced FM video signal and a PCM audio signal are FM demodulated as described above, it is not certain in what waveform an output of the FM demodulator 21 is demodulated in a PCM audio signal region. Rather, the output of the FM demodulator 21 presents such an output signal waveform as shown in FIG. 54 as if it includes noises in a PCM audio signal region.

Further, also in such a case that an FM video signal and such PCM audio signal are separated from each other as seen from the waveform (b) of FIG. 57 before processing such as FM demodulation of a reproduction signal shown by the waveform (a) of FIG. 57 is performed, a period of the PCM audio signal region of the reproduction FM video signal (waveform (b) of FIG. 57) makes a no-signal portion, and if the reproduction FM video signal having such no-signal portion is FM demodulated, the waveform of the FM demodulated video signal presents such output signal waveform (c) as shown in FIG. 57 as if it includes noises in its PCM audio signal region which is the non signal portion similarly as described above.

Where the clamp circuit 24 at a preceding stage to the A/D converter 25 is constructed such that it separates a synchronizing signal of a reproduction video signal to produce a clamp pulse and clamps an end of a synchronizing signal in accordance with such clamp pulse, if such a noise waveform (c) as seen in FIG. 57 is included in a PCM audio signal region of a reproduction video signal, correct synchronizing separation cannot be performed with such reproduction video signal, but the clamp circuit 24 will perform a clamping operation at a lower end of a noise portion in the PCM audio signal region. Consequently, the signal level of an input reproduction video signal to the A/D converter 25 cannot be clamped at a normal value, which makes a reproduction picture image unstable or abnormal.

Further, if it is not uncertain in what waveform an output of the FM demodulator 21 is demodulated in a PCM audio signal region of a reproduction video signal and the output of the FM demodulator 21 has noises above a white level or below an end of a synchronizing signal as seen in FIG. 54 or has a dc component, such noise may cause a sag, by which the reproduction video signal will partially be varied in hue. Consequently, a good reproduction video signal cannot be obtained.

SUMMARY OF THE INVENTION

It is an object of the present invention to provide a magnetic recording and reproducing apparatus wherein synchronizing separation of a reproduction video signal can be performed accurately and a stabilized reproduction video signal can be obtained.

It is another object of the present invention to provide a magnetic recording and reproducing apparatus wherein synchronizing separation of a reproduction video signal can be performed to assure a correct operation of a clamp circuit and sags can be reduced to assure a stabilized good reproduction video signal.

In order to attain the objects, according to one aspect of the present invention, there is provided a magnetic recording and reproducing apparatus of the type wherein a video signal is FM modulated and recorded onto and reproduced from a magnetic medium by means of a rotary head, comprising changing over switch means for selectively inserting, upon recording, a PCM modulated audio signal into a blanking period of an FM modulated video signal, a PCM region signal generator for identifying a region of a PCM modulated audio signal in a reproduction signal reproduced by the rotary head and generating a control signal representative of a PCM audio signal region, FM demodulating means for FM demodulating a reproduction signal from the rotary head into a reproduction FM demodulation signal, and a clip circuit for clipping a lower end portion of a PCM audio signal region of a reproduction FM demodulation signal from the FM demodulating means in accordance with a control signal generated from the PCM region signal generator.

With the magnetic recording and reproducing apparatus, lower end portions of noise in a PCM audio signal region of a reproduction FM demodulation signal are clipped at a level equal to or around a pedestal level in accordance with a control signal generated from the PCM region signal generator and representative of a PCM audio signal region. Consequently, synchronizing separation of a reproduction video signal can be performed accurately, and a stabilized reproduction video signal can be obtained.

According to another aspect of the present invention, there is provided a magnetic recording and reproducing apparatus of the type wherein a video signal is FM modulated and a digital audio signal is time division multiplexed into a blanking period of the FM modulated video signal and recorded onto and reproduced from a magnetic record medium by means of a rotary head, comprising control signal generating means for identifying, upon reproduction, a digital audio signal region of a reproduction signal reproduced by the rotary head and generating a control signal representative of such digital audio signal region, level signal generating means for generating a signal having a predetermined level with respect to a video signal, FM demodulating means for FM demodulating a reproduction signal from the rotary head, and a switch circuit for selecting one of an FM demodulation signal from the FM demodulating means and an output of the level signal generating means in accordance with an output of the control signal generating means.

With the magnetic recording and reproducing apparatus, the controlling signal generating means identifies a digital audio signal region of a reproduction signal reproduced by the rotary head and generates a control signal representative of such digital audio signal region. Meanwhile, a signal having a predetermined level with respect to a video signal is generated by level signal generating means, and the reproduction signal is FM modulated by FM demodulating means. The switch circuit selects one of an FM demodulation signal from the FM demodulating means and an output of the level signal generating means in accordance with an output of the control signal generating means. Consequently, the signal in the digital audio signal region of the FM modulated reproduction signal is made a signal having a fixed level. Accordingly, synchronizing separation of a reproduction video signal can be performed accurately, and a stabilized video signal can be obtained.

According to a further aspect of the present invention, there is provided a magnetic recording and reproducing apparatus of the type wherein a video signal is FM modulated and a digital audio signal is time division multiplexed into a blanking period of the FM modulated video signal and recorded onto and reproduced from a magnetic record medium by means of a rotary head, comprising control signal generating means for identifying, upon reproduction, a digital audio signal region of a reproduction signal reproduced by the rotary head and generating a control signal representative of such digital audio signal region, signal generating means for generating a signal of a predetermined frequency, and a switch circuit for selecting one of a reproduction signal from the rotary head and an output of the signal generating means in accordance with an output of the control signal generating means.

With the magnetic recording and reproducing apparatus, the control signal generating means identifies a digital audio signal region of a reproduction signal reproduced by the rotary head and generates a control signal representative of such digital audio signal region. Meanwhile, a signal of a predetermined frequency which is to make a fixed level signal with respect to a video signal after demodulation is generated by signal generating means. The switch circuit selects one of a reproduction signal from the rotary head and an output of the signal generating means in accordance with an output of the control signal generating means. Consequently, the signal in the digital audio signal region of the FM modulated reproduction signal is made a signal having a fixed level. Accordingly, synchronizing separation of a reproduction video signal can be performed accurately, and a stabilized video signal can be obtained.

According to a still further aspect of the present invention, there is provided a magnetic recording and reproducing apparatus of the type wherein a video signal is FM modulated and a digital audio signal is time division multiplexed into a blanking period of the FM modulated video signal and recorded onto and reproduced from a magnetic record medium by means of a rotary head, comprising region signal generating means for identifying a region of a digital audio signal in a reproduction signal reproduced by the rotary head and generating a control signal representative of a region of a digital audio signal, FM demodulating means for FM demodulating a reproduction signal from the rotary head, and a clip circuit for clipping an upper end portion and a lower end portion in a digital audio signal region of an FM demodulation signal from the FM demodulator in accordance with an output signal of the region signal generating means.

With the magnetic recording and reproducing apparatus, upper end portions and lower end portions of noises in a digital audio signal region of an FM demodulated reproduction video signal are clipped in accordance with a digital region signal representative of such digital audio signal region. Consequently, synchronizing separation of a reproduction video signal can be performed accurately, which assures a normal operation of a clamp circuit. Accordingly, sags can be reduced.

According to a yet further aspect of the present invention, there is provided magnetic recording and reproducing apparatus of the type wherein a video signal is FM modulated and a digital audio signal is time division multiplexed into a blanking period of the FM modulated video signal and recorded onto and reproduced from a magnetic record medium by means of a rotary head, comprising region signal generating means for identifying a region of a digital audio signal in a reproduction signal reproduced by the rotary head and generating a control signal representative of a region of a digital audio signal, signal generating means for generating a signal of a predetermined frequency, FM demodulating means for FM demodulating a reproduction signal from the rotary head, and changing over means for selecting one of an FM demodulation signal from the FM demodulating means and-an output of the signal generating means in accordance with an output signal of the region Signal generating means.

With the magnetic recording and reproducing apparatus, a signal in a digital audio signal region of an FM demodulated reproduction video signal is changed into a signal of a fixed frequency in accordance with a digital region signal representative of such digital audio signal region. Consequently, synchronizing separation of a reproduction video signal can be performed accurately, which assures a normal operation of a clamp circuit. Accordingly, sags can be reduced.

According to a yet further aspect of the present invention, there is provided a magnetic recording and reproducing apparatus of the type wherein a video signal is FM modulated and a digital audio signal is time division multiplexed into a blanking period of the FM modulated video signal and recorded onto and reproduced from a magnetic record medium by means of a rotary head, comprising region signal generating means for identifying a region of a digital audio signal in a reproduction signal reproduced by the rotary head and generating a control signal representative of a region of a digital audio signal, FM demodulating means for FM demodulating a reproduction signal from the rotary head, delaying means for delaying an FM demodulation signal from the FM demodulating means by a fixed period of time, and change over means for selecting one of an FM demodulation signal from the FM demodulating means and an output of the delaying means in accordance with an output signal of the region signal generating means.

With the magnetic recording and reproducing apparatus, a signal in a digital audio signal region of an FM demodulated reproduction video signal is replaced, in accordance with a digital region signal representative of such digital audio signal region, by data of a last line of a preceding field to the digital audio signal region. Consequently, synchronizing separation of a reproduction video signal can be performed accurately, which assures a normal operation of a clamp circuit. Accordingly, sags can be reduced.

According to a yet further aspect of the present invention, there is provided video signal recording and reproducing apparatus of the type wherein a video signal is FM modulated and a digital audio signal is time division multiplexed into a blanking period of the FM modulated video signal and recorded onto and reproduced from a magnetic record medium by means of a rotary head, comprising blanking data generating means for generating, upon recording and reproduction, blanking data of a video signal, region signal generating means for identifying, upon reproduction, a region of a digital audio signal in a reproduction signal reproduced by the rotary head and generating a control signal representative of such region of the digital audio signal, FM demodulating means for FM demodulating a reproduction signal from the rotary head, and changing over means for selecting one of an FM demodulation signal from the FM demodulating means and an output of the blanking data generating means in accordance with an output signal of the region signal generating means.

With the video signal recording and reproducing apparatus, an FM demodulated reproduction video signal is partially replaced by a vertical blanking signal generated by the blanking data generating means in a recording system so that the vertical blanking signal may be a signal in a digital audio signal region of the FM demodulated reproduction video signal. Consequently, synchronizing separation of a reproduction video signal can be performed accurately, which assures a normal operation of a clamp circuit. Accordingly, a good reproduction video signal can be obtained and sags can be reduced.

According to a yet further aspect of the present invention, there is provided a video signal recording and reproducing apparatus of the type wherein a video signal is FM modulated and a digital audio signal is time division multiplexed into a blanking period of the FM modulated video signal and recorded onto and reproduced from a magnetic record medium by means of a rotary head, comprising blanking data generating means for generating, upon recording and reproduction, blanking data of a video signal, FM modulating means for FM modulating, upon recording and reproduction, blanking data of a video signal generated from the blanking data generating means, region signal generating means for identifying, upon reproduction, a region of a digital audio signal in a reproduction signal reproduced by the rotary head and generating a control signal representative of such region of the digital audio signal, and changing over means for selecting one of a reproduction signal from the rotary head and an output of the FM modulating means in accordance with an output signal of the region signal generating means.

With the video signal recording and reproducing apparatus, a reproduction video signal before FM demodulation is partially replaced by a vertical blanking signal generated by the blanking data generating means in a recording system so that a signal obtained by FM demodulation of the vertical blanking signal may be a signal in a digital audio signal region of such reproduction video signal after FM demodulation. Consequently, synchronizing separation of a reproduction video signal can be performed accurately, which assures a normal operation of a clamp circuit. Accordingly, a good reproduction video signal can be obtained and sags can be reduced.

According to a yet further aspect of the present invention, there is provided a magnetic recording and reproducing apparatus of the type wherein a video signal is FM modulated and a PCM modulated audio signal is inserted into a blanking period of the FM modulated video signal and recorded onto and reproduced from a magnetic record medium by means of a rotary head, comprising a PCM region signal generator for identifying a region of a PCM modulated audio signal in a reproduction signal reproduced by the rotary head and generating a control signal representative of such PCM audio signal region, an analog to digital converter for converting a reproduction signal of the rotary head into a digital signal, and storage means for storing therein a digital reproduction signal from the analog to digital converter and reading out the stored digital signal therefrom in accordance with an output of the PCM region signal generating means in such a manner as to remove a PCM audio signal from the digital reproduction signal.

With the magnetic recording and reproducing apparatus, a reproduction signal is once changed from an analog signal into a digital signal and then stored in the form of a digital signal in the storage means, and then the reproduction signal is read out from the storage means in accordance with a control signal representative of a PCM audio signal region in such a manner as to remove a PCM audio signal from the digital reproduction signal. Consequently, a reproduction video signal after FM demodulation is free from noise, and synchronizing separation of a reproduction video signal can be performed accurately and a stabilized reproduction video signal can be obtained.

According to a yet further aspect of the present invention, there is provided a magnetic recording and reproducing apparatus of the type wherein a video signal is FM modulated and a PCM modulated audio signal is inserted into a blanking period of the FM modulated video signal and recorded onto and reproduced from a magnetic record medium by means of a rotary head, comprising a PCM region signal generator for identifying a region of a PCM modulated audio signal in a reproduction signal reproduced by the rotary head and generating a control signal representative of such PCM audio signal region, and storage means for storing therein a reproduction signal from the rotary head in the form of an analog signal and reading out the stored analog signal therefrom in accordance with an output of the PCM region signal generating means in such a manner as to remove a PCM audio signal from the reproduction signal.

With the magnetic recording and reproducing apparatus, a reproduction signal is stored in the form of an analog signal into the storage means and then read out from the storage means in accordance with a control signal representative of a PCM audio signal region in such a manner as to remove a PCM audio signal from the analog reproduction signal. Consequently, a reproduction video signal after FM demodulation is free from noise, and synchronizing separation of a reproduction video signal can be performed accurately and a stabilized reproduction video signal can be obtained.

According to a yet further aspect of the present invention, there is provided a video signal recording and reproducing apparatus of the type wherein a video signal is FM modulated and a digital audio signal is time division multiplexed into a blanking period of the FM modulated video signal and recorded and reproduced, comprising region signal generating means for identifying, upon reproduction, a region of a digital audio signal in a reproduction signal and generating a control signal representative of such region of the digital audio signal, delaying means for delaying the reproduction signal by a fixed period of time, and changing over means for selecting one of the reproduction signal and an output of the delaying means in accordance with an output signal of the region signal generating means.

With the video signal recording and reproducing apparatus, the changing over means selects, in accordance with a digital region signal representative of a digital audio signal region, one of a reproduction signal and an output of the delaying means which delays the reproduction signal by a fixed period of time, and an output of the changing over means is FM demodulated. Consequently, a signal in the digital audio signal region of the reproduction video signal is replaced by a reproduction video signal of a preceding field. Consequently, synchronizing separation of a reproduction video signal can be performed accurately, which assures a normal operation of a clamp circuit. Accordingly, a good reproduction picture image can be obtained. Further, a signal also in a digital audio signal region can be clamped, and sags can be reproduced.

According to a yet further aspect of the present invention, there is provided a video signal recording and reproducing apparatus of the type wherein a video signal is FM modulated and a digital audio signal is time division multiplexed into a blanking period of the FM modulated video signal and recorded and reproduced, comprising region signal generating means for identifying, upon reproduction, a region of a digital audio signal in a reproduction signal and generating a control signal representative of such region of the digital audio signal, delaying means for delaying the reproduction signal by a fixed period of time equal to a horizontal scanning period of the recording signal, and changing over means for selecting one of the reproduction signal and an output of the delaying means in accordance with an output signal of the region signal generating means.

With the video signal recording and reproducing apparatus, the changing over means selects, in accordance with a digital region signal representative of a digital audio signal region, one of a reproduction signal and an output of the delaying means which delays the reproduction signal by a fixed period of time equal to a horizontal scanning period of the recording signal, and an output of the changing over means is FM demodulated. Consequently, a signal in the digital audio signal region of the reproduction video signal is replaced by a video signal of a repetition of data of a last line of a preceding field. Consequently, synchronizing separation of a reproduction video signal can be performed accurately, which assures a normal operation of a clamp circuit. Accordingly, a good reproduction picture image can be obtained. Further, a signal also in a digital audio signal region can be clamped, and sags can be reproduced.

According to a yet further aspect of the present invention, there is provided a video signal recording and reproducing apparatus of the type wherein a video signal is FM modulated and a digital audio signal is time division multiplexed into a blanking period of the FM modulated video signal and recorded and reproduced, comprising region signal generating means for identifying, upon reproduction, a region of a digital audio signal in a reproduction signal and generating a control signal representative of such region of the digital audio signal, FM signal generating means for FM modulating a signal of a predetermined frequency to develop an FM modulated signal, and changing over means for selecting one of the reproduction signal and the FM modulated signal from the FM signal generating means in accordance with an output signal of the region signal generating means.

With the video signal recording and reproducing apparatus, the changing over means selects, in accordance with a digital region signal representative of a digital audio signal region, one of a reproduction signal and an FM demodulated signal obtained by FM demodulation of a signal of a predetermined frequency so that a signal in the digital audio signal region of the reproduction video signal after FM demodulation may be a signal of the fixed frequency. Consequently, synchronizing separation of a reproduction video signal can be performed accurately, which assures a normal operation of a clamp circuit. Accordingly, a good reproduction picture image can be obtained. Further, since the signal inserted in the digital audio signal region is not a signal which only has a dc level, and sags can be reproduced.

According to a yet further aspect of the present invention, there is provided a video signal recording and reproducing apparatus of the type wherein a video signal is FM modulated and a digital audio signal is time division multiplexed into a blanking period of the FM modulated video signal and recorded and reproduced by means of a pair of heads, comprising region signal generating means for identifying, upon reproduction, a region of a digital audio signal in a reproduction signal reproduced by either of the heads and generating a control signal representative of such region of the digital audio signal, a pair of delaying means for delaying reproduction signals from the heads by a fixed period of time, first changing over means for selecting one of a reproduction signal from one of the heads and an output of one of the delaying means connected to the other of the heads in accordance with an output signal of the region signal generating means, second changing over means for selecting one of a reproduction signal from the other of the heads and an output of the other of the delaying means connected to the one of the heads in accordance with an output signal of the region signal generating means, and a head changing over circuit for selecting one of outputs of the first and second changing over means in accordance with reproducing operation of the heads.

With the video signal recording and reproducing apparatus, reproduction signals from the heads and signals obtained by delaying the reproduction signals by a fixed period of time are selectively transmitted in accordance with a digital region signal representative of a digital audio signal region by the first and second changing over means, and one of outputs of the first and second changing over means is selected in accordance with reproducing operation of the heads by the head changing over circuit and then FM demodulated. Consequently, a signal in the digital audio signal region of the reproduction video signal is replaced by a reproduction video signal of a preceding field. Accordingly, synchronizing separation of a reproduction video signal can be performed accurately, which assures a normal operation of a clamp circuit. Consequently, a good reproduction picture image can be obtained. Further, since the signal inserted in the digital audio signal region is not a signal which only has a dc level, and sags can be reproduced.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 14 is a waveform diagram illustrating operation of the white clip circuit and pedestal clip circuit of FIGS. 13a and 13b;

FIG. 15 is a block diagram showing a modification to the magnetic recording and reproducing apparatus of FIG. 11;

FIG. 16 is a similar view but showing a modification to the modified magnetic recording and reproducing apparatus of FIG. 15;

FIG. 20 is a waveform diagram illustrating operation of a PCM region signal generator, a delay element and a switch circuit of the modified magnetic recording and reproducing apparatus of FIG. 19;

FIG. 39 is a waveform diagram showing a waveform of an output reproduction video signal after FM demodulation of the magnetic recording and reproducing apparatus of FIG. 38;

FIG. 49 is a block diagram showing a still further modification to the magnetic recording and reproducing apparatus of FIG. 38;

FIG. 63 is a waveform diagram illustrating operation of a reproduction equalizer and a limiter of the conventional magnetic recording and reproducing apparatus of FIG. 59;

DESCRIPTION OF THE PREFERRED EMBODIMENTS

Figure 1:
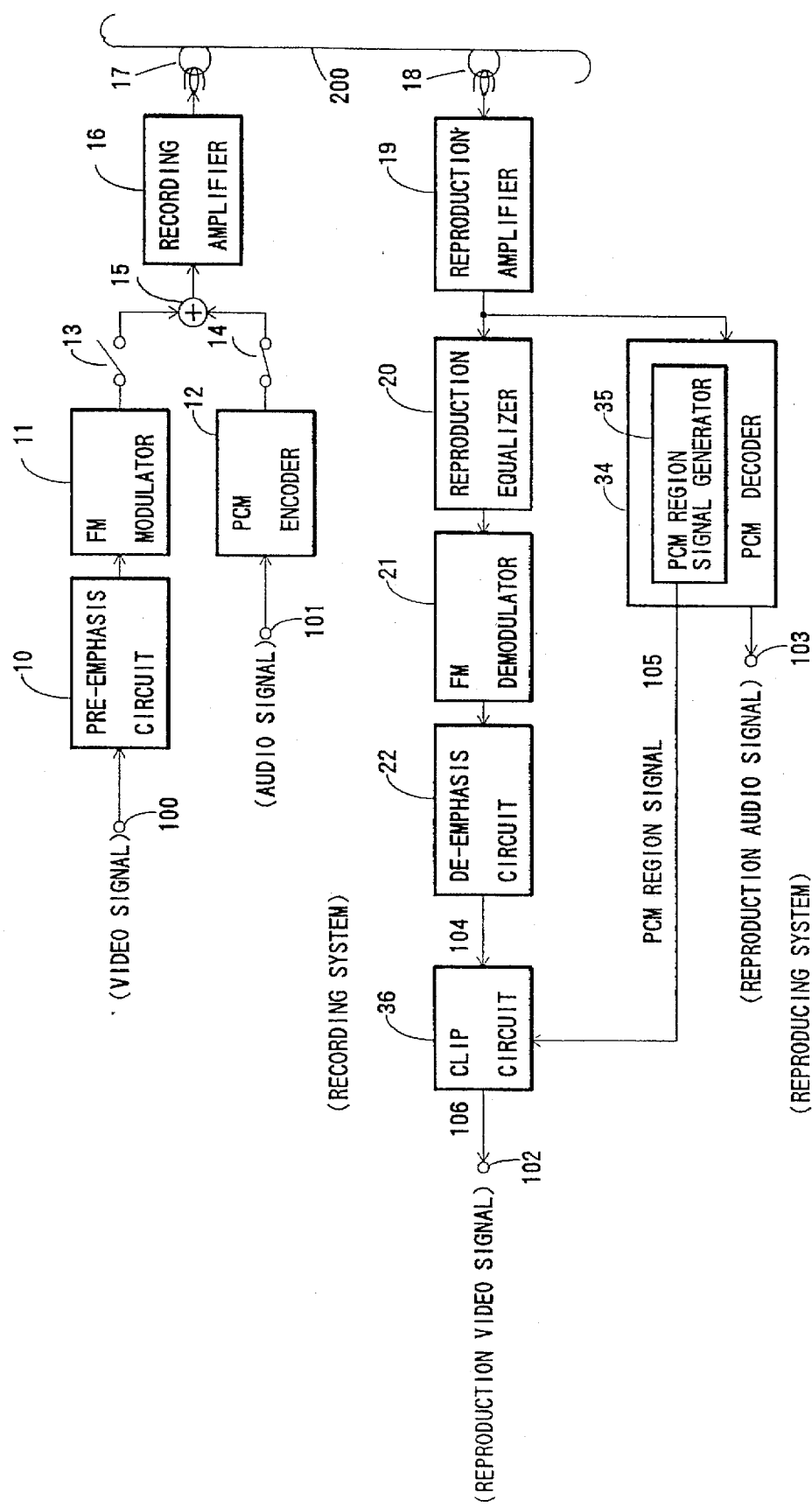
FIG. 1 is a block diagram of a video tape recorder showing a first preferred embodiment of the present invention.

Referring first to FIG. 1, there is shown a magnetic recording and reproducing apparatus to which the present invention is applied. The magnetic recording and reproducing apparatus shown is a video tape recorder and includes a recording system including a pre-emphasis circuit 10 for emphasizing high frequency components of a video signal, an FM modulator 11 for FM modulating a video signal, a PCM encoder 12 for processing an input audio signal by shuffling, addition of an error correction code and so forth and time base compressing the thus processed audio signal to allow an audio signal for one field period to be inserted into a vertical blanking period of an FM video signal to PCM modulate the audio signal, a pair of changing over switches 13 and 14 for alternatively selecting, upon recording, an FM modulated video signal and a PCM modulated audio signal, an adder 15 for adding an FM modulated video signal and a PCM modulated audio signal outputted from the changing over switches 13 and 14, respectively, a recording amplifier 16 for amplifying an output signal of the adder 15, and a recording video head 17 in the form of a rotary head for recording an output signal of the recording amplifier 16 onto a magnetic tape 200 as a magnetic record medium. The recording system of the magnetic recording and reproducing system is similar to that of the conventional magnetic recording and reproducing apparatus described hereinabove with reference to FIG. 52.

Figure 52:
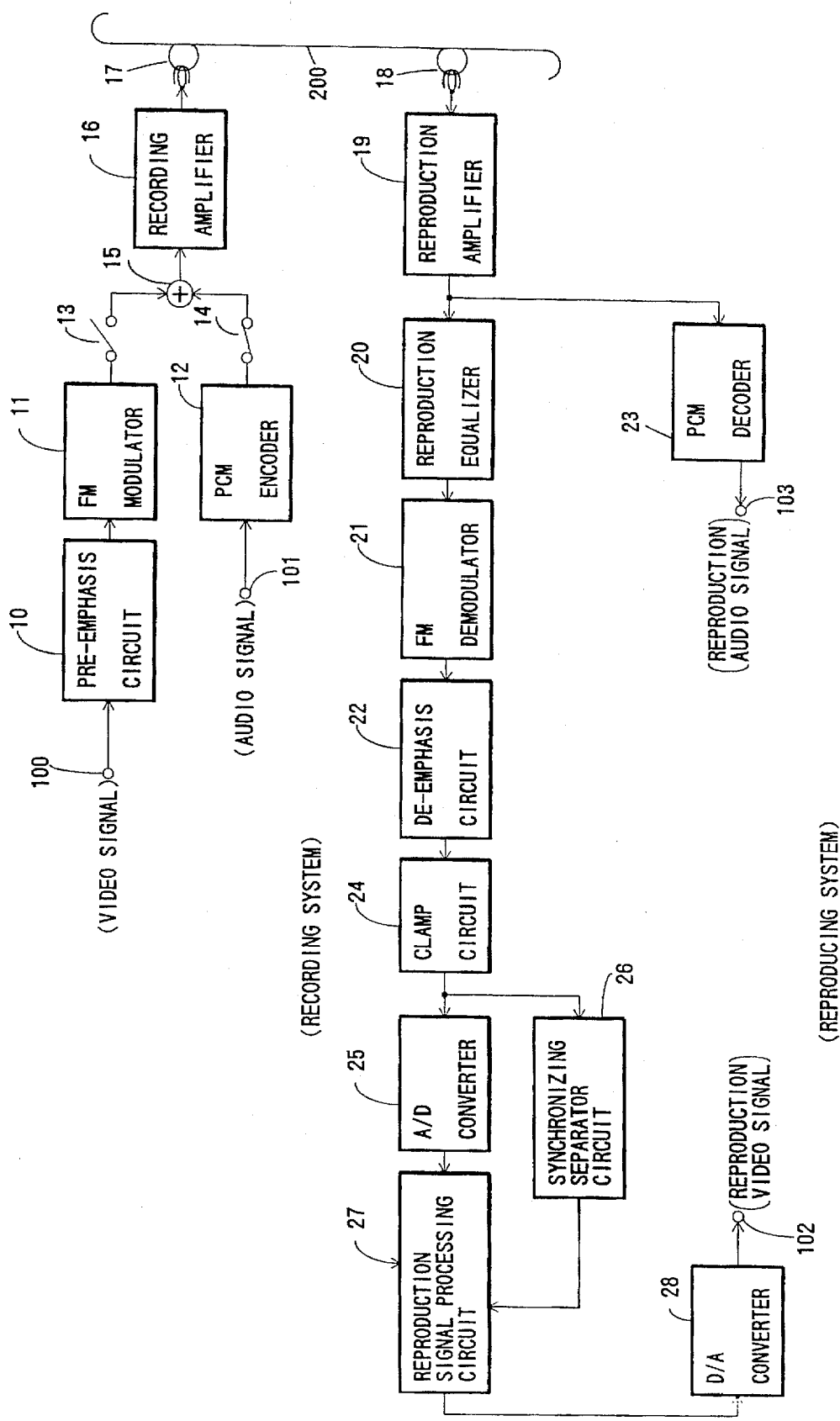
FIG. 52 is a block diagram showing a conventional magnetic recording and reproducing apparatus.
Figure 53:
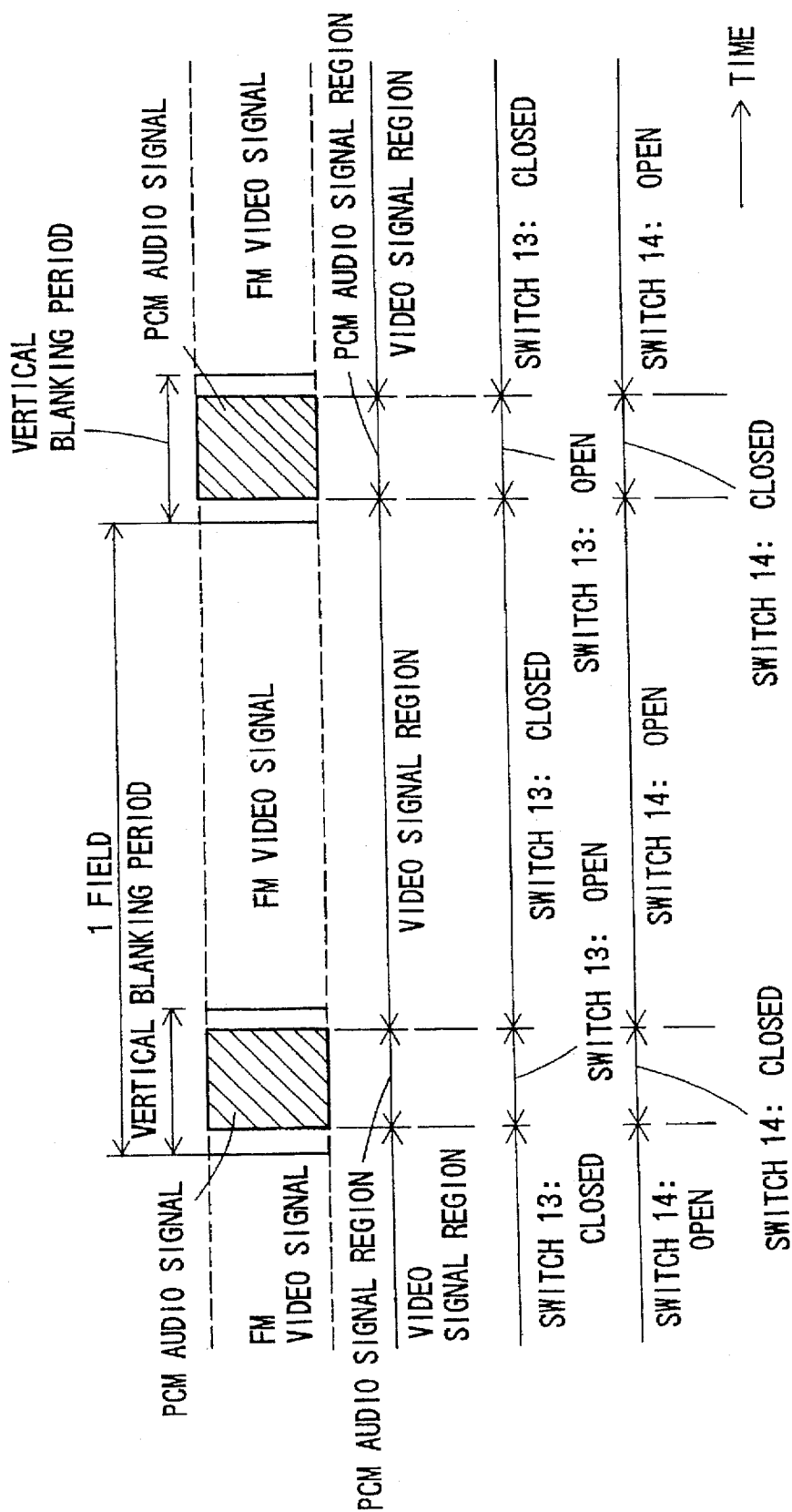
FIG. 53 is a waveform diagram illustrating time division multiplexing of a PCM audio signal into a blanking period of an FM video signal.

The magnetic recording and reproducing apparatus further includes a reproducing system including a reproducing video head 18 in the form of a rotary head, a reproduction amplifier 19 for amplifying an output signal of the reproducing video head 18, a reproduction equalizer 20 for compensating for a frequency characteristic of a reproduction FM video signal, an FM demodulator 21 for demodulating a reproduction FM video signal, and a de-emphasis circuit 22 having a reverse characteristic to that of the pre-emphasis circuit 10, similarly to the reproducing system of the conventional magnetic recording and reproducing apparatus described hereinabove with reference to FIG. 52.

The reproducing system of the magnetic recording and reproducing apparatus further includes a PCM decoder 34 for decoding an output signal of the reproduction amplifier 19, that is, for detecting a PCM audio signal for one field inserted in a vertical blanking period of a reproduction signal and processing the detected PCM audio signal by error correction, de-shuffling and so forth to restore an original audio signal, similarly to the PCM decoder 23 of the conventional magnetic recording and reproducing apparatus of FIG. 52. The PCM decoder 34, however, includes therein a PCM region signal generator 35 which accurately discriminates a region of a PCM modulated audio signal in a reproduction signal and generates a control signal representative of a PCM audio signal region. The reproducing system of the magnetic recording and reproducing apparatus further includes a clip circuit 36 for clipping a lower end portion of a reproduction FM demodulated signal obtained by FM demodulation in a PCM audio signal region of a reproduction signal of the reproduction video head 18 in accordance with a PCM region signal outputted from the PCM region signal generator 35 of the PCM decoder 34. Though not shown, the reproducing system may further include such clamp circuit, A/D converter, synchronizing separator circuit, reproduction signal processing circuit and D/A converter as in the reproducing system of the magnetic recording and magnetic apparatus of FIG. 52.

Figure 54:
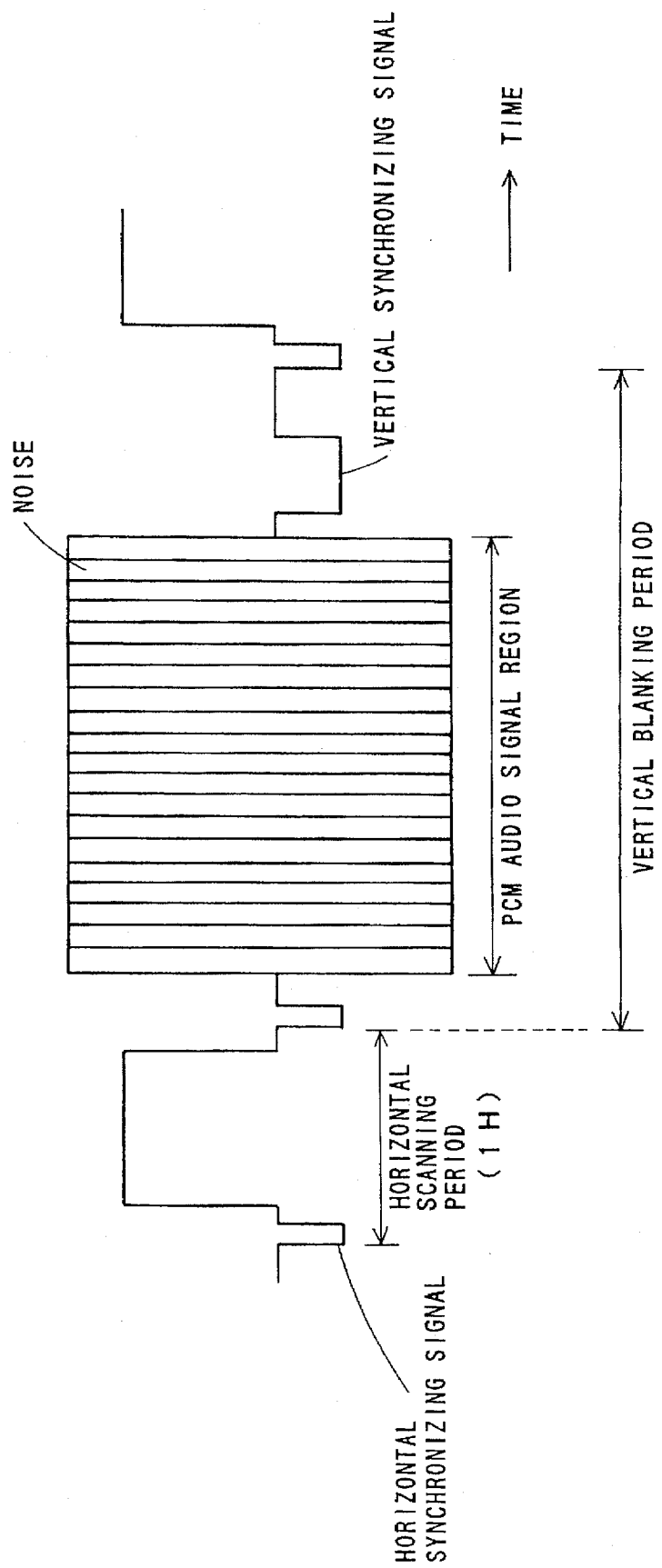
FIG. 54 is a waveform diagram showing a waveform an output signal after FM demodulation of the conventional magnetic recording and reproducing apparatus of FIG. 52.
Figure 55:
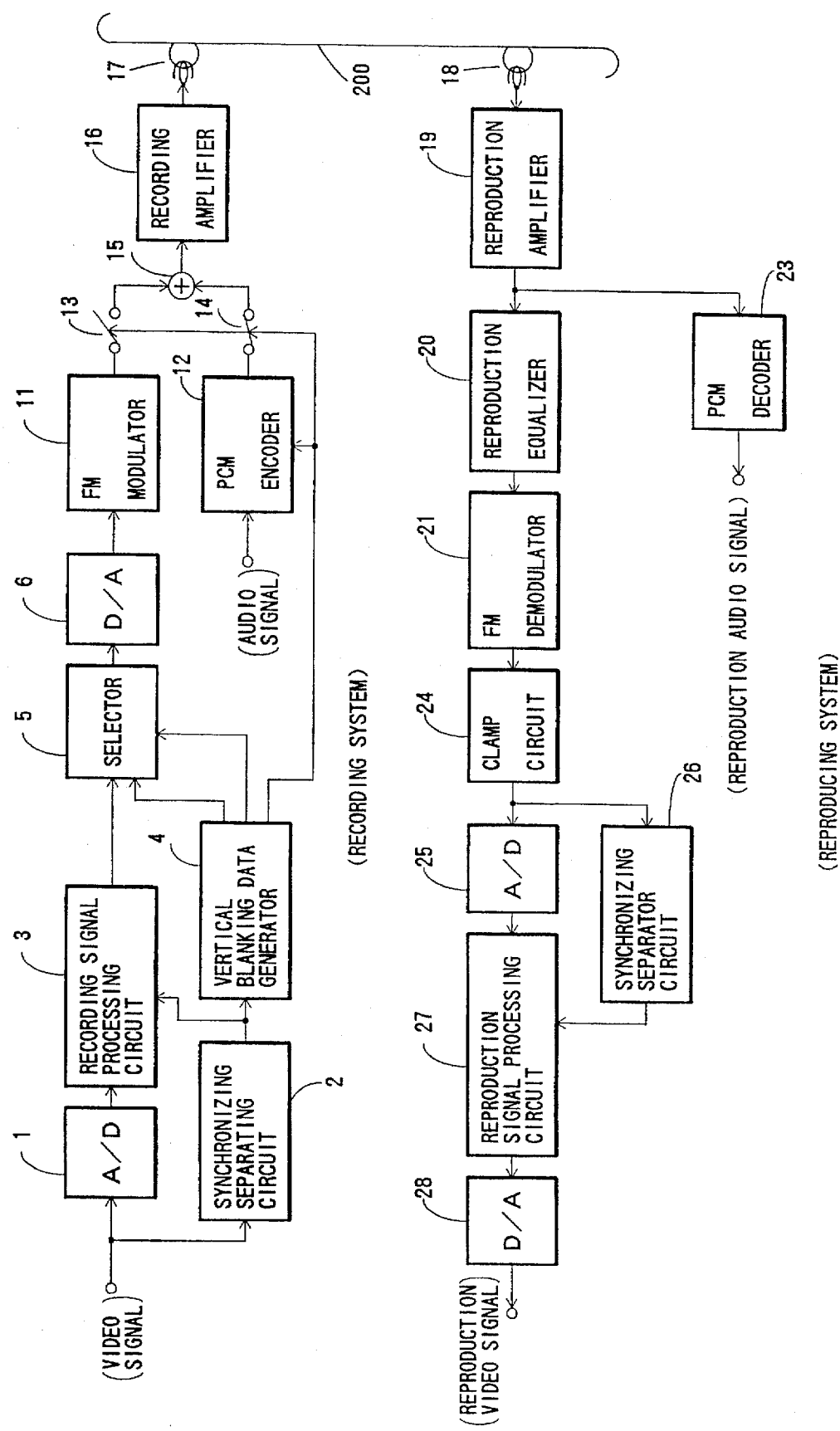
FIG. 55 is a block diagram showing another conventional magnetic recording and reproducing apparatus.

The magnetic recording and reproducing apparatus operates in the following manner. In particular, an in-put video signal inputted, upon recording, to the recording system by way of a video signal input terminal 100 is first supplied to the pre-emphasis circuit 10, at which high frequency components thereof are emphasized, and then to the FM modulator 11, at which it is FM modulated to obtain an FM video signal. Meanwhile, an input audio signal is inputted to the recording system by way of an audio signal input terminal 101 and supplied to the PCM encoder 12, at which processing of shuffling, addition of an error correction code and so forth is performed therefor and then time base compressing processing is performed for the thus processed audio signal in order to allow the audio signal for one field period to be later inserted into a fixed portion of a vertical blanking period of the FM video signal. The PCM encoder 12 outputs the thus PCM modulated audio signal therefrom. The PCM modulated audio signal from the PCM encoder 12 and the FM modulated video signal from the FM modulator 11 are then alternatively selected by the switches 13 and 14, that is, selectively transmitted to the adder 15 in accordance with a suitable change over operation of the switches 13 and 14 so that they are added to each other such that the PCM audio signal may be recorded in a recording area which is provided at a fixed portion of a vertical blanking period of an FM modulated video signal as seen in FIG. 54 thereby to produce a recording signal. The recording signal is supplied from the adder 15 to the recording amplifier 16, at which the FM video signal and the PCM audio signal thereof are amplified. The composite recording signal of the FM video signal and the PCM audio signal is then recorded onto a magnetic tape 200 by means of the recording video head 17.

On the other hand, upon reproduction, such FM video signal and PCM audio signal recorded in a mixed condition on the magnetic tape 200 are reproduced from the magnetic tape 200 by means of the reproducing video head 18 and amplified as a reproduction signal by the reproduction amplifier 19. The thus amplified reproduction signal is transmitted to the reproduction equalizer 20 and also to the PCM decoder 34. At the PCM decoder 34, a PCM audio signal for one field inserted in a vertical blanking period of such reproduction signal is detected and then processed by time base elongation, error correction, de-shuffling and so forth to restore an original audio signal. The thus restored original audio signal by the PCM decoder 34 is outputted as a reproduction output audio signal of the reproducing system by way of a reproduction audio signal output terminal 103.

In the meantime, the reproduction equalizer 20 compensates for a frequency characteristic of the reproduction FM video signal in the reproduction signal received from the reproduction amplifier 19, and an output of the reproduction equalizer 20 is then FM demodulated by the FM demodulator 21. The FM demodulated video signal is inputted to the de-emphasis circuit 22, at which high frequency components thereof, which were emphasized by the pre-emphasis circuit 10 upon recording, are de-emphasized to restore an original video signal.

The operation of the magnetic recording and reproducing apparatus described above is similar to that of the conventional magnetic recording and reproducing apparatus of FIG. 52. By the way, since a PCM audio signal is added, upon recording, into a predetermined portion of a blanking period of an FM modulated video signal in response to a suitable change over operation of the change over switches 13 and 14 and then, upon reproduction, a reproduction FM video signal and a PCM audio signal mixed with such reproduction FM video signal are FM demodulated as they are, such reproduction video signal including such reproduction FM video signal and PCM audio signal presents such an output signal waveform as shown in FIG. 54 as if it includes noises in a PCM audio signal region.

Figure 2:
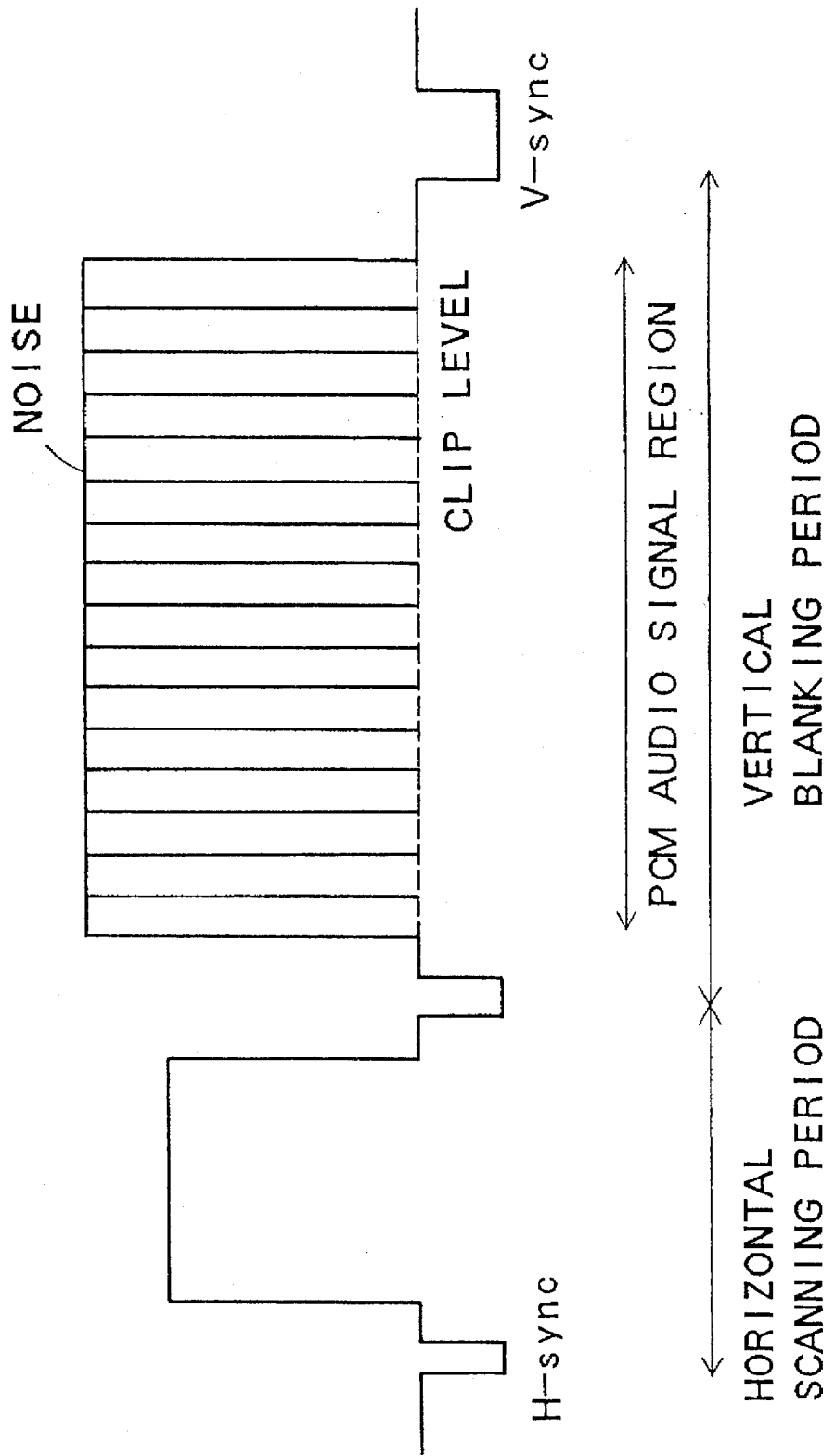
FIG. 2 is a waveform diagram showing an output waveform of a reproduction video signal of the video tape recorder of FIG. 1.

Thus, in the video tape recorder of the present invention, a reproduction FM demodulated signal outputted from the de-emphasis circuit 22 is inputted by way of a reproduction FM demodulated signal input terminal 104 (FIG. 3) to the clip circuit 36. At the clip circuit 36, the clip level thereof is controlled in accordance with a PCM region signal outputted from the PCM region signal generator 35 and representative of a PCM audio signal region. In particular, the clip circuit 36 clips lower ends of noises in a PCM audio signal region of a reproduction FM demodulated signal at a level substantially equal to a pedestal level. Consequently, the output reproduction video signal of the clip circuit 36 exhibits such an output waveform as shown in FIG. 2.

Here, the PCM region signal generator 35 in the PCM decoder 34 generates a PCM region signal by such construction that an end timing of a PCM audio signal region of a reproduction signal is detected and a starting time of a next PCM audio signal region is predicted from a result of such detection. Such PCM region signal generator 35, which is capable of generating a PCM region signal representative of a PCM audio signal region, can be constructed making use of a suitable known technique.

Figure 3:
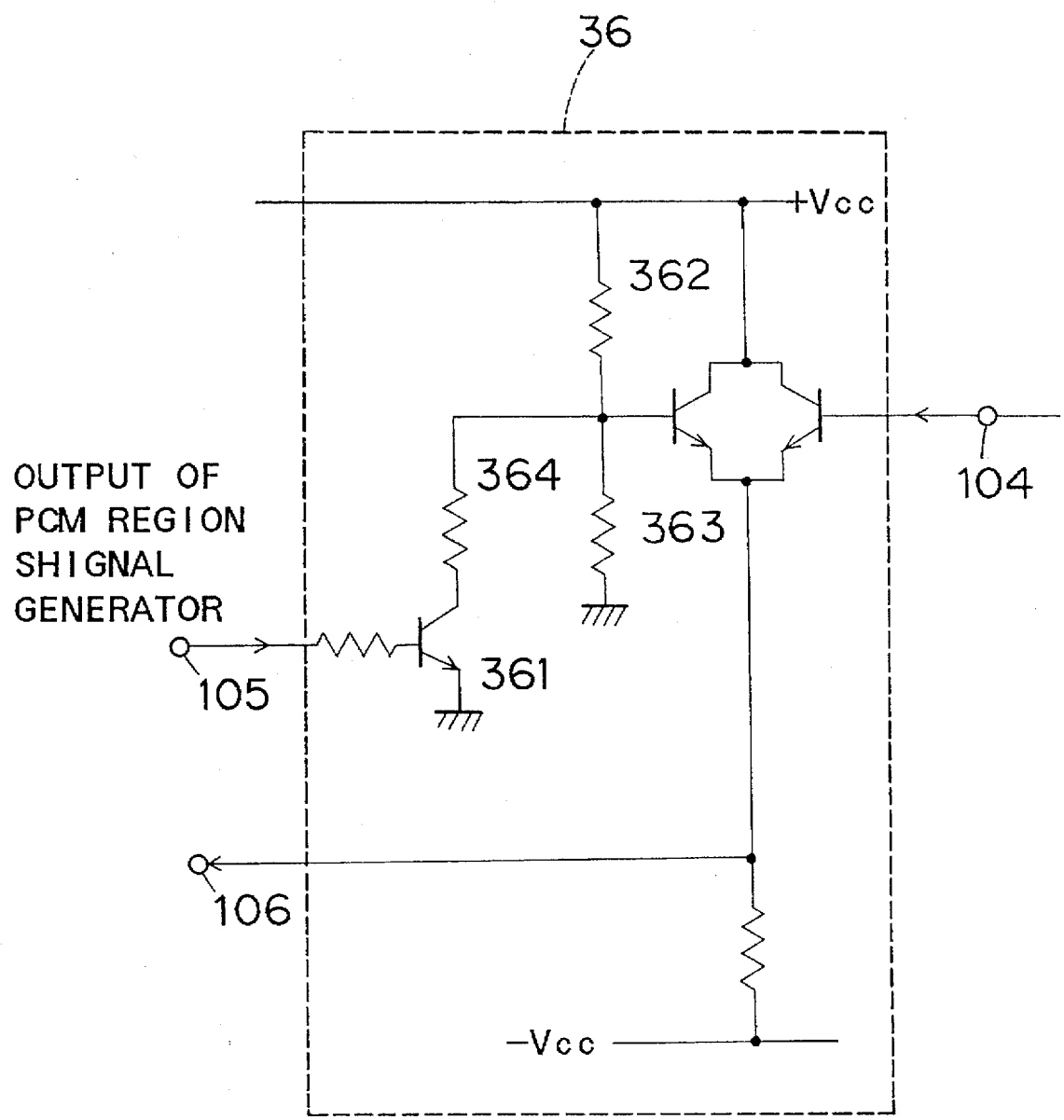
FIG. 3 is a circuit diagram showing details of a clip circuit of the video tape recorder of FIG. 1.

Meanwhile, the clip circuit 36 may be constructed in such a manner as, for example, shown in FIG. 3. The clip circuit 36 shown in FIG. 3 includes a transistor 361, resistors 362, 363 and 364 and so forth.

Figure 4:
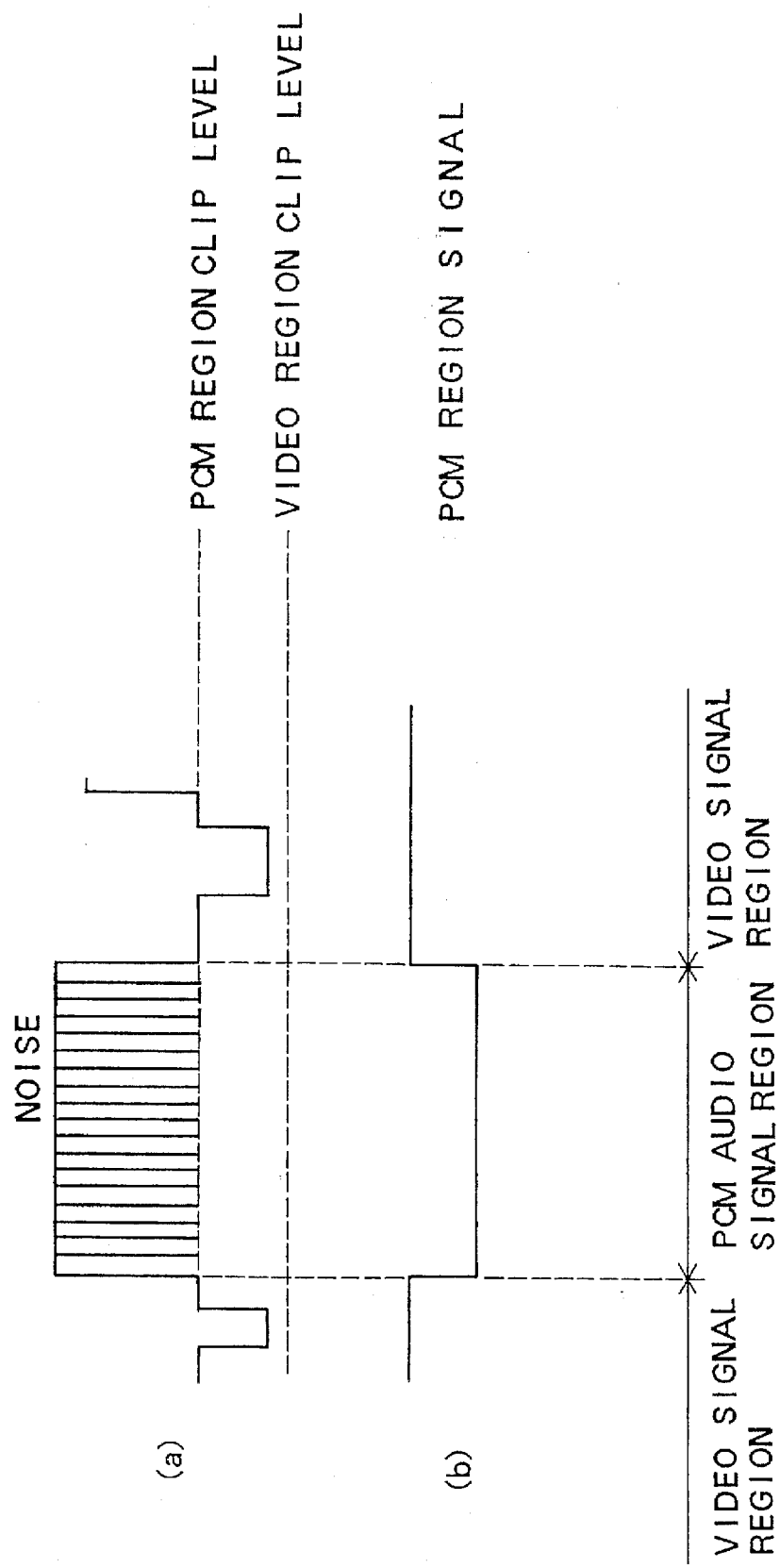
FIG. 4 is a waveform diagram illustrating operation of the clip circuit of FIG. 3.

The PCM region signal generator 35 generates such a PCM region signal pulse, for example, which presents a low level in a PCM audio signal region but presents a high level in a video signal region as shown by a waveform (b) in FIG. 4. Such PCM region signal pulse is inputted to the clip circuit 36 by way of a PCM region signal input terminal 105 (FIG. 3). Here in the clip circuit 36, since the PCM region signal pulse from the PCM region signal input terminal 105 presents a low level in a PCM audio signal region, the transistor 361 does not conduct. Consequently, the clip level of the clip circuit 36 depends upon the resistors 362 and 363. On the other hand, in a video signal region, the PCM region signal pulse from the PCM region signal input terminal 105 presents a high level, and consequently, the transistor 361 conducts. Consequently, the clip level of the clip circuit 36 depends upon the resistors 362, 363 and 364.

Accordingly, the clip level of the clip circuit 36 is set, in a PCM audio signal region, to a pedestal level as seen from a waveform (a) of FIG. 4 while the clip level is set, in a video signal region, to a synchronization end level. In particular, the resistors 362, 363 and 364 are set to a resistance value such that, in a video signal region, a signal is clipped substantially at a synchronization end level similarly as in a case, for example, wherein a signal which has been dropped below a synchronization end level is to be clipped so as to allow the signal to be inputted to a reproduction analog to digital converter. Where such construction is employed, a reproduction FM demodulated signal outputted from the de-emphasis circuit 22 is inputted to the clip circuit 36 by way of the reproduction FM demodulated signal input terminal 104 so that lower ends of noises in a PCM audio signal region of the FM demodulated output signal in the reproduction signal can be clipped.

Thus, since the clip circuit 36 can accurately perform synchronization separation of a video signal, a stabilized reproduction video signal can be outputted from a reproduction video signal output terminal 106. A reproduction video signal obtained in this manner by the clip circuit 36 is outputted from a reproduction video signal output terminal 102 of the reproducing system shown in FIG. 1.

It is to be noted that, while the magnetic recording and reproducing apparatus of FIG. 1 is constructed such that a PCM audio signal is recorded into a fixed portion of a vertical blanking period of an FM video signal in accordance with a suitable change over operation of the change over switches 13 and 14, a PCM audio signal may otherwise be recorded into a horizontal blanking period or into vertical and horizontal blanking periods. In any case, similar effects to those of the magnetic recording and reproducing apparatus of FIG. 1 described above can be attained if a magnetic recording and reproducing apparatus includes a PCM region signal generator which accurately identifies a region of a PCM modulated audio signal in a reproduction signal read out upon reproduction by a rotary head and generates a control signal representative of a PCM audio signal region and a clip circuit the clip level of which can be controlled, in accordance with such PCM region signal outputted from the PCM region signal generator, in a PCM audio signal region of a reproduction FM demodulated signal obtained by FM demodulation of a reproduction signal from the rotary head so that lower ends of noises in a PCM audio signal region of a reproduction FM demodulated signal can be clipped at a level substantially equal to a pedestal level.

Figure 5:
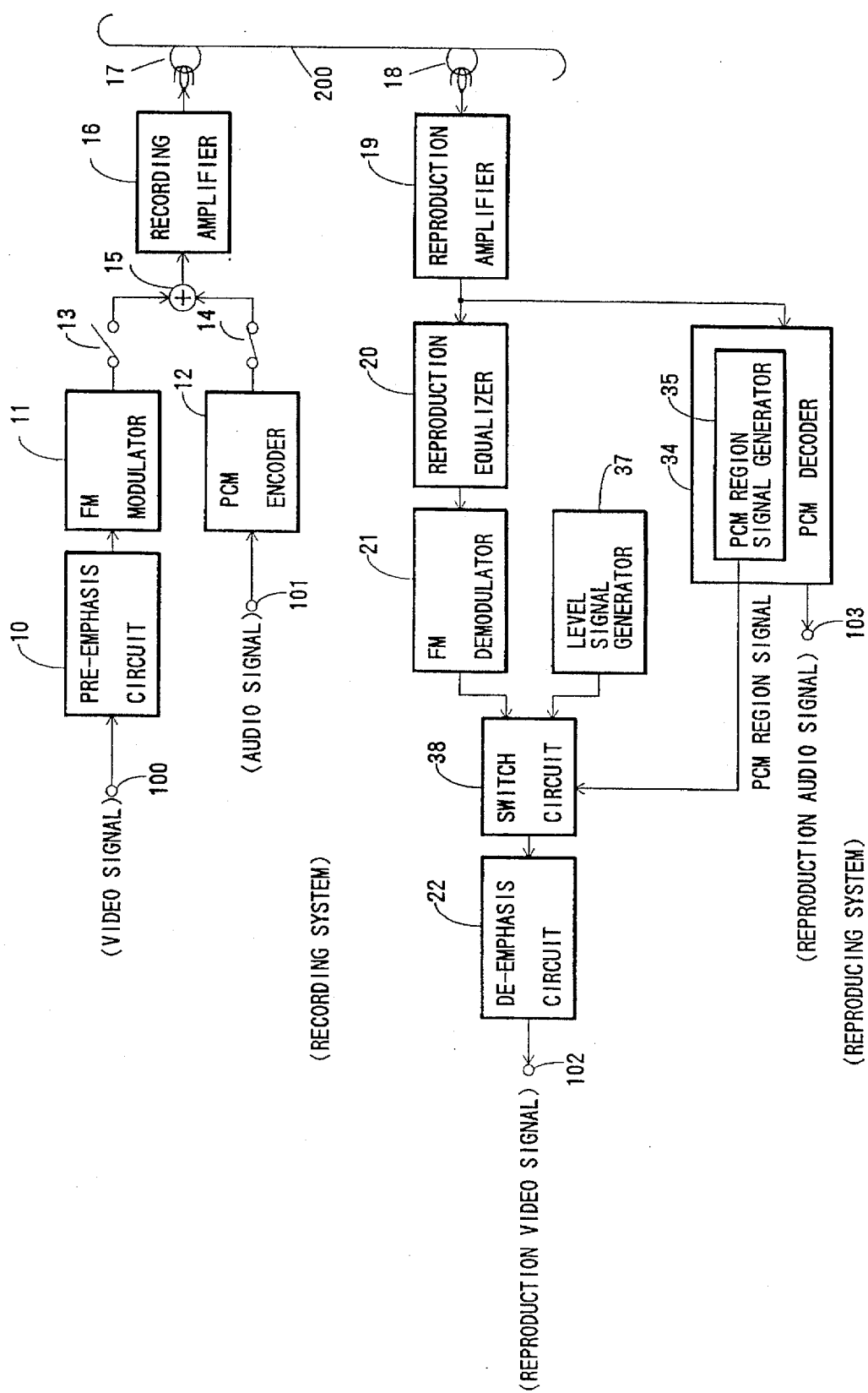
FIG. 5 is a block diagram of a magnetic recording and reproducing apparatus showing a second preferred embodiment of the present invention.

Referring now to FIG. 5, there is shown a magnetic recording and reproducing apparatus according to a second preferred embodiment of the present invention. The magnetic recording and reproducing apparatus shown includes a recording system which is similar to the recording system of the magnetic recording and reproducing apparatus of the first embodiment described hereinabove with reference to FIG. 1. The magnetic recording and reproducing apparatus further includes a reproducing system which includes a reproducing video head 18, a reproduction amplifier 19, a reproduction equalizer 20, an FM demodulator 21, a de-emphasis circuit 22 and a PCM decoder 34 including a PCM region signal generator 35 therein, similarly to the reproducing system of the magnetic recording and reproducing apparatus of FIG. 1. The reproducing system of the magnetic recording and reproducing apparatus further includes a level signal generator 37 for generating a signal having a fixed level with respect to a video signal, and a switch circuit 38 for receiving a reproduction video signal outputted from the FM demodulator 21 and an output of the level signal generator 37 and selecting one of the received signals in response to a PCM region signal received from the PCM region signal generator 35. An output of the switch circuit 38 is inputted to the de-emphasis circuit 22, from which it is outputted as a reproduction video signal.

The magnetic recording and reproducing apparatus operates in the following manner. In particular, the recording system operates in a similar manner to the recording system of the magnetic recording and reproducing apparatus of FIG. 1. Meanwhile, in the reproducing system, the components 18, 19, 20, 21, 34 and 35 thereof operate in a similar manner to those of the reproducing system of the magnetic recording and reproducing apparatus of FIG. 1 described hereinabove.

Accordingly, similarly as described hereinabove, if, upon reproduction, a reproduction FM video signal and a PCM audio signal mixed with such reproduction FM video signal are FM demodulated as they are by the FM demodulator 21 and passed through the de-emphasis circuit 22, then the reproduction video signal from the de-emphasis circuit 22 will present such an output signal waveform as shown in FIG. 54 as if it includes noises in a PCM audio signal region.

Figure 9:
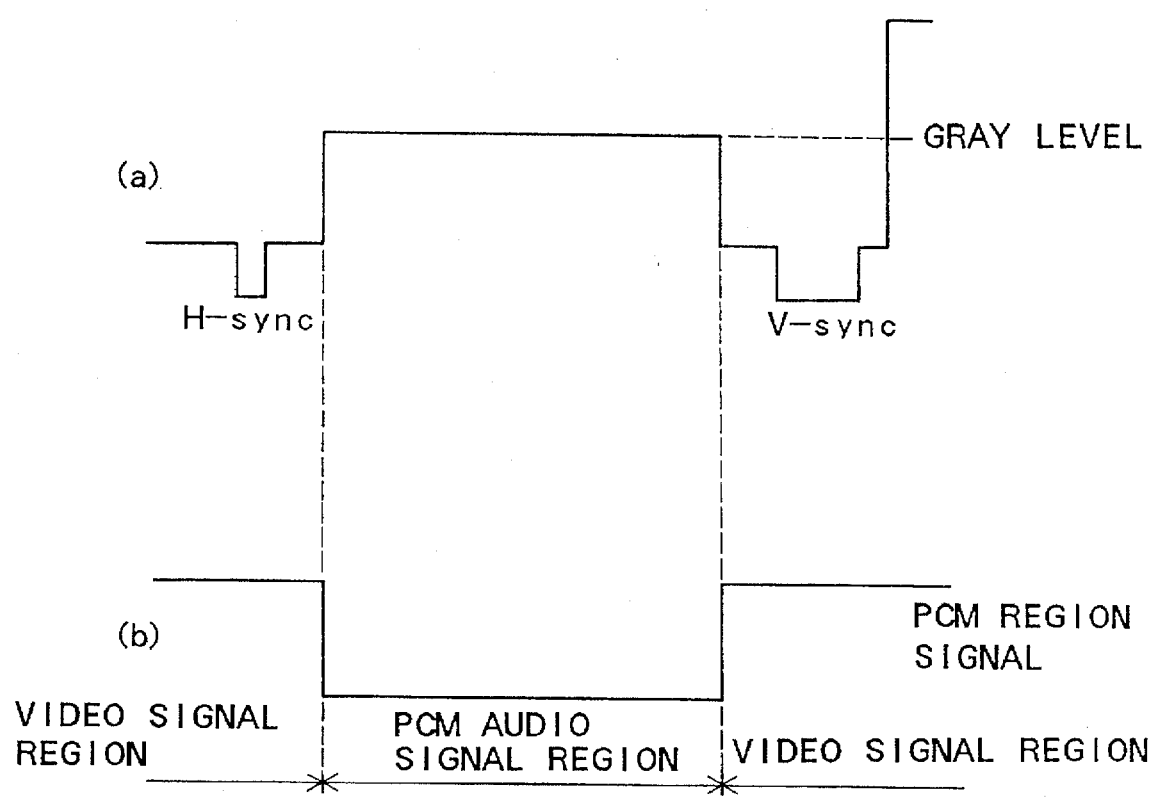
FIG. 9 is a waveform diagram illustrating operation of a PCM region signal generator and a switch circuit of the magnetic recording and reproducing apparatus of FIG. 5.

Thus, in the present magnetic recording and reproducing apparatus, the level signal generator 37 generates such a fixed level signal that will provide, for example, a gray level when it is de-emphasized by the de-emphasis circuit 22 as seen from a waveform (a) in FIG. 9, and an output of the level signal generator 37 and an output of the FM demodulator 21 are inputted to the switch circuit 38, which operates in response to a PCM region signal representative of a PCM audio signal region, so that they may be selectively outputted from the switch circuit 38. Such PCM region signal is generated by the PCM region signal generator 35 provided in the PCM decoder 34 and is transmitted to the switch circuit 23.

If the PCM region signal generator 35 develops a pulse which presents, for example, a low level in a PCM audio signal region and a high level in a video signal region as shown by a waveform (b) in FIG. 9 and is inputted to the switch circuit 38, the switch circuit 38 selects a reproduction FM demodulated signal transmitted thereto from the FM demodulator 21 in a period of a video signal region in which the pulse presents a high level, but selects an output of the level signal generator 37 in a period of a PCM audio signal region in which the pulse presents a low level. Then, an output of the switch circuit 38 is inputted to the de-emphasis circuit 22, at which high frequency components, which were emphasized by the pre-emphasis circuit 10 in the recording system, are de-emphasized. Consequently, a reproduction video signal wherein high frequency noises have been reduced is obtained. Further, such a fixed level signal at a gray level as shown by the waveform (a) of FIG. 9 is obtained in a PCM audio signal region.

Since a signal of an FM demodulated output of a reproduction signal in a PCM audio signal region can be made as a fixed gray level signal, synchronization separation of a video signal can be performed accurately and a stabilized reproduction video signal can be obtained.

Figure 6:
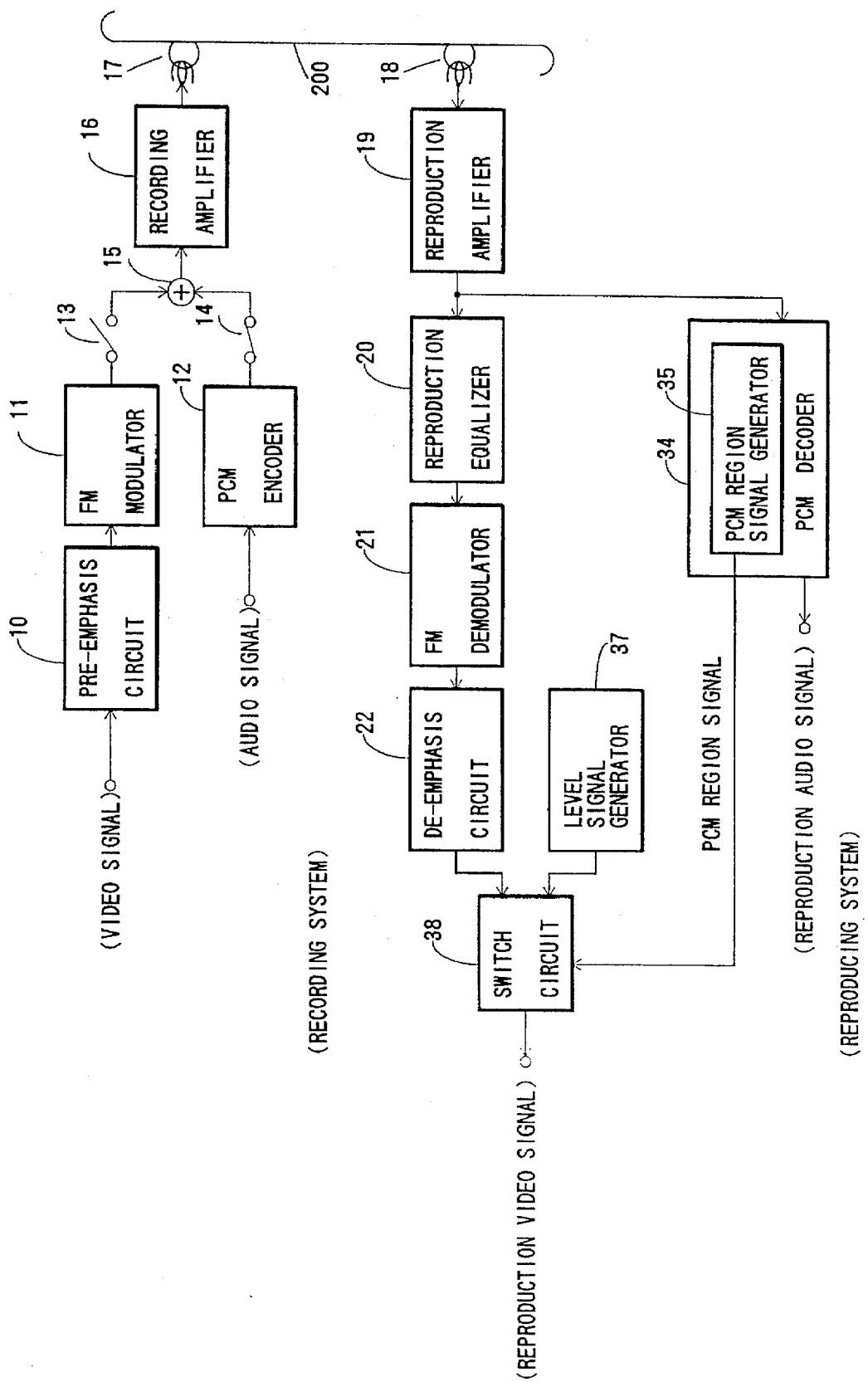
FIG. 6 is a similar view but showing a modification to the magnetic recording and reproducing apparatus of FIG. 5.

Referring now to FIG. 6, there is shown a modification to the magnetic recording and reproducing apparatus of FIG. 5 described above. The present magnetic recording and reproducing apparatus is modified such that the switch circuit 38 is provided at a next stage to the de-emphasis circuit 22. Consequently, a fixed level signal outputted from the level signal generator 37 and a reproduction FM demodulated signal outputted from the de-emphasis circuit 22 are alternatively selected by the switch circuit 38 which is controlled in accordance with a PCM region signal outputted from the PCM region signal generator 35. Also with the modified magnetic recording and reproducing apparatus, such a fixed level signal of a gray level as shown by the waveform (a) of FIG. 9 can be obtained.

Figure 7:
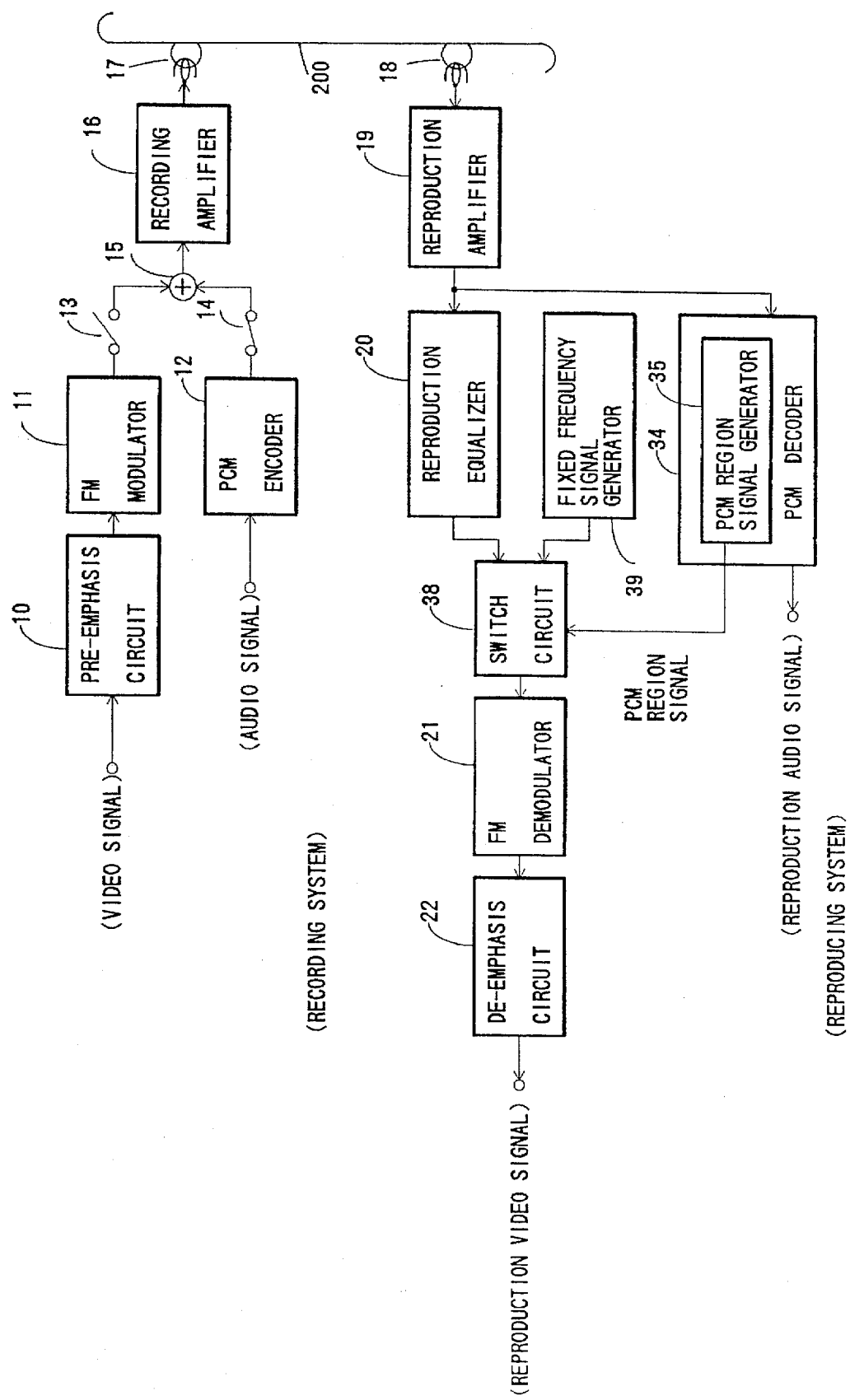
FIG. 7 is a similar view but showing another modification to the magnetic recording and reproducing apparatus of FIG. 5.
Figure 8:
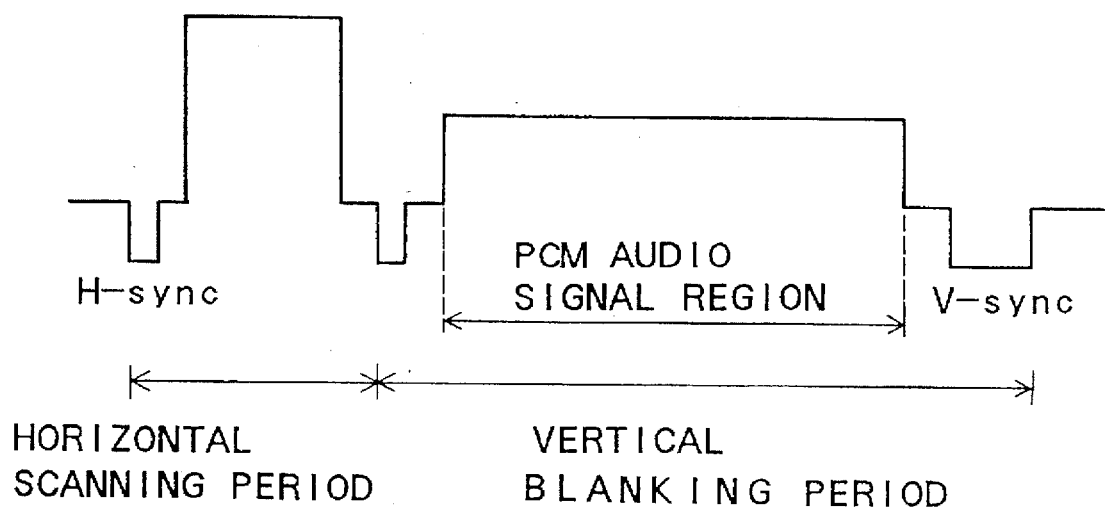
FIG. 8 is a waveform diagram showing a waveform of an output reproduction video signal of the magnetic recording and reproducing apparatus of FIG. 5.

Referring now to FIG. 7, there is shown another modification to the magnetic recording and reproducing apparatus of FIG. 5. The present magnetic recording and reproducing apparatus is modified such that one of a fixed frequency signal outputted from a fixed frequency signal generator 39 and a reproduction signal which is outputted from the reproduction equalizer 20 and is not yet in an FM demodulated condition is selected by the switch circuit 38 which is controlled in accordance with a PCM region signal received from the PCM region signal generator 35 in the PCM decoder 34. Here, the fixed frequency signal generator 39 generates a signal of such a frequency with which a signal of a gray level may be obtained by FM demodulation thereof. The signal selected by the switch circuit 38 is subsequently processed successively by the FM demodulator 21 and de-emphasis circuit 22 to obtain a reproduction video signal which presents a fixed gray level in a PCM audio signal region.

The modified magnetic recording and reproducing apparatus of FIGS. 6 and 7 described above are advantageous similarly to the magnetic recording and reproducing apparatus of FIG. 5.

Figure 10:
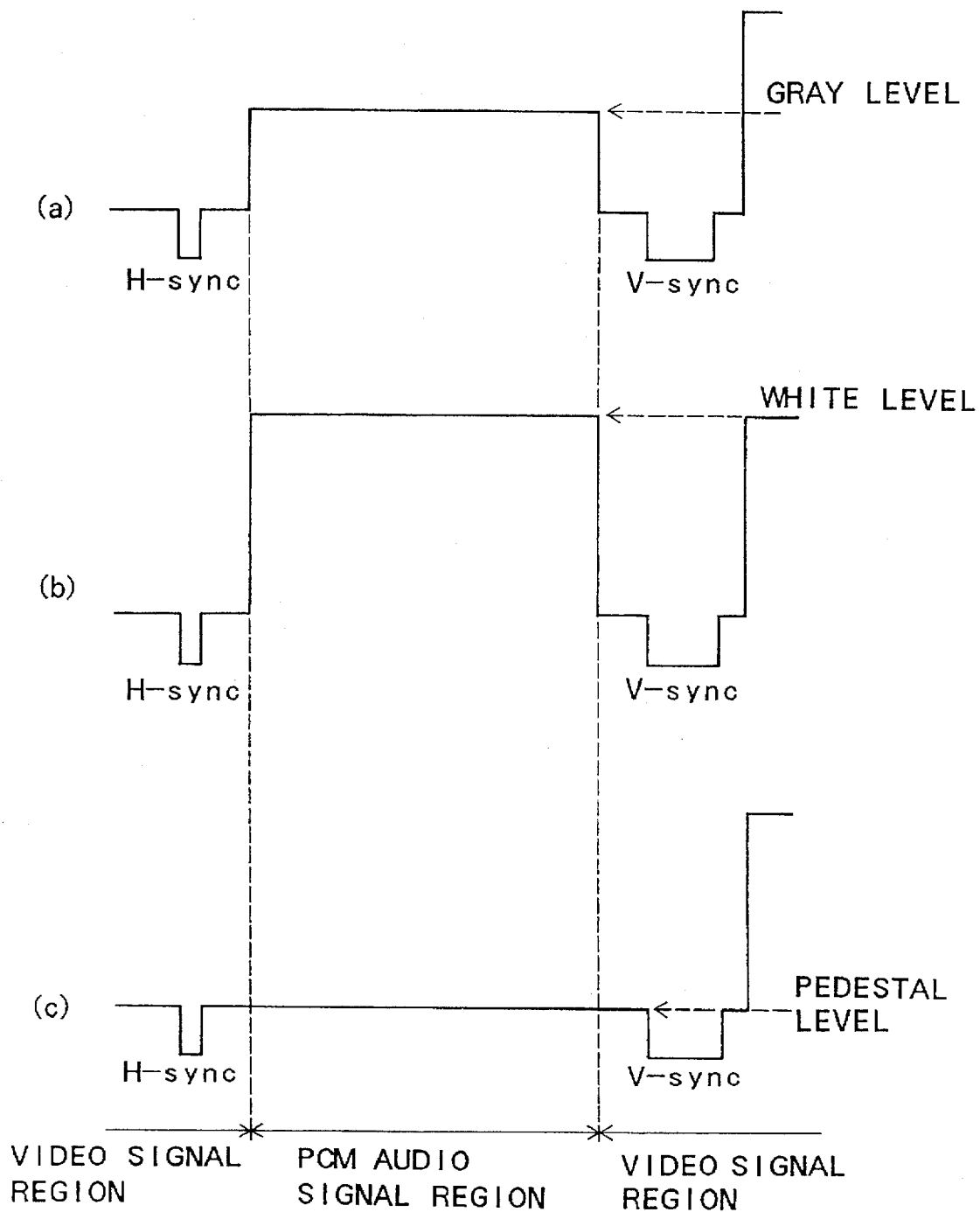
FIG. 10 is a waveform diagram showing a waveform of an alternative output reproduction video signal of the magnetic recording and reproducing apparatus of FIG. 5.

It is to be noted that, while any of the magnetic recording and reproducing apparatus of FIGS. 5 to 7 is constructed such that a fixed level signal or a fixed frequency signal from which a signal of a gray level will be obtained by de-emphasis thereof is generated by the level signal generator 37 or fixed frequency signal generator 39, such level signal generator 37 or fixed frequency signal generator 39 may otherwise generate a signal from which a signal of such a white level as shown by a waveform (b) in FIG. 10 or such a pedestal level as shown by another waveform (c) in FIG. 10 is obtained. Or else, similar effects can be achieved even where such level signal generator 37 or fixed frequency signal generator 39 generates a signal from which a signal having a fixed level between a pedestal level and a white level of a video signal in a PCM audio signal region of a reproduction video signal is obtained.

Further, while any of the magnetic recording and reproducing apparatus of FIGS. 5 to 7 is constructed such that the PCM region signal generator 35 generates a pulse which presents a high level in a video signal region but presents a low level in a PCM audio signal region, it may otherwise be constructed such that the PCM region signal generator 35 generates a pulse having an inverted phase such that it presents a low level in a video signal region but presents a high level in a PCM audio signal region while the switch circuit 38 is constructed such that it may select a suitable signal in either of a video signal region and a PCM audio signal region. Also with the alternative construction, similar effects to those of the magnetic recording and reproducing apparatus of FIGS. 5 to 7 described above can be achieved.

Further, while any of the magnetic recording and reproducing apparatus of FIGS. 5 to 7 is constructed such that a PCM audio signal is inserted into a fixed portion of a vertical blanking period of an FM modulated video signal, a PCM audio signal may be inserted in some other way into an FM modulated video signal. For example, a PCM audio signal may be inserted into a horizontal blanking period of an FM modulated video signal. Or else, in a magnetic recording and reproducing apparatus of the type wherein a video signal is separated into a plurality of segments and recorded onto and reproduced from a magnetic tape, a PCM audio signal may be inserted into a segment blanking period. In any case, if a PCM region signal generator can, upon reproduction, identify a PCM audio signal region of a reproduction signal and generate a controlling signal representative of such region, then similar effects to those of the magnetic recording and reproducing apparatus of FIGS. 5 to 7 can be attained.

Figure 11:
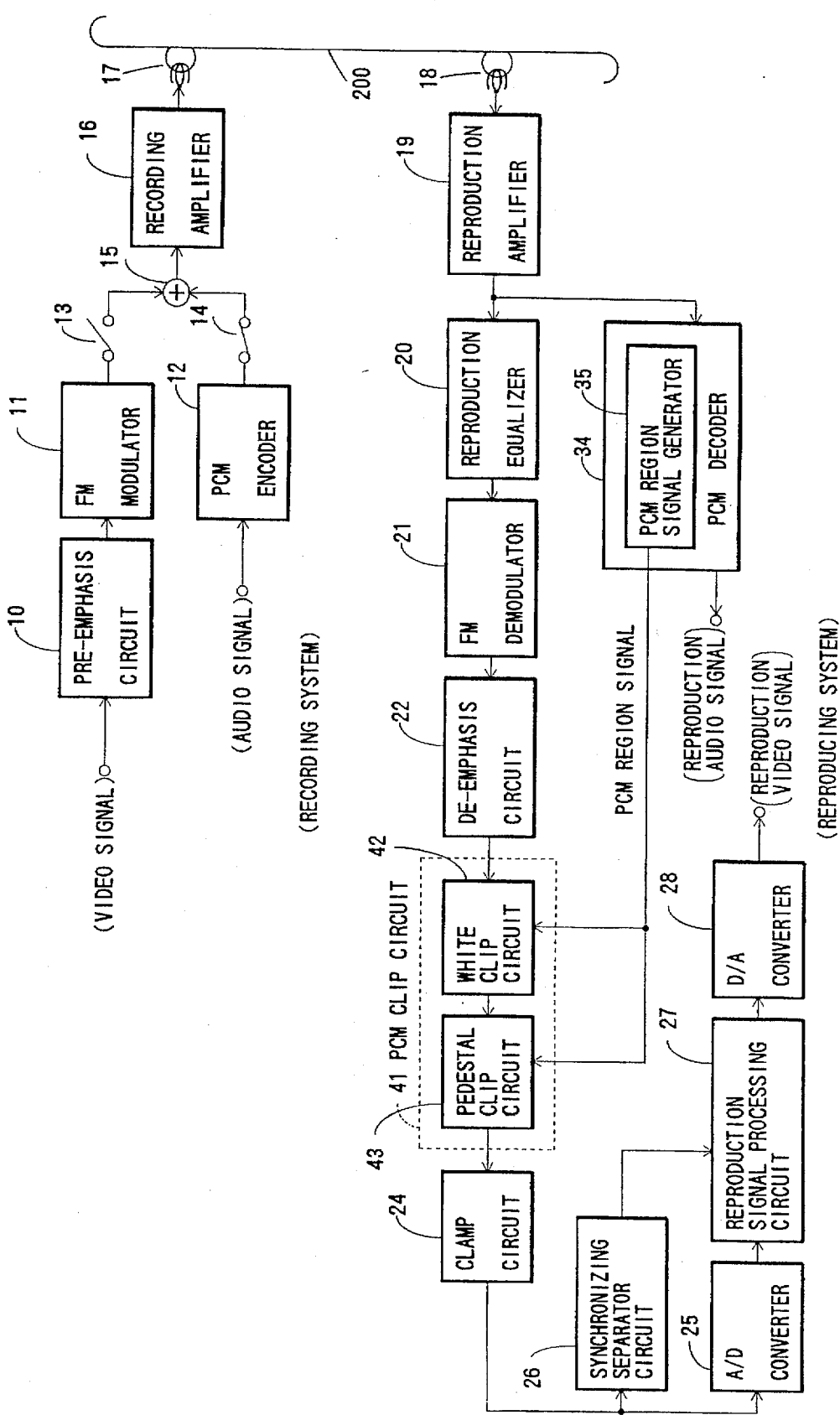
FIG. 11 is a block diagram of another magnetic recording and reproducing apparatus showing a third preferred embodiment of the present invention.

Referring now to FIG. 11, there is shown a magnetic recording and reproducing apparatus according to a third preferred embodiment of the present invention. The magnetic recording and reproducing apparatus shown includes a recording system which is similar to the recording system of the magnetic recording and reproducing apparatus of the first embodiment described hereinabove with reference to FIG. 1. The magnetic recording and reproducing apparatus further includes a reproducing system which includes a reproducing video head 18, a reproduction amplifier 19, a reproduction equalizer 20, an FM demodulator 21, a de-emphasis circuit 22 and a PCM decoder 34 including a PCM region signal generator 35 therein, similarly to the reproducing system of the magnetic recording and reproducing apparatus of FIG. 1. The magnetic recording and reproducing apparatus further includes a clamp circuit 24, an analog to digital (A/D) converter 25 for converting a reproduction video signal from an analog signal into a digital signal, a synchronizing separator circuit 26 for separating a synchronizing signal from a reproduction video signal, a reproduction signal processing circuit 27 for processing a reproduction signal by time base correction, dropout compensation and so forth in accordance with a synchronizing separation signal from the synchronizing separator circuit 26, and a digital to analog (D/A) converter 28, similarly to the conventional magnetic recording and reproducing apparatus described hereinabove with reference to FIG. 52.

The reproducing system of the magnetic recording and reproducing apparatus further includes a PCM clip circuit 41 for clipping upper end portions and lower end portions of noise in a PCM audio signal region of an FM demodulated reproduction video signal in accordance with a PCM region signal received from the PCM region signal generator 35 in the PCM decoder 34. The PCM clip circuit 41 includes a white clip circuit 42 for clipping upper end portions of noise at a white level and a pedestal clip circuit 43 for clipping lower end portions of noise at a pedestal level.

The magnetic recording and reproducing apparatus operates in the following manner. In particular, the recording system operates in a similar manner to the recording system of the magnetic recording and reproducing apparatus of FIG. 1. Meanwhile, in the reproducing system, the components 18, 19, 20, 21, 22, 34 and 35 thereof operate in a similar manner to those of the reproducing system of the magnetic recording and reproducing apparatus of FIG. 1 described hereinabove.

Accordingly, similarly as described hereinabove, if, upon reproduction, a reproduction FM video signal and a PCM audio signal mixed with such reproduction FM video signal are FM demodulated as they are by the FM demodulator 21 and then passed through the de-emphasis circuit 22, the reproduction video signal from the de-emphasis circuit 22 will present such an output signal waveform as shown in FIG. 54 as if it includes noises in a PCM audio signal region.

Figure 12:
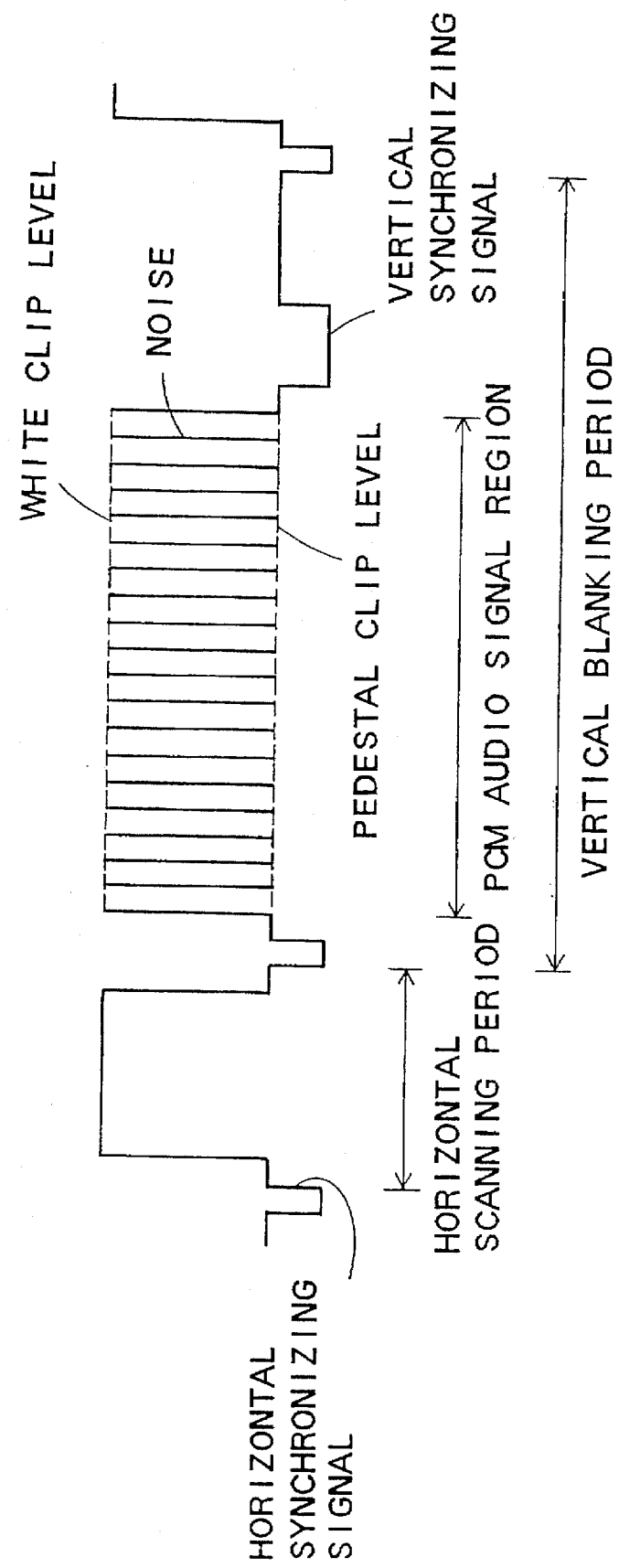
FIG. 12 is a waveform diagram showing a waveform of an output reproduction video signal of the magnetic recording and reproducing apparatus of FIG. 11.

Thus, a reproduction video signal outputted from the de-emphasis circuit 22 is inputted to the PCM clip circuit 41 the clip level of which can be controlled in accordance with a PCM region signal representative of a PCM audio signal region. Such PCM region signal is generated by the PCM region signal generator 35 in the PCM decoder 34 and is transmitted to the PCM clip circuit 41, and the PCM clip circuit 41 clips upper end portions of noise in a PCM audio signal region of the reproduction video signal outputted from the de-emphasis circuit 22 at a white level or so and then clips lower end portions of such noise at a pedestal level or so as seen from FIG. 12.

As described above, the PCM clip circuit 41 includes the white clip circuit 42 for clipping a portion of a reproduction video signal higher than a white level in a PCM audio signal region of such reproduction video signal and the pedestal clip circuit 43 for clipping another portion of such reproduction video signal below a pedestal level. The white clip circuit 42 and pedestal clip circuit 43 may be constructed in such a manner as shown, for example, in FIGS. 12a and 12b, respectively.

Figure 13A:
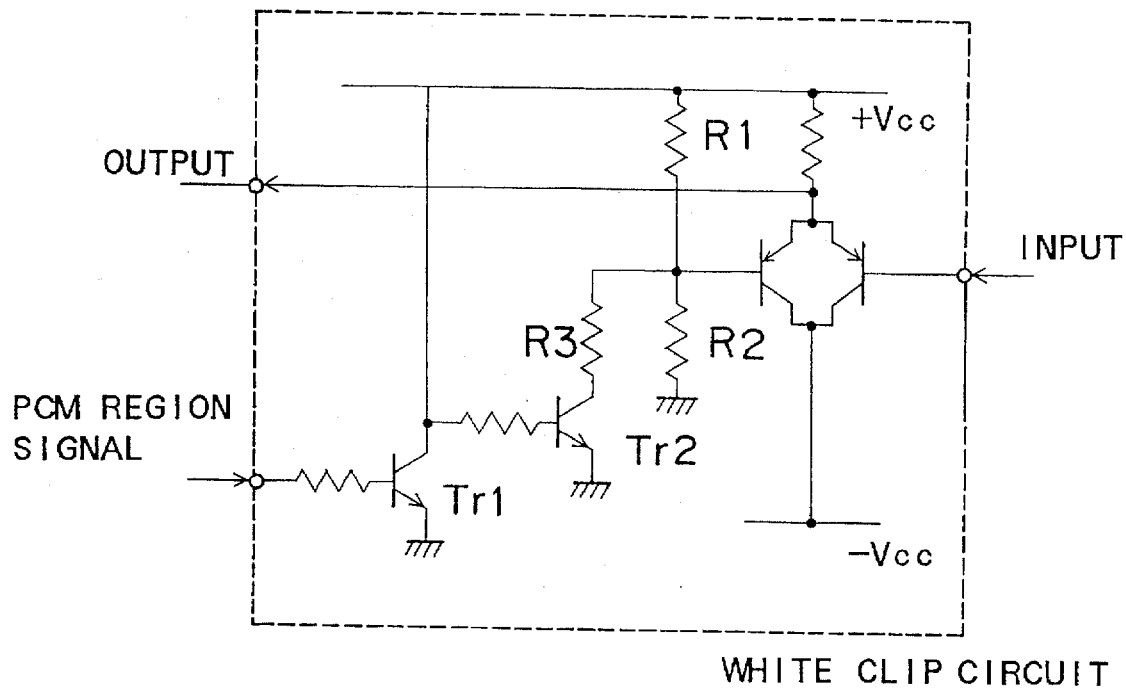
FIGS. 13a and 13b are circuit diagrams showing a white clip circuit and a pedestal clip circuit, respectively, of the magnetic recording and reproducing apparatus of FIG. 11.

Thus, if the PCM region signal generator 35 in the PCM decoder 34 generates, for example, such a pulse which presents a low level in a PCM audio signal region but presents a high level in a video signal region as shown by a waveform (e) in FIG. 14 and delivers it to the PCM clip circuit 41, in the white clip circuit 42 shown in FIG. 13a in the PCM clip circuit 41, a transistor $Tr_1$ does not conduct but another transistor $Tr_2$ conducts in a PCM audio signal region, and consequently, the clip level of the white clip circuit 42 depends upon resistances of resistors $R_1$, $R_2$ and $R_3$. On the other hand, in a video signal region, the transistor $Tr_1$ conducts but the transistor $Tr_2$ does not conduct, and consequently, the clip level depends upon the resistances of the resistors $R_1$ and $R_2$. Accordingly, the resistors $R_1$, $R_2$ and $R_3$ are set to a resistance value such that the clip level in a PCM audio signal region may be equal to a white level b shown in FIG. 14 but the clip level in a video signal region may be a level a higher than such white level so that it may have no influence on a level of a video signal.

Figure 13B:
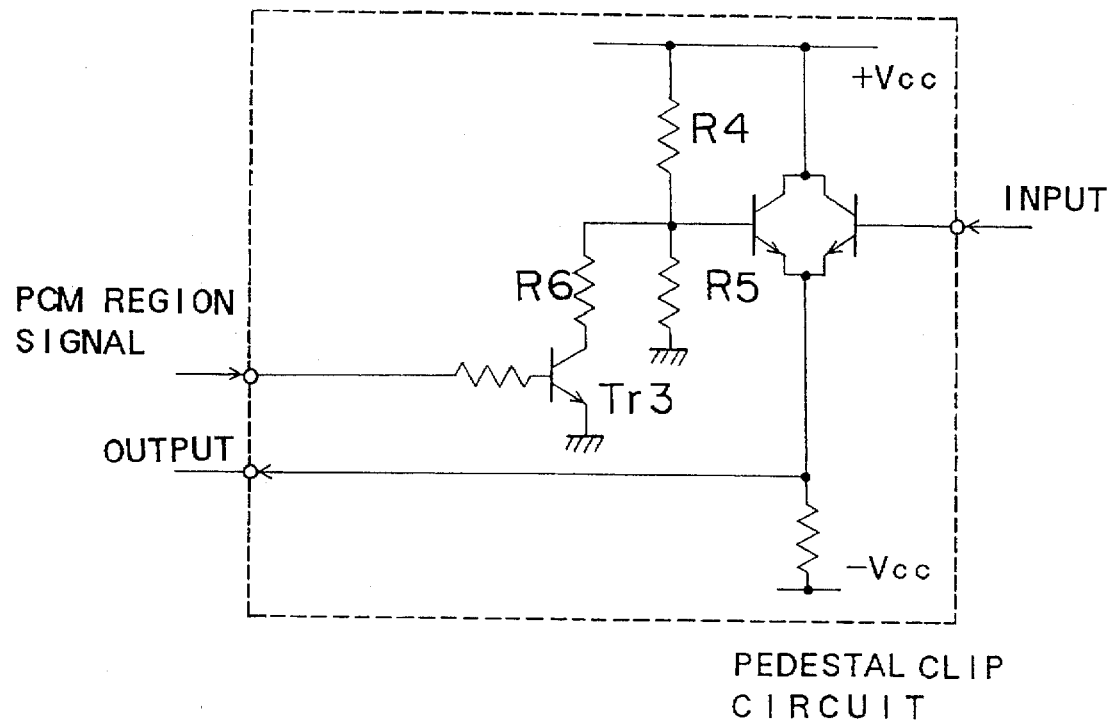

On the other hand, in the pedestal clip circuit 43 shown in FIG. 13b in the PCM clip circuit 41, a transistor $Tr_3$ does not conduct, and consequently, the clip level of the pedestal clip circuit 43 depends upon resistances of resistors $R_4$ and $R_5$. On the other hand, in a video signal region, the transistor $Tr_3$ conducts, the clip level depends upon the resistances of the resistors $R_4$, $R_5$ and $R_6$. Accordingly, the resistors $R_4$, $R_5$ and $R_6$ are set to a resistance value such that the clip level in a PCM audio signal region may be equal to a white level c shown in FIG. 14 but the clip level in a video signal region may be a level substantially equal to a level of an end of a synchronization signal so that it may clip a signal which has been dropped below a synchronization signal end level so as to allow the signal to be inputted, for example, to the reproduction analog to digital converter 25.

Where such construction is employed for the PCM clip circuit 41, upper end portions and lower end portions of noise of an FM demodulated reproduction video signal in a PCM audio signal region can be clipped, and consequently, synchronization separation of a reproduction video signal can be performed accurately. Consequently, the clamp circuit 24 at a next stage can operate normally, and sags can be reduced.

The reproduction video signal outputted from the PCM clip circuit 41 is then inputted to the clamp circuit 24, at which it is clamped at a predetermined dc voltage level. The thus clamped reproduction video signal from the clamp circuit 24 is then converted from an analog signal to a digital signal by the A/D converter 25 and then transmitted to the reproduction signal processing circuit 27. The clamped reproduction video signal is also transmitted to the synchronizing separator circuit 26, at which a synchronizing signal is separated. The reproduction signal processing circuit 27 performs reproduction signal processing such as time base correction and dropout compensation of the reproduction video signal from the A/D converter 25 in accordance with a synchronizing separation signal outputted from the synchronizing separator circuit 26, and an output reproduction video signal of the reproduction signal processing circuit 27 is converted from a digital signal into an analog signal by the D/A converter 28 and outputted as a reproduction output video signal of the reproducing system. Consequently, a good reproduction output video signal can be obtained from the reproducing system of the magnetic recording and reproducing apparatus.

It is to be noted that, while the PCM clip circuit 41 is constructed from such white clip circuit 42 and pedestal clip circuit 43 as shown in FIGS. 13a and 13b, respectively, similar effects can be achieved if a magnetic recording and reproducing apparatus has such construction that it comprises a PCM region signal generator for identifying, upon reproduction, a region of a PCM audio signal mixed in a reproduction signal and generating a control signal representative of such PCM audio signal region and a clip circuit having a clip level capable of being controlled by such controlling signal, and upper end portions and lower end portions of noise of a reproduction video signal in a PCM audio signal region are clipped at such levels at which sags can be reduced and synchronizing separation of a reproduction video signal can be performed accurately.

Further, while a PCM audio signal is inserted into a vertical blanking period of an FM modulated video signal in accordance with a suitable changing over operation of the switches 13 and 14 in the magnetic recording and reproducing apparatus of FIG. 11, it may be inserted in some other way into an FM modulated video signal. For example, a PCM audio signal may be inserted in several separate parts into a horizontal blanking period of an FM modulated video signal. Further, also in the case wherein a PCM audio signal for one field is inserted in several parts into a segment blanking period and a vertical blanking period of an FM modulated video signal and recorded onto and then reproduced from a magnetic tape in a video tape recorder of the type wherein a video signal for one field is separated into a plurality of segments and recorded onto and reproduced from a magnetic tape, if such construction is employed that a region of a PCM audio signal in a reproduction signal is identified to generate a control signal representative of such PCM audio signal region and it comprises a clip circuit having a clip level capable of being controlled by such control signal so that upper end portions and lower end portions of noise of a reproduction video signal in a PCM audio signal region can be clipped at such levels at which sags can be reduced and synchronizing separation of a reproduction video signal can be performed accurately, then similar effects can be exhibited with such a recording format wherein a PCM audio signal is recorded in a segment blanking period.

Further, while a PCM audio signal mixed in a reproduction FM video signal is FM demodulated as it is as a reproduction signal upon reproduction in the magnetic recording and reproducing apparatus of FIG. 11, even with a possible alternate construction wherein an FM video signal and a PCM audio signal of a reproduction signal are separated from each other before such FM video signal is FM demodulated, a reproduction video signal after FM demodulation will include such noise in a PCM audio signal region as seen in FIG. 54. Accordingly, if such construction is employed similarly as in the magnetic recording and reproducing apparatus of FIG. 11 that it comprises a clip circuit having a clip level capable of being controlled in accordance with a PCM region signal outputted from a PCM region signal generator so that upper end portions and lower end portions of noise in a PCM audio signal region of a reproduction video signal after FM demodulation can be clipped at such levels at which sags can be reduced and synchronizing separation of a reproduction video signal can be performed accurately, then similar effects to those of the magnetic recording and reproducing apparatus of FIG. 11 can be attained.

Furthermore, while the PCM clip circuit 41 is constructed such that an input signal thereto is processed first by the white clip circuit 42 and then by the pedestal clip circuit 43, similar effects can be exhibited where the PCM clip circuit 41 is constructed in a different manner such that an input signal thereto is processed first by the pedestal clip circuit 43 and then by the white clip circuit 42.

Referring now to FIG. 15, there is shown a modification to the magnetic recording and reproducing apparatus of FIG. 11. The present magnetic recording and reproducing apparatus includes, in place of the PCM decoder 34 including the PCM region signal generator 35 of the magnetic recording and reproducing apparatus of FIG. 11, a PCM decoder 46 including a PCM region signal generator 47 which accurately identifies a PCM audio signal region of a reproduction signal and generates a PCM region signal representative of such PCM audio signal region. The present magnetic recording and reproducing apparatus further includes, in place of the PCM clip circuit 41 of the magnetic recording and reproducing apparatus of FIG. 11, a signal generator 48 for generating a sine wave having, for example, a fixed frequency f and an amplitude A and for overlapping the thus generated sine wave with a gray level of a video signal, and a switch circuit 29 for selecting one of a reproduction video signal outputted from the de-emphasis circuit 22 and an output of the signal generator 48 in accordance with a PCM region signal outputted from the PCM region signal generator 47.

The magnetic recording and reproducing apparatus operates in the following manner. In particular, the recording system operates in a similar manner to the recording system of the magnetic recording and reproducing apparatus of FIG. 11. Meanwhile, in the reproducing system, the components 18, 19, 20, 21, 22, 46 and 47 thereof operate in a similar manner to the components 18, 19, 20, 21, 22, 34 and 35, respectively, of the reproducing system of the magnetic recording and reproducing apparatus of FIG. 11 described hereinabove.

Accordingly, similarly as described hereinabove, if, upon reproduction, a reproduction FM video signal and a PCM audio signal mixed with such reproduction FM video signal are FM demodulated as they are by the FM demodulator 21 and then passed through the de-emphasis circuit 22, the reproduction video signal from the de-emphasis circuit 22 will present such an output signal waveform as shown in FIG. 54 as if it includes noises in a PCM audio signal region.

Figure 17:
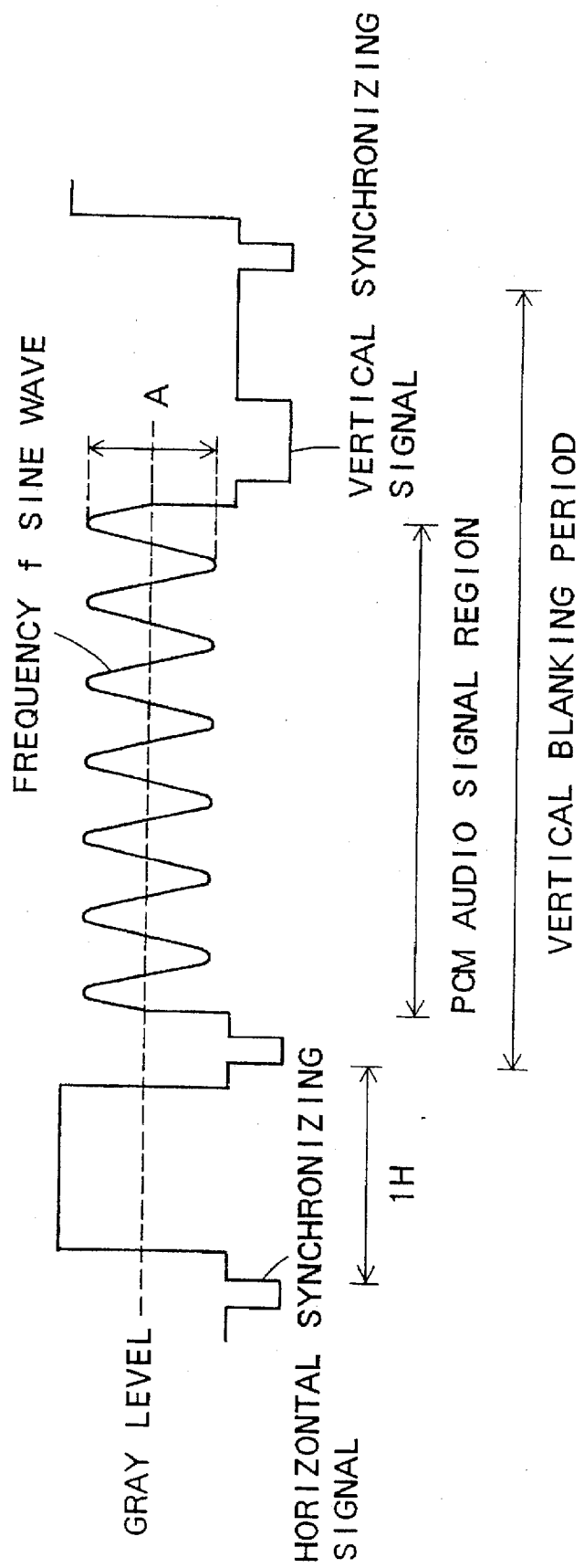
FIG. 17 is a waveform diagram showing a waveform of an output reproduction video signal of the modified magnetic recording and reproducing apparatus shown in FIG. 15 or 16.

Thus, a sine wave having, for example, a fixed frequency f and an amplitude A is generated and overlapped with a gray level of a video signal by the signal generator 48, and one of an output of the signal generator 48 and a reproduction video signal outputted from the de-emphasis circuit 22 is selected by the switch circuit 49 which is changed over in accordance with a PCM region signal received from the PCM region signal generator 47 in the PCM decoder 46 and representative of a PCM audio signal region. Thus, such a signal as shown by a waveform in FIG. 17 is outputted from the switch circuit 49.

Figure 18:
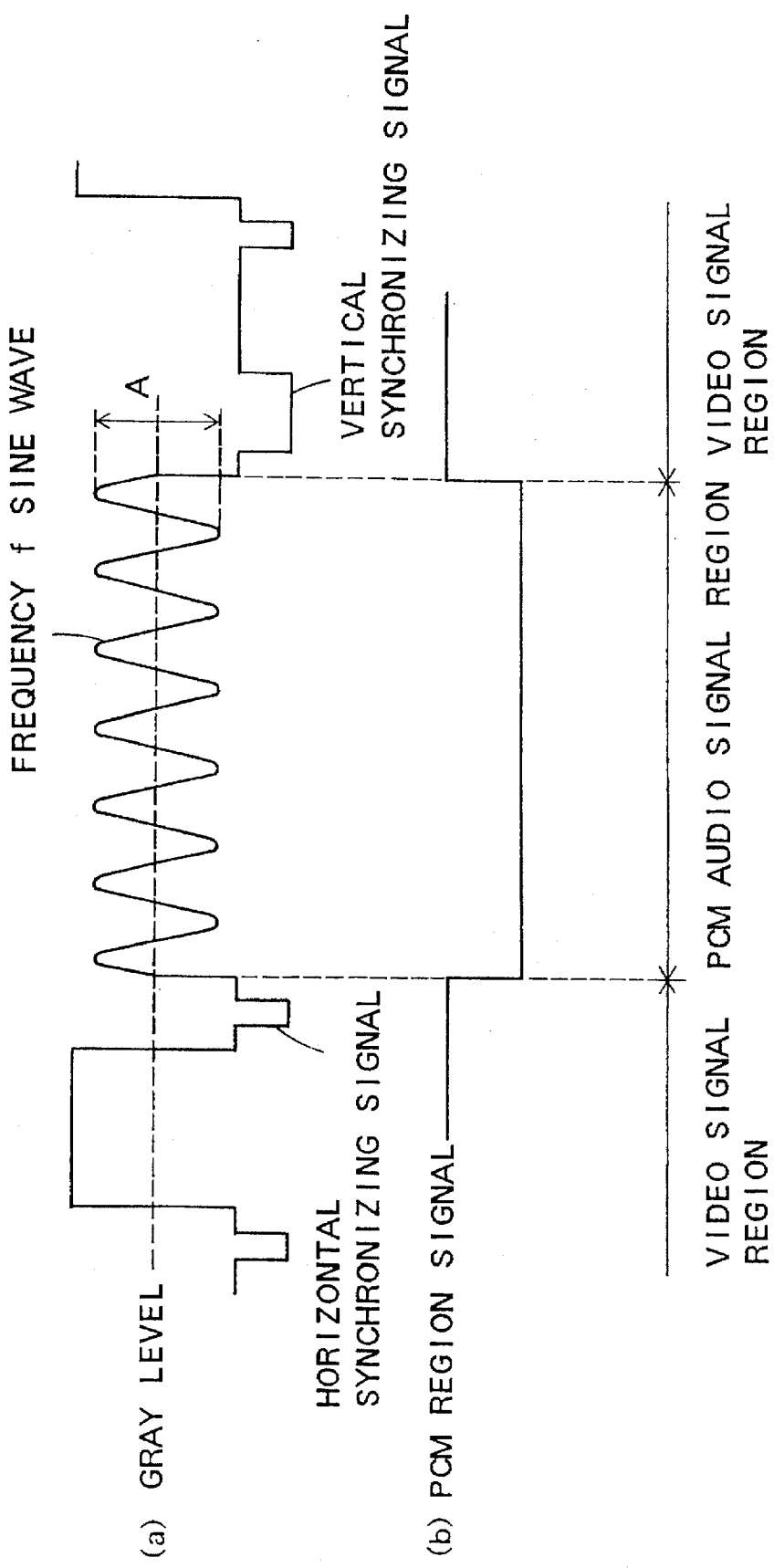
FIG. 18 is a waveform diagram illustrating operation of a PCM region signal generator and a switch circuit of the modified magnetic recording and reproducing apparatus shown in FIG. 15 or 16.

In particular, if the PCM region signal generator 47 in the PCM decoder 46 generates, for example, such a pulse which presents a low level in a PCM audio signal region but presents a high level in a video signal region as shown by a waveform (b) in FIG. 18 and delivers it to the switch circuit 49, the switch circuit 49 selects, in a period of a video signal region in which the pulse presents a high level, a reproduction video signal transmitted thereto from the de-emphasis circuit 22, but selects, in another period of a PCM audio signal region in which the pulse presents a low level, an output of the signal generator 48. Accordingly, a signal in a PCM audio signal region at the output of the switch circuit 49 is such a sine wave signal overlapped with a gray level and having a frequency f and an amplitude A as shown by a waveform (a) in FIG. 18.

Where such construction is employed, a signal in a PCM audio signal region of an FM demodulated reproduction video signal can be formed as a sine wave signal overlapped with a gray level and having the fixed frequency f and the amplitude A, and consequently, synchronization separation of a reproduction video signal can be performed accurately and the clamp circuit 24 at a next stage can operate normally. Further, since a signal selected in a PCM audio signal region does not include only a dc level signal, sags can be reduced.

The reproduction video signal outputted from the switch circuit 49 is then inputted to the clamp circuit 24, at which an end portion of a synchronizing signal thereof is clamped at a predetermined dc voltage level. The thus clamped reproduction video signal from the clamp circuit 24 is then converted from an analog signal to a digital signal by the A/D converter 25 and transmitted to the reproduction signal processing circuit 27. The clamped reproduction video signal is transmitted also to the synchronizing separator circuit 26, at which a synchronizing signal is separated. The reproduction signal processing circuit 27 performs reproduction signal processing such as time base correction and dropout compensation of the reproduction video signal from the A/D converter 25 in accordance with a synchronizing separation signal outputted from the synchronizing separator circuit 26, and an output reproduction video signal of the reproduction signal processing circuit 27 is converted from a digital signal into an analog signal by the D/A converter 28 and outputted as a reproduction output video signal of the reproducing system. Consequently, a good reproduction output video signal can be obtained from the reproducing system of the magnetic recording and reproducing apparatus.

It is to be noted that, while the signal generator 48 generates a sine wave having a frequency f and an amplitude A and overlaps it with a gray level, similar effects can be obtained by any other means which generates a signal different from a fixed dc current level signal and having such a frequency at which sags can be reduced between a pedestal level and a white level.

Further, while the magnetic recording and reproducing apparatus of FIG. 15 is constructed such that the PCM region signal generator 47 generates a pulse which presents a high level in a video signal region but presents a low level in a PCM audio signal region, it may otherwise be constructed such that the PCM region signal generator 47 generates a pulse having an inverted phase such that it presents a low level in a video signal region but presents a high level in a PCM audio signal region while the switch circuit 49 is constructed such that it may select a reproduction FM demodulated signal from the de-emphasis circuit 22 in a video signal region but select an output of the signal generator 48 in a PCM audio signal region in accordance with a PCM region signal outputted from the PCM region signal generator 47. Also with the alternative construction, similar effects to those of the magnetic recording and reproducing apparatus of FIG. 15 described above can be achieved.

Further, while a PCM audio signal is inserted into a vertical blanking period of an FM modulated video signal in accordance with a suitable changing over operation of the switches 13 and 14 in the modified magnetic recording and reproducing apparatus of FIG. 15, it may be inserted in some other way into an FM modulated video signal. For example, a PCM audio signal may be inserted in several separate parts into a horizontal blanking period of an FM modulated video signal. Further, also in the case wherein a PCM audio signal for one field is inserted in several parts into a segment blanking period and a vertical blanking period of an FM modulated video signal and recorded onto and then reproduced from a magnetic tape in a video tape recorder of the type wherein a video signal for one field is separated into a plurality of segments and recorded onto and reproduced from a magnetic tape, if such construction is employed that a region of a PCM audio signal in a reproduction signal is identified to generate a control signal representative of such PCM audio signal region and the switch circuit 49 selects, in accordance with such controlling signal, a reproduction FM demodulated signal in a video signal region but selects an output of the signal generator 48 in a PCM audio signal region, similar effects can be exhibited with such a recording format wherein a PCM audio signal is recorded in a segment blanking period.

Further, while a PCM audio signal mixed in a reproduction FM video signal is FM demodulated as it is as a reproduction signal upon reproduction in the modified magnetic recording and reproducing apparatus of FIG. 15, even with a possible alternate construction wherein an FM video signal and a PCM audio signal in a reproduction signal are separated from each other before such FM video signal is FM demodulated, a reproduction video signal after FM demodulation will include such noise in a PCM audio signal region as seen in FIG. 54. Accordingly, if such construction is employed similarly as in the modified magnetic recording and reproducing apparatus of FIG. 15 that the switch circuit is changed over in accordance with a PCM region signal outputted from the PCM region signal generator.

Referring now to FIG. 16, there is shown a modification to the modified magnetic recording and reproducing apparatus of FIG. 15. The present magnetic recording and reproducing apparatus is modified such that the switch circuit 49 is interposed between the FM demodulator 21 and the de-emphasis circuit 22 such that it may select one of a reproduction FM demodulated signal outputted from the FM demodulator 21 and an output of a signal generator 50 similar to the signal generator 48 and supply the thus selected signal to the de-emphasis circuit 22. Similar effects to those of the magnetic recording and reproducing apparatus of FIG. 15 can be achieved also with the present modified magnetic recording and reproducing apparatus.

Figure 19:
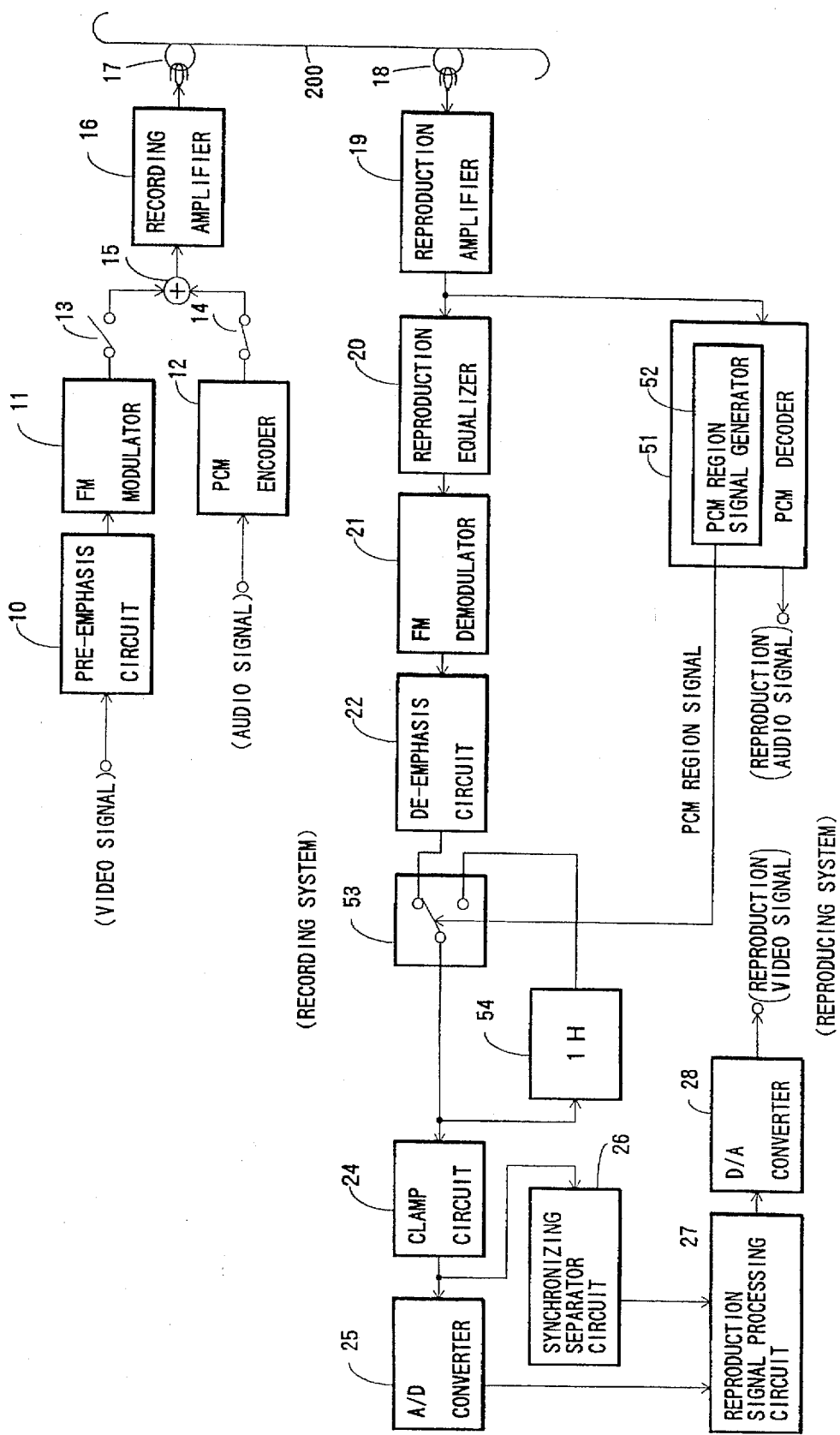
FIG. 19 is a block diagram showing another modification to the magnetic recording and reproducing apparatus of FIG. 11.

Referring now to FIG. 19, there is shown another modification to the magnetic recording and reproducing apparatus shown in FIG. 11. The present magnetic recording and reproducing apparatus is modified such that it includes a PCM decoder 51 including a PCM region signal generator 52 therein in place of the PCM decoder 34 including the PCM region signal generator 35 therein described above, and also includes a switch circuit 53 and a delay element 54 for delaying a signal for one horizontal scanning period (1 H) in place of the PCM clip circuit 41. The PCM region signal generator 52 detects a PCM audio signal for one field period inserted in a vertical blanking period of a reproduction signal, performs error correction and de-shuffling for the thus detected PCM audio signal and outputs an original audio signal.

The magnetic recording and reproducing apparatus operates in the following manner. In particular, the recording system operates in a similar manner to the recording system of the magnetic recording and reproducing apparatus of FIG. 11. Meanwhile, in the reproducing system, the components 18, 19, 20, 21, 22, 51 and 52 thereof operate in a similar manner to the components 18, 19, 20, 21, 22, 34 and 35, respectively, of the reproducing system of the magnetic recording and reproducing apparatus of FIG. 11 described hereinabove.

Accordingly, similarly as described hereinabove, if, upon reproduction, a reproduction FM video signal and a PCM audio signal mixed with such reproduction FM video signal are FM demodulated as they are by the FM demodulator 21 and then passed through the de-emphasis circuit 22, then the reproduction video signal from the de-emphasis circuit 22 will present such an output signal waveform as shown in FIG. 54 as if it includes noises in a PCM audio signal region.

Thus, the reproduction video signal outputted from the de-emphasis circuit 22 is transmitted to the switch circuit 53, by means of which a signal in a PCM audio signal region is replaced, as seen from a waveform (c) in FIG. 20, by another signal which includes a repetition of data of a last line of a preceding field to the PCM audio signal region, in accordance with a PCM region signal generated by and transmitted thereto from the PCM region signal generator 52 in the PCM decoder 51.

In particular, if the PCM region signal generator 52 in the PCM decoder 51 generates, for example, such a pulse which presents a low level in a PCM audio signal region but presents a high level in a video signal region as shown by a waveform (b) in FIG. 20 and delivers it to the switch circuit 53, then the switch circuit 53 selects, in a video signal region in which the pulse presents a high level, a reproduction video signal outputted from the de-emphasis circuit 22 and sends it as it is to the clamp circuit 24. On the other hand, in a period of a PCM audio signal region in which the pulse presents a low level, the switch circuit 53 is changed over so that an output of the delay element 54 having a delay time equal to one horizontal scanning period is selected. Since data of a last line of a preceding field to the PCM audio signal region are outputted from the delay element 54, a signal in the PCM audio signal region presents such a waveform (c) as shown in FIG. 20 wherein data of the last line of the preceding field to the PCM audio signal region in which a PCM audio signal is inserted are repeated.

Since a reproduction video signal outputted from the switch circuit 53 and inputted to the clamp circuit 24 has a PCM audio signal region in which last data of preceding field to a vertical blanking period in which a PCM audio signal is inserted are inserted repetitively as seen from the waveform (c) of FIG. 20, synchronization separation of a reproduction video signal can be performed accurately and the clamp circuit 24 at a next stage can operate normally. Further, since a synchronizing signal is added also to a signal in a PCM audio signal region, a signal in such PCM audio signal region can be clamped, and consequently, sags can be reduced.

A reproduction video signal outputted from the switch circuit 53 is then inputted to the clamp circuit 24, at which an end portion of a synchronizing signal thereof is clamped at a predetermined dc voltage level. The thus clamped reproduction video signal from the clamp circuit 24 is then converted from an analog signal to a digital signal by the A/D converter 25 and transmitted to the reproduction signal processing circuit 27. The clamped reproduction video signal is transmitted also to the synchronizing separator circuit 26, at which a synchronizing signal is separated. The reproduction signal processing circuit 27 performs reproduction signal processing such as time base correction and dropout compensation of the reproduction video signal from the A/D converter 25 in accordance with a synchronizing separation signal outputted from the synchronizing separator circuit 26, and an output reproduction video signal of the reproduction signal processing circuit 27 is converted from a digital signal into an analog signal by the D/A converter 28 and outputted as a reproduction output video signal of the reproducing system. Consequently, a good reproduction output video signal can be obtained from the reproducing system of the magnetic recording and reproducing apparatus.

It is to be noted that, while the delay element 54 has a delay time equal to 1 H, that is, one horizontal scanning period and data of a last line of a preceding field to a vertical blanking period in which a PCM audio signal is included are inserted repetitively into a PCM audio signal region, it need not have such specific delay time, but may have any other delay time which allows insertion of data several lines prior to a PCM audio signal region. Thus, similar effects can be exhibited if a signal in a PCM audio signal region is replaced by data of several lines in a preceding field other than the PCM audio signal region.

Further, while the magnetic recording and reproducing apparatus of FIG. 19 is constructed such that the PCM region signal generator 52 generates a pulse which presents a high level in a video signal region but presents a low level in a PCM audio signal region, it may otherwise be constructed such that the PCM region signal generator 47 generates a pulse having an inverted phase while a change over operation of the switch circuit 53 is controlled in accordance with a PCM region signal outputted from the PCM region signal generator 52. Also with the alternative construction, similar effects to those of the magnetic recording and reproducing apparatus of FIG. 15 described above can be achieved.

Further, while a PCM audio signal is inserted into a vertical blanking period of an FM modulated video signal in accordance with a suitable change over operation of the switches 13 and 14 in the modified magnetic recording and reproducing apparatus of FIG. 19, it may be inserted in some other way into an FM modulated video signal. For example, a PCM audio signal may be inserted in several separate parts into a horizontal blanking period of an FM modulated video signal. Further, also in the case wherein a PCM audio signal for one field is inserted in several parts into a segment blanking period and a vertical blanking period of an FM modulated video signal and recorded onto and then reproduced from a magnetic tape in a video tape recorder of the type wherein a video signal for one field is separated into a plurality of segments and recorded onto and reproduced from a magnetic tape, if such construction is employed that a region of a PCM audio signal in a reproduction signal is identified to generate a controlling signal representative of such PCM audio signal region and a switch circuit selects, in accordance with such controlling signal, a reproduction FM demodulated signal in a video signal region but selects an output of a delay element in a PCM audio signal region, similar effects can be exhibited with such a recording format wherein a PCM audio signal is recorded in a segment blanking period.

Further, while a PCM audio signal mixed in a reproduction FM video signal is FM demodulated as it is as a reproduction signal upon reproduction in the modified magnetic recording and reproducing apparatus of FIG. 19, even with a possible alternate construction wherein an, FM video signal and a PCM audio signal in a reproduction signal are separated from each other before such FM video signal is FM demodulated, a reproduction video signal after FM demodulation will include such noises in a PCM audio signal region as seen in FIG. 54. Accordingly, if such construction is employed similarly as in the modified magnetic recording and reproducing apparatus of FIG. 11 that the switch circuit is changed over in accordance with a PCM region signal outputted from the PCM region signal generator.

Figure 21:
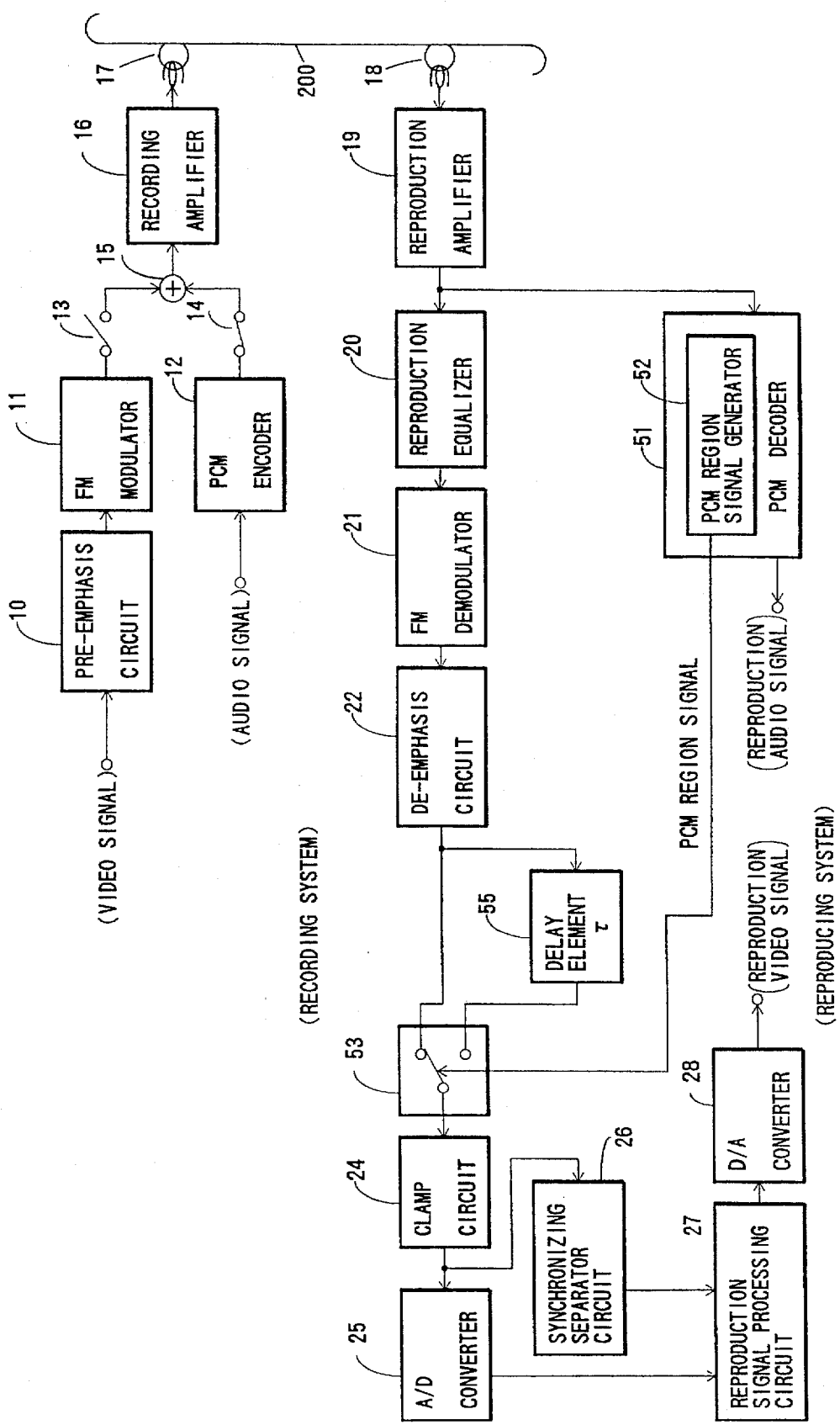
FIG. 21 is a block diagram showing a further modification to the magnetic recording and reproducing apparatus of FIG. 11.
Figure 22:
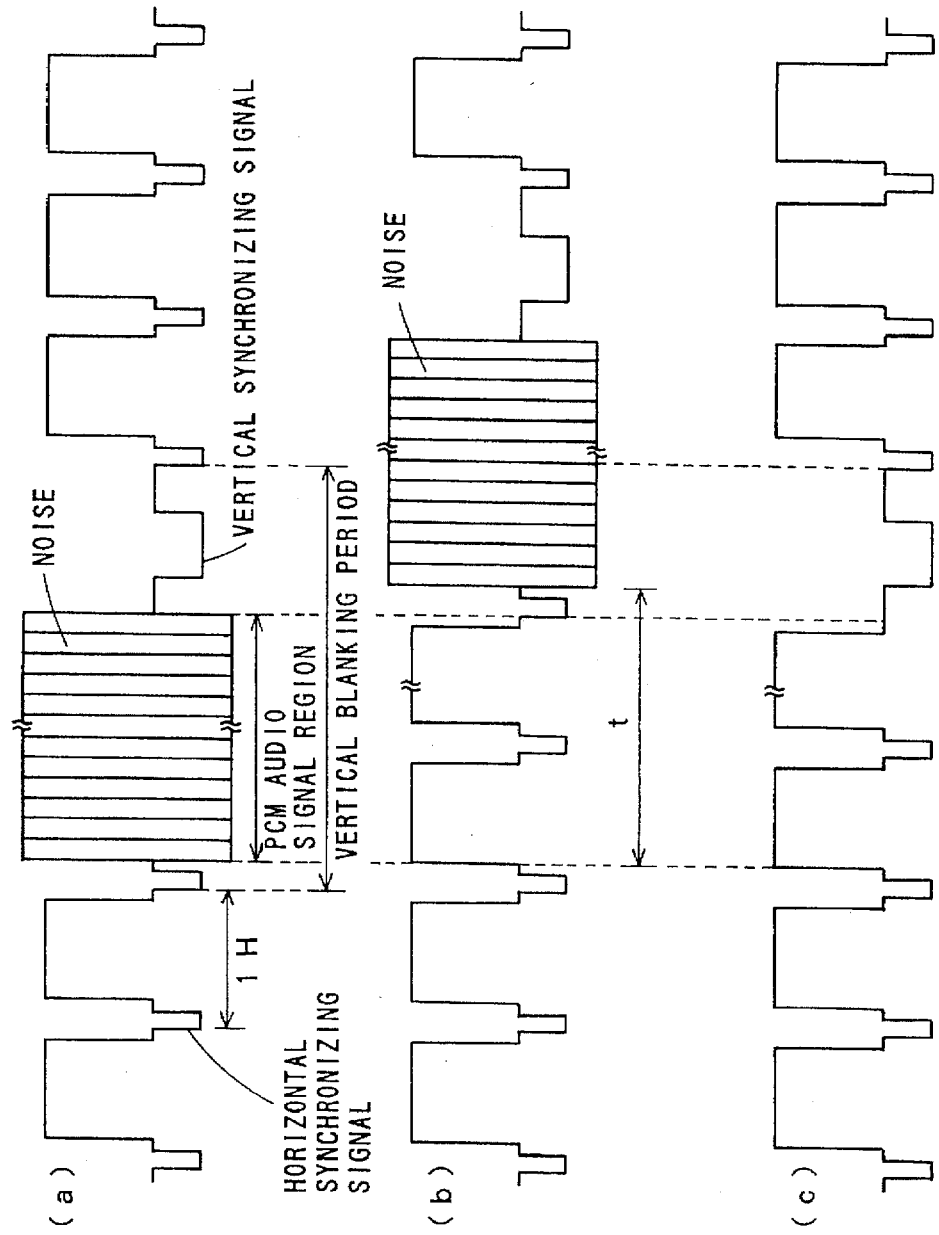
FIG. 22 is a waveform diagram illustrating operation of a PCM region signal generator, a delay element and a switch circuit of the modified magnetic recording and reproducing apparatus of FIG. 21.

Referring now to FIG. 21, there is shown a modification to the modified magnetic recording and reproducing apparatus shown in FIG. 19. The present magnetic recording and reproducing apparatus is modified such that a delay element 55 is provided in place of the delay element 54 and connected to the de-emphasis circuit 22 such that one of an output of the de-emphasis circuit 22 and an output of the delay element 55 may be selected by the switch circuit 53 in accordance with a PCM region signal from the PCM region signal generator 52 in the PCM decoder 51. Here, the delay element 55 has a delay time τ which is longer than a period of a PCM audio signal region as seen from waveforms (a) and (b) of FIG. 22. Thus, the switch circuit 53 selects, in accordance with a PCM region signal from the PCM region signal generator 52, one of a reproduction video signal (waveform (a) in FIG. 22) outputted from the de-emphasis circuit 22 and an output (waveform (b) in FIG. 22) of the delay element 55. Thus, the switch circuit 53 outputs such a waveform (c) as shown in FIG. 22 wherein a signal in a PCM audio signal region of a reproduction video signal is replaced by data preceding by an interval of time equal to a period of a PCM audio signal region of the preceding field.

Figure 23:
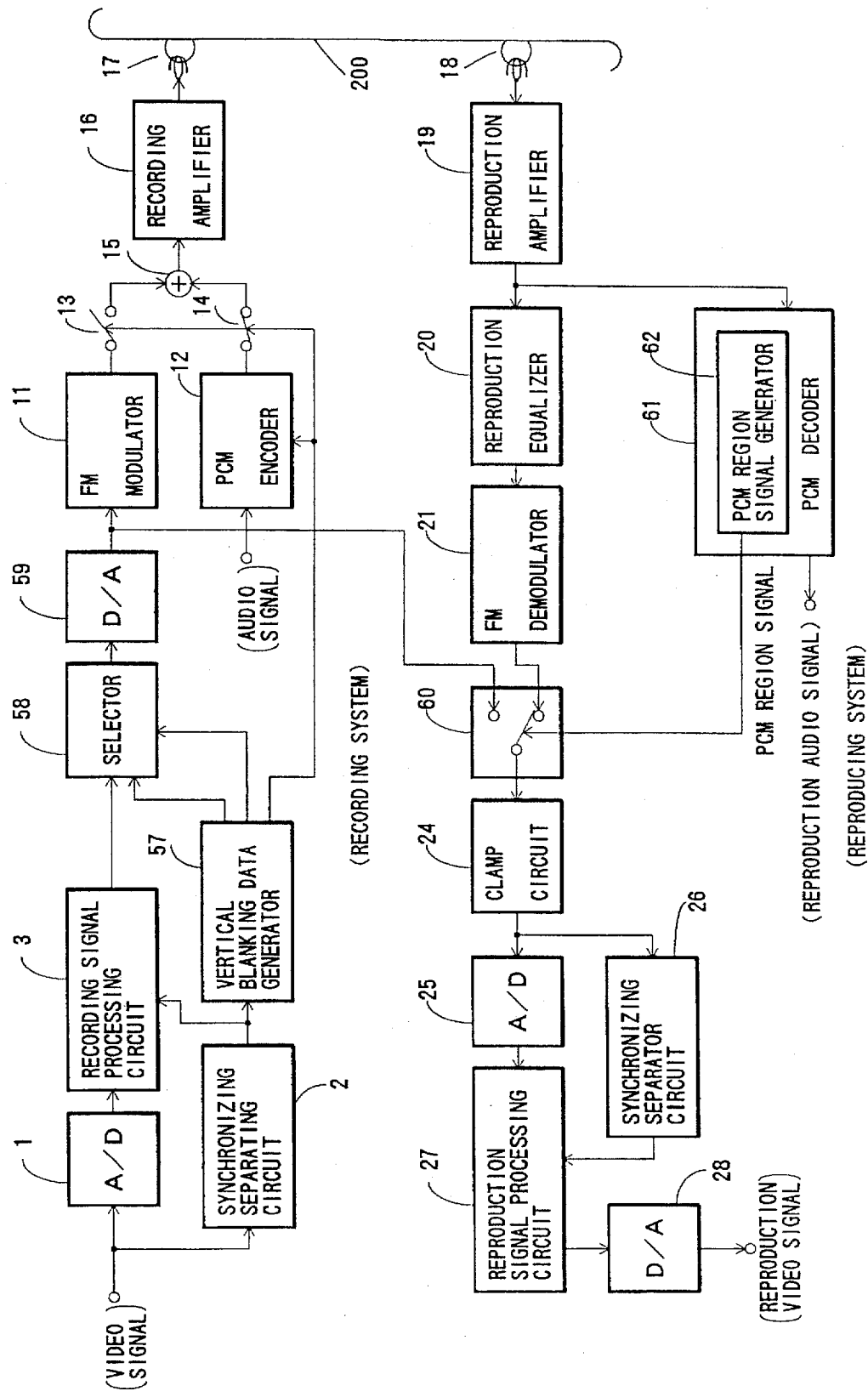
FIG. 23 is a block diagram of a further magnetic recording and reproducing apparatus showing a fourth preferred embodiment of the present invention.

Referring now to FIG. 23, there is shown a magnetic recording and reproducing apparatus according to a fourth preferred embodiment of the present invention. The magnetic recording and reproducing apparatus shown includes a recording system including an analog to digital (A/D) converter 1 for converting an input video signal from an analog signal into a digital signal, a first synchronizing separator circuit 2 for separating a synchronizing signal from an input video signal, a recording signal processing circuit 3 for performing such recording signal processing as to insert blanking data, which make, upon reproduction, a reference signal for such processing as time base correction, into a video signal in accordance with a synchronizing signal from the first synchronizing separator 2, a vertical blanking data generator 57 operable upon recording and reproduction for generating, in accordance with a synchronizing separation signal from the first synchronizing separator circuit 2, blanking data for a vertical blanking period of a video signal, a gate pulse for enabling vertical blanking data to be inserted into video signal data from the recording signal processing circuit 3 and a timing pulse for inserting a PCM audio signal into an FM video signal, a selector 58 operable upon recording and reproduction for inserting vertical blanking data from the vertical blanking data generator 57 into video signal data from the recording signal processing circuit 3, and a digital to analog (D/A) converter 59 operable upon recording and reproduction for converting an output signal of the selector 59 from a digital signal into an analog signal. The recording system of the magnetic recording and reproducing apparatus further includes an FM modulator 11, a PCM encoder 12, a pair of switches 13 and 14, an adder 15, a recording amplifier 16 and a recording video head 17, which are similar to the FM modulator 11, PCM encoder 12, switches 13 and 14, adder 15, recording amplifier 16 and recording video head 17, respectively, of the recording system of the magnetic recording and reproducing apparatus shown in FIG. 11.

The magnetic recording and reproducing apparatus further includes a reproducing system which includes a reproducing video head 18, a reproduction amplifier 19, a reproduction equalizer 20, an FM demodulator 21, a clamp circuit 24, an analog to digital (A/D) converter 25, a second synchronizing separator circuit 26, a reproduction signal processing circuit 27 and a digital to analog (D/A) converter 28 which are all similar to the respective corresponding ones of the reproducing system of the magnetic recording and reproducing apparatus shown in FIG. 11. The reproducing system of the magnetic recording and reproducing apparatus further includes a PCM decoder 61 for decoding an output signal of the reproduction amplifier 19, that is, for detecting a PCM audio signal for one field inserted in a vertical blanking period of a reproduction signal and processing the detected PCM audio signal by error correction, shuffling and so forth to restore an original audio signal. The PCM decoder 61 includes therein a PCM region signal generator 62 which discriminates a region of a PCM modulated audio signal in a reproduction signal and generates a PCM region signal representative of a PCM audio signal region. The reproducing system of the magnetic recording and reproducing apparatus further includes a switch circuit 60 for change over in accordance with a PCM region signal received from the PCM region signal generator 62 in the PCM decoder 61.

In operation, an input video signal upon recording is first converted from an analog signal into a digital signal by the A/D converter 1 and then outputted to the recording signal processing circuit 3. Meanwhile, the input video signal is also inputted to the first synchronizing separator circuit 2, at which a synchronizing signal is separated from the input video signal. At the recording signal processing circuit 3, such recording signal processing as to insert blanking data, which make, upon reproduction, a reference signal for such processing as time base correction, into a video signal is performed in accordance with a synchronizing separation output from the first synchronizing separator 2, and the thus processed signal is transmitted from the recording signal processing circuit 3 to the selector 58. Meanwhile, at the vertical blanking data generator 57, vertical blanking data for a video signal and a gate pulse for enabling such vertical blanking data into video signal data received from the recording signal processing circuit 3 are generated, upon recording, with reference to the synchronizing separation output of the first synchronizing separator circuit 2 and are outputted to the selector 58. The vertical blanking data generator 57 further operates to generate a timing pulse for inserting a PCM audio signal into a vertical blanking period of an FM video signal and output it to the switches 13 and 14.

Figure 56:
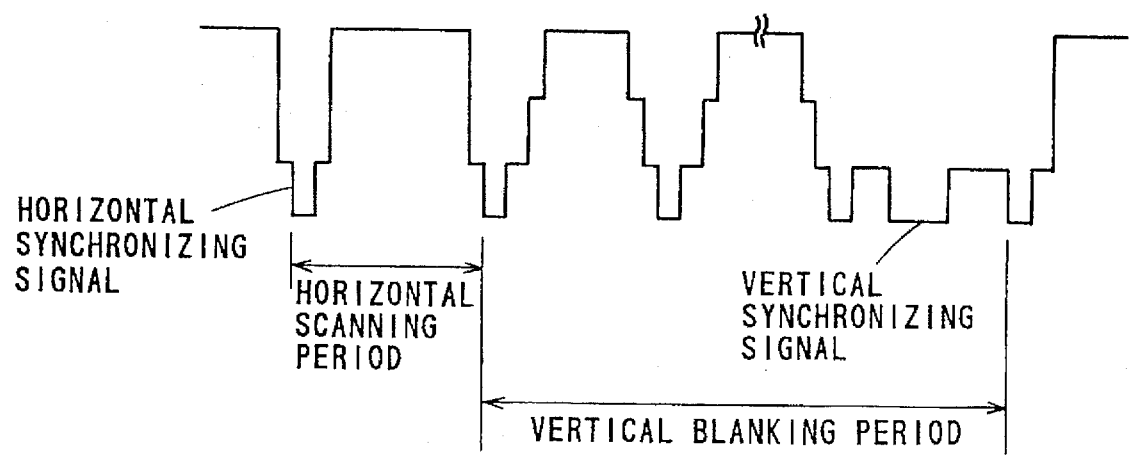
FIG. 56 is a waveform diagram showing a recording video signal before inputting to an FM modulator of the conventional magnetic recording and reproducing apparatus.

The vertical blanking data outputted from the vertical blanking data generator 57 are inserted by the selector 58 into the video signal data received from the recording signal processing circuit 3 in accordance with a gate pulse from the vertical blanking data generator 57. Then, the video signal data in which the vertical blanking data are inserted are transmitted to the D/A converter 59, at which they are converted from a digital signal into an analog signal. A waveform of a recording video signal outputted from the D/A converter 59 is shown in FIG. 56. The recording video signal is subsequently supplied to the FM modulator 11 while an input audio signal is supplied to the PCM encoder 12, whereafter the video signal and audio signal are processed by the FM modulator 11 and PCM encoder 12, switches 13 and 14, adder 15 and recording amplifier 16 and recorded onto a magnetic tape 200 by means of the recording video head 17 in a similar manner as in the magnetic recording and reproducing apparatus of FIG. 11 described hereinabove.

Figure 26:
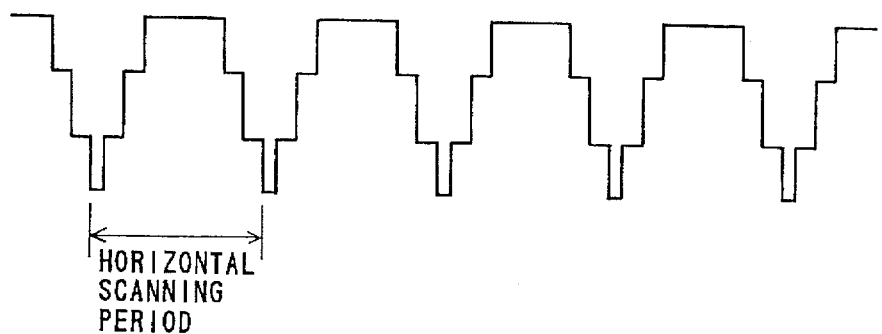
FIG. 26 is a waveform diagram showing a waveform of vertical blanking data generated by a vertical blanking data generator of the magnetic recording and reproducing apparatus shown in FIG. 23, 24 or 25.

It is to be noted that the vertical blanking data generator 57 of the recording system operates also upon reproduction and normally generates vertical blanking data, which are to make such a vertical blanking signal as shown in FIG. 26 after digital to analog conversion thereof, in synchronism with a rotary drum not shown on which the recording and reproducing video heads 17 and 18 are mounted. Such vertical blanking data are transmitted to the selector 58, and upon reproduction, the selector 58 always selects the output of the vertical blanking data generator 57. An output of the selector 58 is converted from a digital signal into an analog signal by the D/A converter 27. Then, the vertical blanking signal (FIG. 26) outputted from the D/A converter 27 after conversion into an analog signal is sent to the switch circuit 60.

Meanwhile, upon reproduction, the components 18, 19, 20, 21, 24, 25, 26, 27, 28, 61 and 62 of the reproducing system of the magnetic recording and reproducing apparatus operate in a similar manner to the components 18, 19, 20, 21, 24, 25, 26, 27, 28, 34 and 35, respectively, of the reproducing system of the magnetic recording and reproducing apparatus of FIG. 11 described hereinabove.

Accordingly, similarly as described hereinabove, if, upon reproduction, a reproduction FM video signal and a PCM audio signal mixed with such reproduction FM video signal outputted from the reproduction equalizer 20 are FM demodulated as they are by the FM demodulator 21, then the reproduction video signal after such FM demodulation will present such an output signal waveform as shown in FIG. 54 as if it includes noise in a PCM audio signal region.

Figure 27:
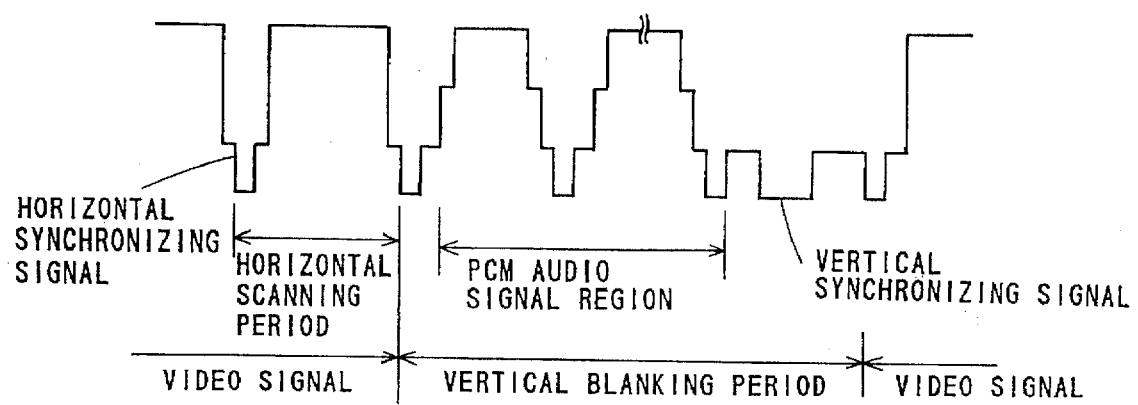
FIG. 27 is a similar view but showing an output waveform of a reproduction video signal of the magnetic recording and reproducing apparatus of FIG. 23, 24 or 25.

Thus, a reproduction video signal outputted from the FM demodulator 21 is inputted to the switch circuit 60 which is changed over in accordance with a PCM region signal representative of a PCM audio signal region so that a signal in a PCM audio signal region of a reproduction video signal is changed over to such a vertical blanking signal as shown in FIG. 26 which is generated by the vertical scanning data generator 57 of the recording system, thereby to obtain such a signal as shown in FIG. 27.

Here, a PCM region signal generated by the PCM region signal generator 62 in the PCM decoder 61 is transmitted to the switch circuit 60 so that a vertical blanking signal outputted from the D/A converter 59 of the recording system and a reproduction video signal from the FM demodulator 21 are selectively outputted from the switch circuit 60 in response to such PCM region signal.

Figure 28:
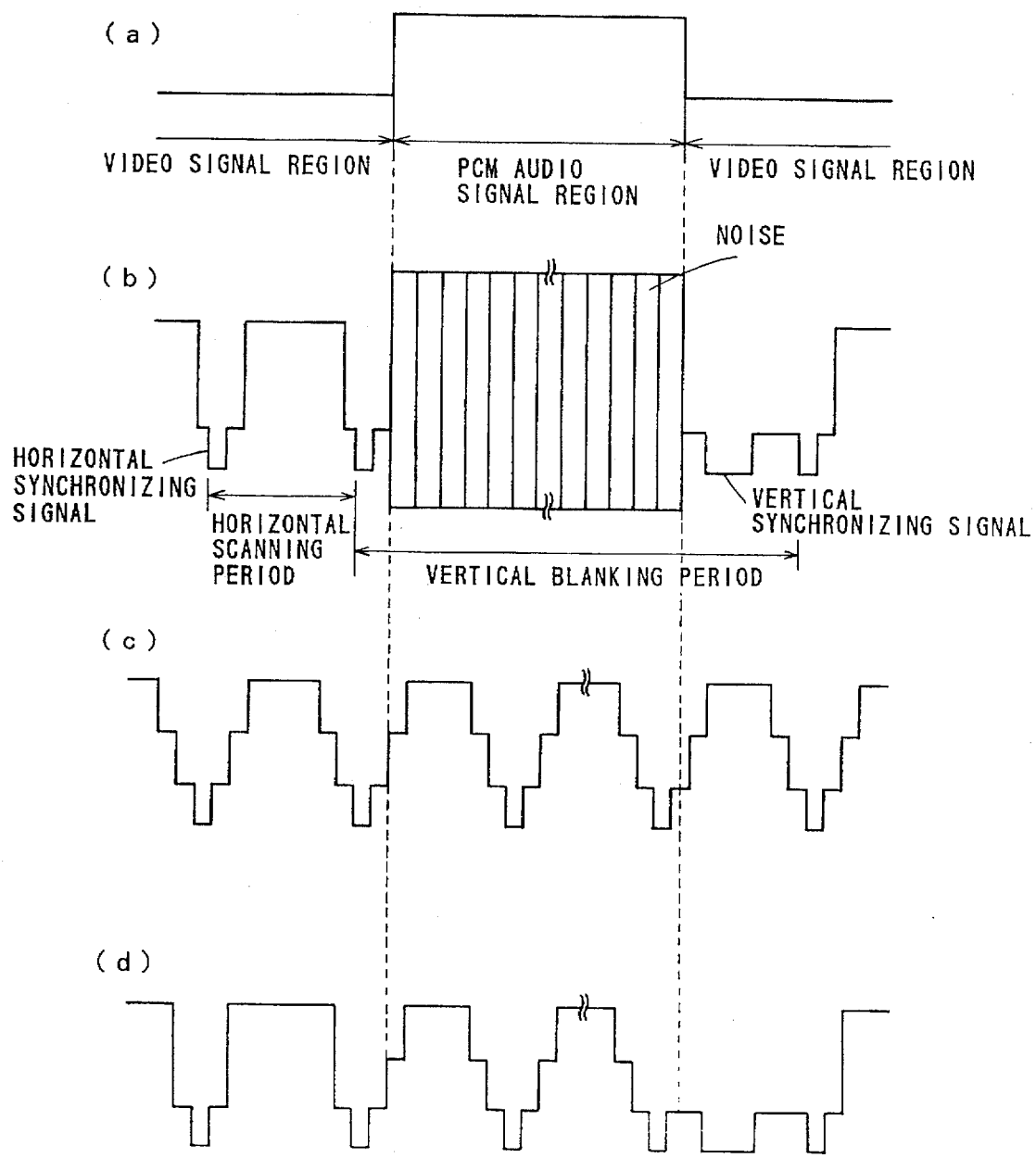
FIG. 28 is a waveform diagram illustrating operation of a PCM region signal generator and a switch circuit of the magnetic recording and reproducing apparatus of FIG. 23.

In particular, if, for example, such a pulse which presents a low level in a video signal region but presents a high level in a PCM audio signal region as shown by a waveform (a) in FIG. 28 is generated by the PCM region signal generator 62 in the PCM decoder 61 and transmitted to the switch circuit 60, the switch circuit 60 selects, in a period of a video signal region in which the pulse present a low level, a reproduction video signal (waveform (b) shown in FIG. 28) transmitted thereto from the FM demodulator 21, but selects, in a period of a PCM audio signal region in which the pulse presents a high level, a vertical blanking signal (waveform (c) shown in FIG. 28) generated by the vertical blanking data generator 57 of the recording system and received from the D/A converter 59. Consequently, a signal in a PCM audio signal region at the output of the switch circuit 60 is changed over to a vertical blanking signal generated by the recording system as seen from a waveform (d) of FIG. 28.

Where such construction is employed, a signal in a PCM audio signal region of an FM demodulated reproduction video signal can be replaced by a vertical blanking signal generated by the recording system, and consequently, synchronization separation of a video signal can be performed accurately and the clamp circuit at a next stage can operate normally. Further, since a signal to which a synchronizing signal is added is inserted also in a signal in a PCM audio signal region, a signal can be clamped even in a PCM audio signal region, and consequently, sags can be reduced.

A reproduction video signal outputted from the switch circuit 60 is thereafter processed by the clamp circuit 24, A/D converter 25, second synchronizing separator circuit 26, reproduction signal processing circuit 27 and D/A converter 28 in a similar manner as described hereinabove in connection with the magnetic recording and reproducing apparatus of FIG. 11. Consequently, a good output reproduction video signal can be obtained from the reproducing system.

It is to be noted that, while the vertical blanking data generator 57 of the recording system of the magnetic recording and reproducing apparatus shown in FIG. 23 generates and outputs, upon reproduction, such vertical blanking data as shown in FIG. 26, it need not generate such specific waveform data but may generate data of some other signal waveform which makes a reference signal to a video signal such as, for example, a ramp signal waveform, a gray signal or a black level signal in order to achieve similar effects to those described above.

Further, while the PCM region signal generator 62 generates a pulse which presents a low level in a video signal region but presents a high level in a PCM audio signal region, it may otherwise generate a pulse having an inverted phase while the switch circuit 60 is constructed such that it may select, in a video signal region, a reproduction video signal outputted from the FM demodulator 21 but select, in a PCM audio signal region, a vertical blanking signal generated by the recording system and received from the D/A converter 59 in accordance with a PCM region signal outputted from the PCM region signal generator 62. Also with the alternate construction, similar effects to those described above can be achieved.

Further, while vertical blanking data are generated in the form of a digital data and selected by the selector 58 and then converted into analog data, they may otherwise be generated and selected in the form of an analog signal, by which similar effects can be achieved.

Figure 58:
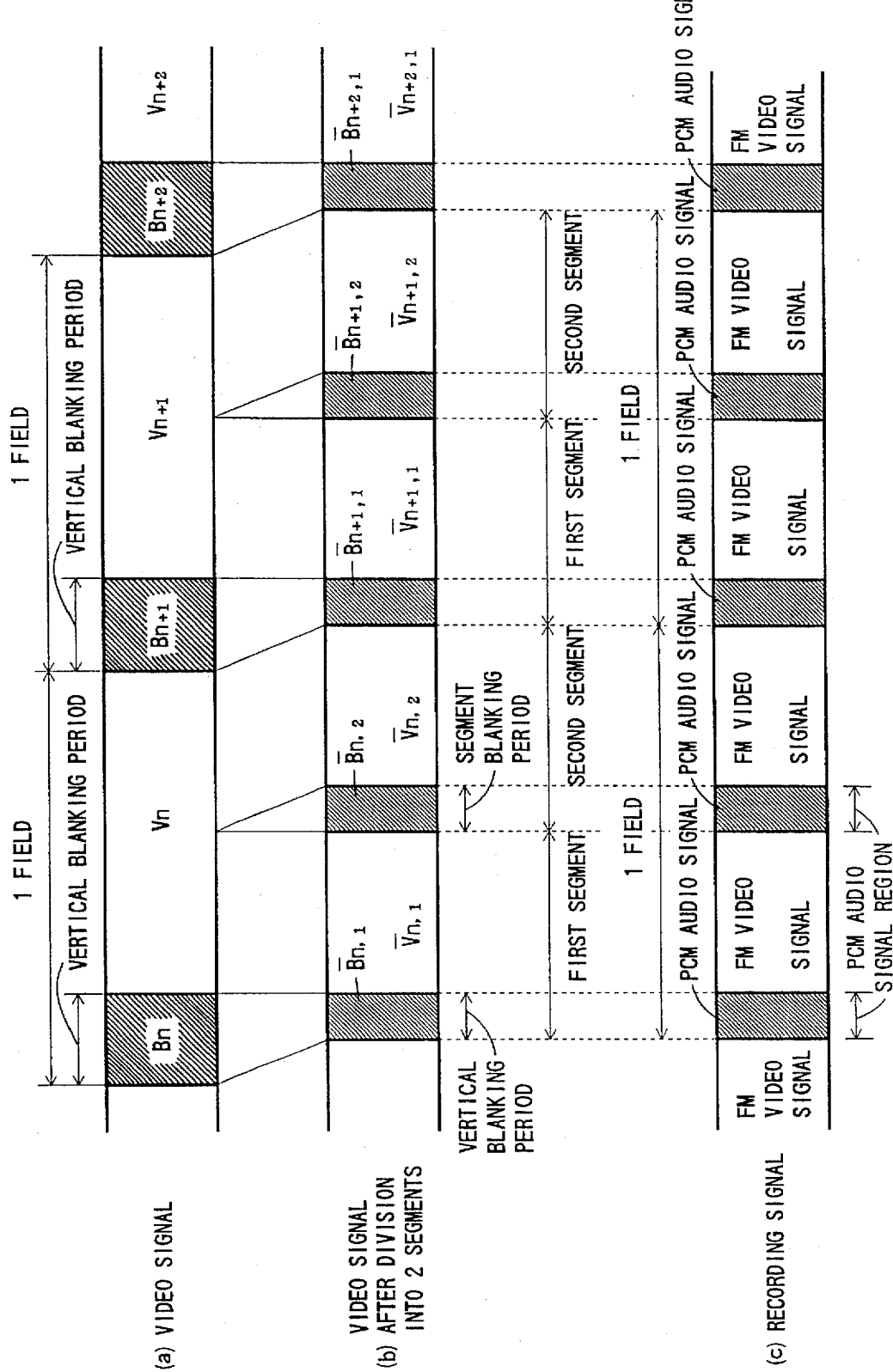
FIG. 58 is a waveform diagram illustrating time division multiplexing of a PCM audio signal into a segment blanking period of an FM video signal in two segment recording.

Further, while a PCM audio signal is inserted into a vertical blanking period of an FM modulated video signal in accordance with a suitable change over operation of the switches 13 and 14 in the magnetic recording and reproducing apparatus of FIG. 23, it may be inserted in some other way into an FM modulated video signal. For example, a PCM audio signal may be inserted in several separate parts into a horizontal blanking period of an FM modulated video signal. Further, also in the case wherein a PCM audio signal for one field is inserted in several parts into a segment blanking period and a vertical blanking period of an FM modulated video signal and recorded onto and then reproduced from a magnetic tape in a video tape recorder of the type wherein a video signal for one field is separated into a plurality of segments (a case wherein a video signal is separated into two segments is illustrated in FIG. 58) and recorded onto and reproduced from a magnetic tape, if such construction is employed that a region of a PCM audio signal in a reproduction signal is identified by a PCM region signal generator and a control signal representative of such PCM audio signal region is generated so as to change over a switch circuit in accordance therewith, similar effects can be exhibited with such a recording format wherein a PCM audio signal is recorded in a segment blanking period as shown in FIG. 58.

Furthermore, while a signal is replaced by blanking data generated by the recording system in a PCM audio signal region of a reproduction video signal, similar effects can be exhibited also where a signal generated by a signal generator which generates a signal to make a reference signal to a video signal is selected by a switch circuit in accordance with a PCM region signal.

Figure 24:
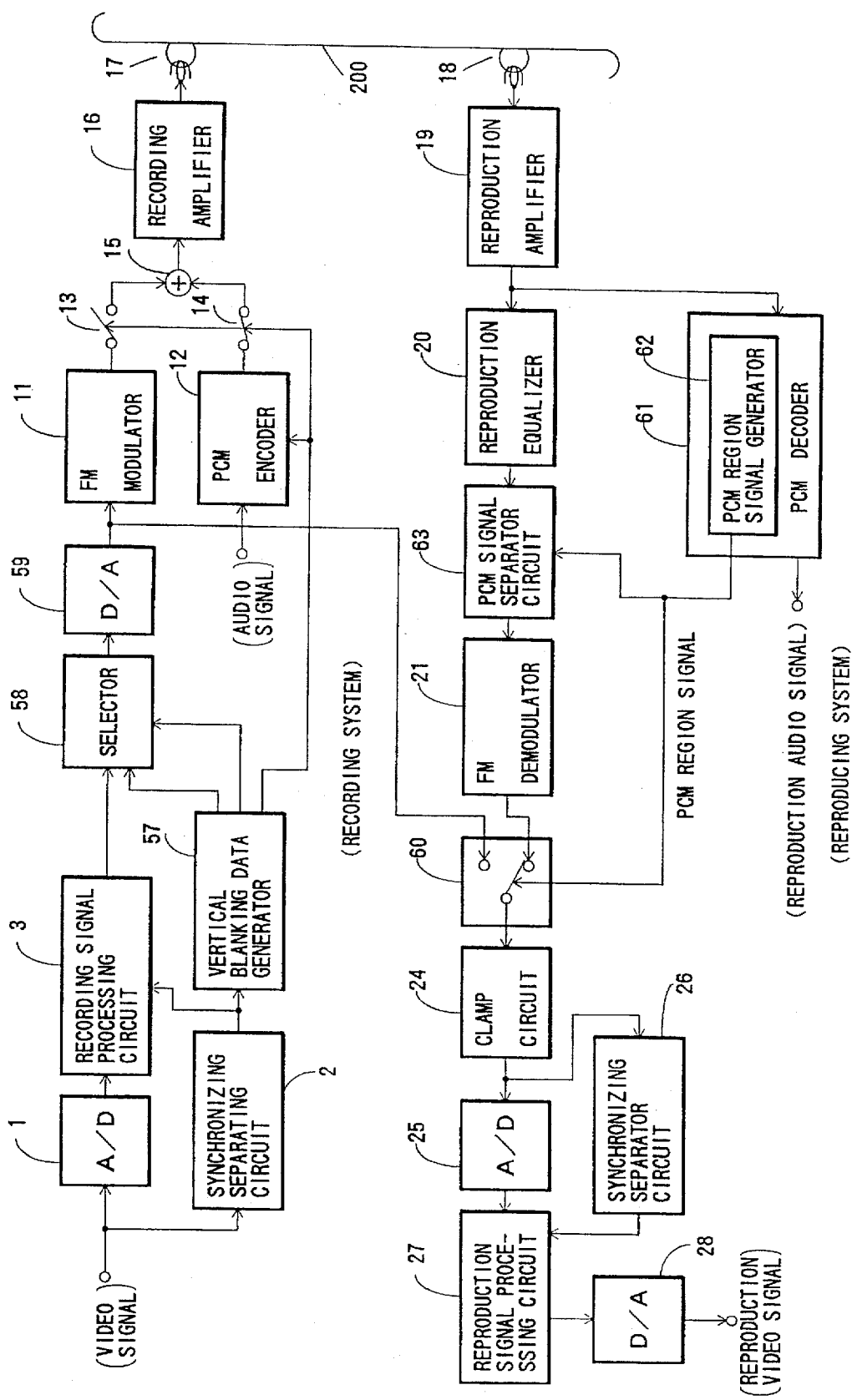
FIG. 24 is a similar view but showing a modification to the magnetic recording and reproducing apparatus of FIG. 23.

Referring now to FIG. 24, there is shown a modification to the magnetic recording and reproducing apparatus of FIG. 23 described above. The present magnetic recording and reproducing apparatus is modified such that a PCM signal separator circuit 63 is interposed between the reproduction equalizer 20 and the FM demodulator 21 so that an FM video signal and a PCM audio signal of a reproduction signal outputted from the reproduction equalizer 20 are separated from each other in accordance with a PCM region signal outputted from the PCM region signal generator 62 in the PCM decoder 61 and the thus separated FM video signal is transmitted to the FM demodulator 21.

Figure 57:
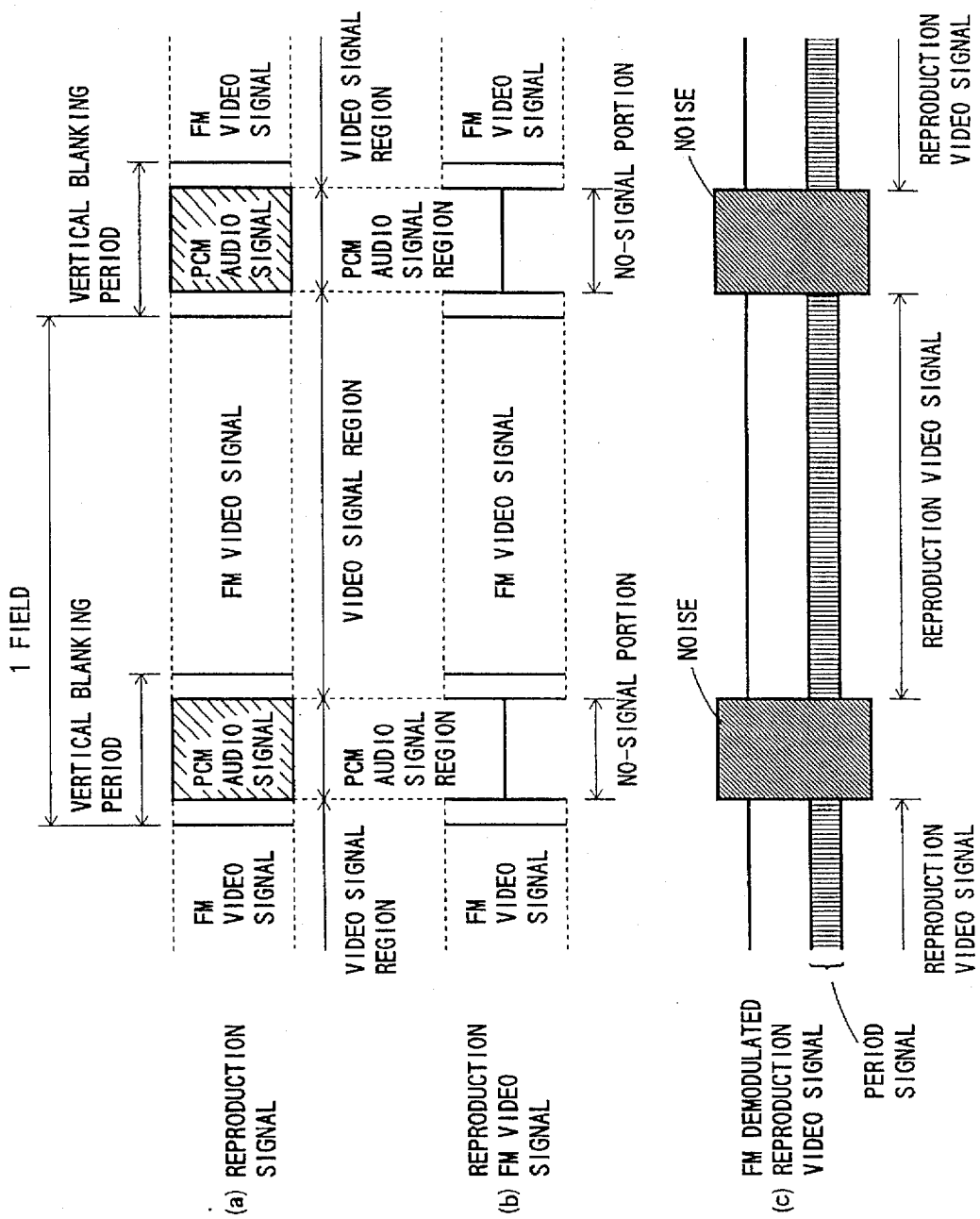
FIG. 57 is a waveform diagram illustrating operation of the magnetic recording and reproducing apparatus of FIG. 55 when an FM video signal and a PCM audio signal of a reproduction signal are separated and the reproduction FM video signal is FM demodulated.

Also in this instance, a reproduction video signal after FM demodulation will present such an output signal waveform as seen from a waveform (c) of FIG. 57 and the waveform of FIG. 54 as if it includes noise in a PCM audio signal region. Thus, similarly as in the magnetic recording and reproducing apparatus shown in FIG. 23, the switch circuit 60 selects, in a video signal region, a reproduction video signal outputted from the FM demodulator 21 but selects, in a PCM audio signal region, a vertical blanking signal generated by the recording system and received from the D/A converter 59 in accordance with a PCM region signal outputted from the PCM region signal generator 62 in the PCM decoder 61, thereby achieving similar effects to those described above.

Figure 25:
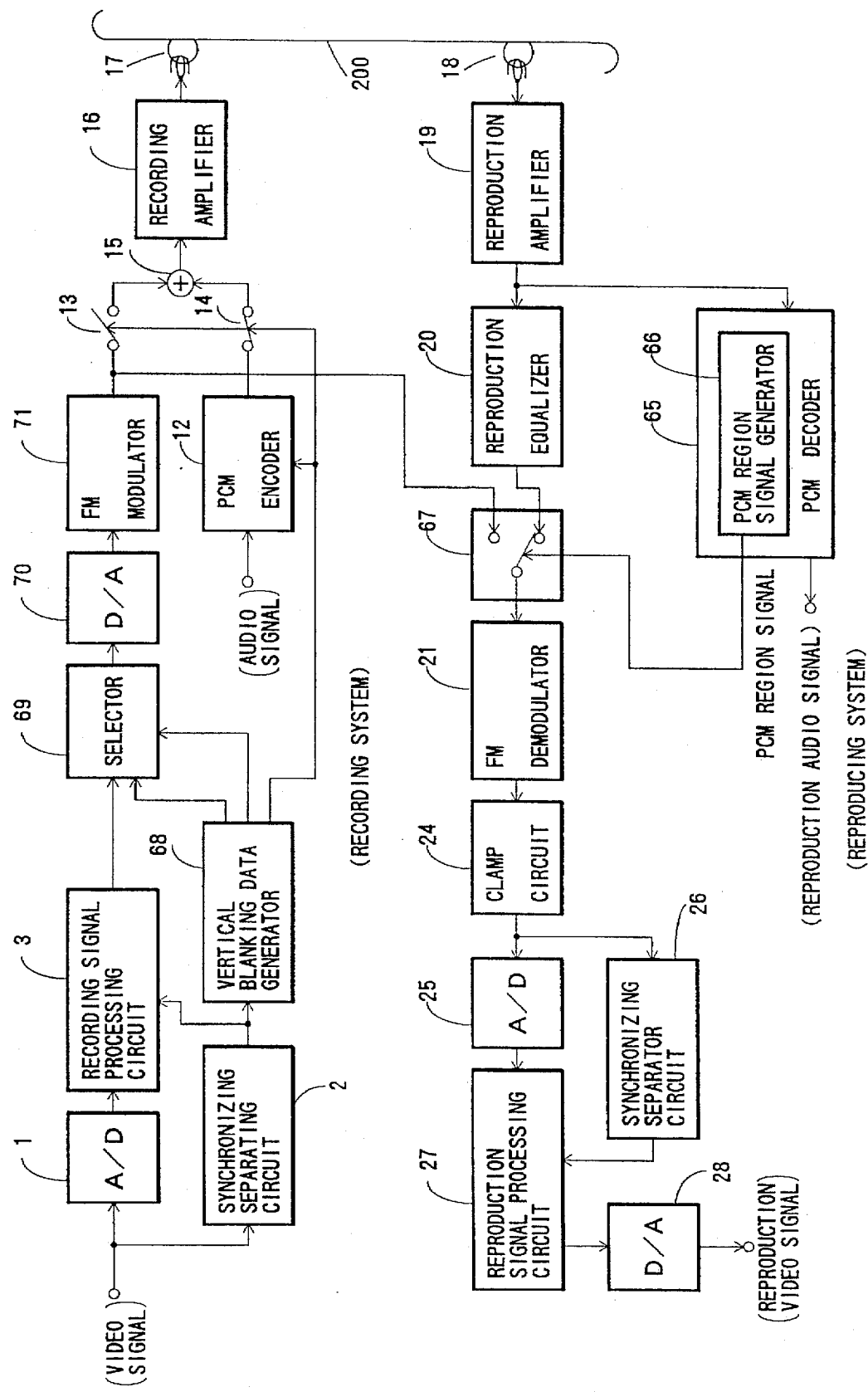
FIG. 25 is a similar view but showing another modification to the magnetic recording and reproducing apparatus of FIG. 23.

Referring now to FIG. 25, there is shown another modification to the magnetic recording and reproducing apparatus of FIG. 23. The present magnetic recording and reproducing apparatus is modified such that the recording system thereof includes a vertical blanking data generator 68, a selector 69, a digital to analog (D/A) converter 70 and an FM modulator 71 in place of the vertical blanking data generator 57, selector 58, D/A converter 59 and FM modulator 11 and the reproducing system thereof includes a PCM decoder 65 including a PCM region signal generator 66 therein and a switch circuit 67 in place of the PCM decoder 61 including the PCM region signal generator 62 therein and the switch circuit 60. The switch circuit 67 here in the present reproducing system is interposed not between the FM demodulator 21 and the clamp circuit 24 but between the reproduction equalizer 20 and the FM demodulator 21.

The vertical blanking data generator 68 operates upon recording and reproduction and generates vertical blanking data of a video signal in accordance with a synchronizing separation signal from the first synchronizing separator circuit 2. The selector 69 also operates upon recording and reproduction and inserts vertical blanking data from the vertical blanking data generator 68 into video signal data from the recording signal processing circuit 3. Further, the D/A converter 70 also operates upon recording and reproduction and converts an output signal of the selector 69 from a digital signal into an analog signal. The PCM decoder 61 decodes an output signal of the reproduction amplifier 19, that is, detects a PCM audio signal for one field inserted in a vertical blanking period of a reproduction signal and processes the detected PCM audio signal by error correction, shuffling and so forth to restore an original audio signal. The PCM region signal generator 62 in the PCM decoder 61 discriminates a region of a PCM modulated audio signal in a reproduction signal and generates a PCM region signal representative of a PCM audio signal region.

In operation, an input video signal upon recording is first converted from an analog signal into a digital signal by the A/D converter 1 and then outputted to the recording signal processing circuit 3. Meanwhile, the input video signal is also inputted to the first synchronizing separator circuit 2, at which a synchronizing signal is separated from the input video signal. At the recording signal processing circuit 3, such recording signal processing as to insert blanking data, which make, upon reproduction, a reference signal for such processing as time base correction, into a video signal is performed in accordance with a synchronizing separation output from the first synchronizing separator circuit 2, and the thus processed signal is transmitted from the recording signal processing circuit 3 to the selector 69. Meanwhile, at the vertical blanking data generator 68, vertical blanking data for a video signal and a gate pulse for enabling such vertical blanking data to be inserted into video signal data received from the recording signal processing circuit 3 are generated, upon recording, with reference to the synchronizing separation output of the first synchronizing separator circuit 2 and outputted to the selector 69. The vertical blanking data generator 68 further operates to generate a timing pulse for inserting a PCM audio signal into an FM video signal of an FM video signal and output it to the switches 13 and 14.

The vertical blanking data outputted from the vertical blanking data generator 68 are inserted by the selector 69 into the video signal data received from the recording signal processing circuit 3 in accordance with a gate pulse from the vertical blanking data generator 68. Then, the video signal data in which the vertical blanking data are inserted are transmitted to the D/A converter 70, at which they are converted from a digital signal into an analog signal, whereafter they are inputted to and FM modulated by the FM modulator 71. A waveform of such recording video signal outputted from the D/A converter 70 is shown in FIG. 56.

Meanwhile, an input audio signal inputted to the recording system is supplied to the PCM encoder 12, at which processing of shuffling, addition of an error correction code and so forth is performed therefor and then time base compressing processing is performed for the thus processed audio signal in accordance with a timing pulse received from the vertical blanking data generator 68 in order to allow the audio signal for one field period to be later inserted into a fixed portion of a vertical blanking period of the FM video signal. The PCM encoder 12 outputs the thus PCM modulated audio signal therefrom. Then, the switches 13 and 14 are changed over in accordance with a timing pulse from the vertical blanking data generator 68 so that a PCM audio signal for one field outputted from the PCM encoder 12 and an FM modulated video signal outputted from the FM modulator 71 are added to each other such that the PCM audio signal may be inserted into a vertical blanking period of the FM modulated video signal as seen in FIG. 54 to produce a recording signal. The recording signal including the PCM audio signal and FM modulated video signal and outputted from the adder 15 is supplied to the recording amplifier 16, at which the FM video signal and the PCM audio signal thereof are amplified. The composite recording signal of the FM video signal and the PCM audio signal is then recorded onto a magnetic tape 200 by means of the recording video head 17.

It is to be noted that the vertical blanking data generator 68 of the recording system operates also upon reproduction and normally generates vertical blanking data, which will make such a vertical blanking signal as shown in FIG. 26 after digital to analog conversion thereof, in synchronism with a rotary drum not shown on which the recording and reproducing video heads 17 and 18 are mounted. Such vertical blanking data are transmitted to the selector 69, and upon reproduction, the selector 69 always selects the output of the vertical blanking data generator 68. An output of the selector 69 is converted from a digital signal into an analog signal by the D/A converter 70. Then, the vertical blanking signal (FIG. 26) outputted from the D/A converter 70 after conversion into an analog signal is inputted to the FM modulator 71, at which it is FM modulated. Then, the thus FM modulated vertical blanking signal outputted from the FM modulator 34 is transmitted to the switch circuit 67.

On the other hand, upon reproduction, a reproduction signal reproduced from the magnetic tape 200 by the reproducing video head 18 is amplified by the reproduction amplifier 19 and transmitted to the reproduction equalizer 20 and also to the PCM decoder 65. At the PCM decoder 65, a PCM audio signal for one field inserted in a vertical blanking period of such reproduction signal is detected and then processed by error correction, de-shuffling, error modification and so forth to restore an original audio signal. In the meantime, the reproduction equalizer 20 compensates for a frequency characteristic of the reproduction FM video signal in the reproduction signal received from the reproduction amplifier 19.

Here, similarly as in the magnetic recording and reproducing apparatus of FIG. 23, a PCM audio signal is added, upon recording, to a vertical blanking period of an FM video signal in accordance with suitable changing over of the switches 13 and 14, and accordingly, a PCM audio signal mixed with a reproduction FM video signal is outputted as it is from the reproduction equalizer 20. Thus, if an output of the reproduction equalizer 20 is FM demodulated by the FM demodulator 21, then a reproduction video signal outputted from the FM demodulator 21 will present such an output signal waveform as shown in FIG. 54 as if it includes noises in a PCM audio signal region.

Thus, a reproduction video signal outputted from the reproduction equalizer 20 is inputted to the switch circuit 67 which is changed over in accordance with a PCM region signal representative of a PCM audio signal region so that the reproduction signal may be partially changed over to an FM signal obtained by FM modulation of a vertical blanking signal by the FM modulator 71 of the recording system and outputted to the FM demodulator 21. FIG. 27 shows a waveform of a reproduction video signal outputted from the FM demodulator 21. Here, a PCM region signal generated by the PCM region signal generator 66 in the PCM decoder 65 is transmitted to the switch circuit 67 so that an FM modulated vertical blanking signal outputted from the FM modulator 71 of the recording system and a reproduction signal outputted from the reproduction equalizer are selectively outputted from the switch circuit 67 in response to such PCM region signal.

In particular, if, for example, such a pulse which presents a low level in a video signal region but presents a high level in a PCM audio signal region generated by the PCM region signal generator 66 in the PCM decoder 65 and transmitted to the switch circuit 67, the switch circuit 67 selects, in a period of a video signal region in which the pulse presents a low level, a reproduction video signal transmitted thereto from the reproduction equalizer 20, but selects, in a period of a PCM audio signal region in which the pulse presents a high level, an FM signal obtained by FM modulation of a vertical blanking signal generated by the vertical blanking data generator 68 of the recording system. Accordingly, a signal in a PCM audio signal region at the output of the switch circuit 67 is changed over to a signal obtained by FM modulation of a vertical blanking signal generated by the recording system.

An output of the switch circuit 67 is inputted to the FM demodulator 21, at which it is FM demodulated into such a reproduction video signal as shown in FIG. 27. Thus, since a signal in a PCM audio signal region of an FM demodulated reproduction video signal is replaced by a vertical blanking signal generated by the recording system, synchronization separation of a video signal can be performed accurately and the clamp circuit 24 at a next stage can operate normally. Further, since a signal to which a synchronizing signal is added is inserted also in a signal in a PCM audio signal region, a signal can be clamped even in a PCM audio signal region, and consequently, sags can be reduced.

A reproduction video signal outputted from the FM demodulator 21 is thereafter processed by the clamp circuit 24, A/D converter 25, second synchronizing separator circuit 26, reproduction signal processing circuit 27 and D/A converter 28 in a similar manner as described hereinabove in connection with the magnetic recording and reproducing apparatus of FIG. 23 so that a good output reproduction video signal can be produced.

It is to be noted that, while the vertical blanking data generator 68 of the recording system of the magnetic recording and reproducing apparatus shown in FIG. 25 generates and outputs, upon reproduction, such vertical blanking data as shown in FIG. 26, it need not generate such specific waveform data but may generate data of some other signal waveform which makes a reference signal to a video signal such as, for example, a ramp signal waveform, a gray signal or a black level signal in order to achieve similar effects to those described above.

Further, while the PCM region signal generator 62 generates a pulse which presents a low level in a video signal region but presents a high level in a PCM audio signal region, it may otherwise generate a pulse having an inverted phase while the switch circuit 67 is constructed such that it may select, in a video signal region, a reproduction video signal outputted from the 123 reproduction equalizer 20, but select, in a PCM audio signal region, a signal obtained by FM demodulation of a vertical blanking signal generated by the recording system and received from the FM modulator 71 in accordance with a PCM region signal outputted from the PCM region signal generator 66. Also with such alternate construction, similar effects to those described above can be achieved.

Further, while vertical blanking data are generated in the form of a digital data and selected by the selector 69 and then converted into analog data and FM modulated, they may otherwise be generated, selected and FM modulated in the form of an analog signal, by which similar effects can be achieved.

Further, while the magnetic recording and reproducing apparatus of FIG. 25 is constructed such that a PCM audio signal mixed with a reproduction FM video signal is inputted as it is, upon reproduction, to the switch circuit 67, similar effects to those described above can be achieved even where it is modified such that the PCM signal separator circuit 63 at the preceding stage to the FM demodulator 21 of the magnetic recording and reproducing apparatus of FIG. 24 is used to separate an FM video signal and a PCM audio signal of a reproduction signal from the reproduction equalizer 20 from each other as seen from the waveform (b) of FIG. 57 and then the thus separated FM video signal is inputted to the switch circuit 67 so that, in accordance with a PCM region signal outputted from the PCM region signal generator 66, the reproduction FM video signal after separation from the PCM video signal may be selected in a video signal region, but a signal obtained by FM modulation by the FM modulator 71 of a blanking signal generated by the recording system may be selected in a PCM audio signal region.

Further, while a PCM audio signal is inserted into a vertical blanking period of an FM modulated video signal in accordance with a suitable change over operation of the switches 13 and 14 in the magnetic recording and reproducing apparatus of FIG. 25, it may be inserted in some other way into an FM modulated video signal. For example, a PCM audio signal may be inserted in several separate parts into a horizontal blanking period of an FM modulated video signal. Further, also in the case wherein a PCM audio signal for one field is inserted in several parts into a segment blanking period and a vertical blanking period of an FM modulated video signal and recorded onto and then reproduced from a magnetic tape in a video tape recorder of the type wherein a video signal for one field is separated into a plurality of segments (a case wherein a video signal is separated into two segments is illustrated in FIG. 58) and recorded onto and reproduced from a magnetic tape, if such construction is employed that a region of a PCM audio signal in a reproduction signal is identified by a PCM region signal generator and a control signal representative of such PCM audio signal region is generated so as to change over a switch circuit in accordance therewith, similar effects can be exhibited with such a recording format wherein a PCM audio signal is recorded in a segment blanking period as shown in FIG. 69.

Furthermore, while a signal is replaced by blanking data generated by the recording system in a PCM audio signal region of a reproduction video signal, similar effects can be exhibited also where a signal generated by a signal generator which generates an FM modulated signal of a signal to make a reference signal to a video signal is selected by a switch circuit in accordance with a PCM region signal.

Figure 29:
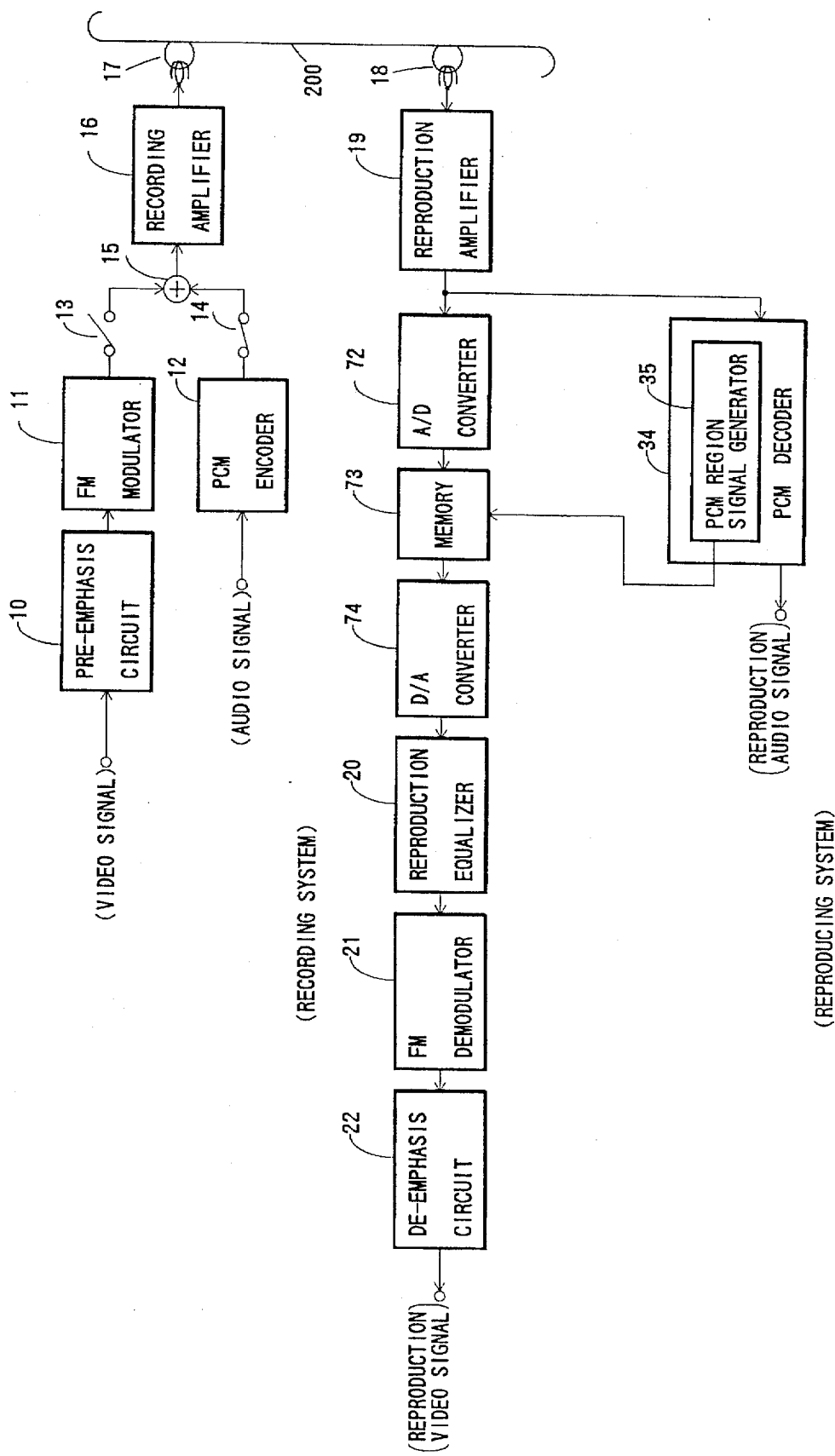
FIG. 29 is a block diagram of a still further magnetic recording and reproducing apparatus showing a fifth preferred embodiment of the present invention.

Referring now to FIG. 29, there is shown a magnetic recording and reproducing apparatus according to a fifth preferred embodiment of the present invention. The magnetic recording and reproducing apparatus includes a recording system which is common in construction to the recording system of the magnetic recording and reproducing apparatus described hereinabove with reference to FIG. 1. The magnetic recording and reproducing apparatus further includes a reproducing system which includes a reproducing video head 18, a reproduction amplifier 19, a reproduction equalizer 20, an FM demodulator 21, a de-emphasis circuit 22 and a PCM decoder 34 including a PCM region signal generator 35 therein, similarly to the reproducing system of the magnetic recording and reproducing apparatus of FIG. 1. The reproducing system of the present magnetic recording and reproducing apparatus further includes an analog to digital (A/D) converter 72 connected to the reproduction amplifier 19, a memory 73 connected to the A/D converter 72 for storing a reproduction FM signal therein, and a digital to analog converter 74 interposed between the memory 73 and the reproduction equalizer 20.

In operation, the recording system of the magnetic recording and reproducing apparatus operates, upon recording, in a similar manner as in the recording system of the magnetic recording and reproducing apparatus of FIG. 1.

On the other hand, upon reproduction, a reproduction signal read out from the magnetic tape 200 by means of the reproducing magnetic head 18 is first amplified by the reproduction amplifier 19 and then transmitted to the A/D converter 72 and the PCM decoder 34. The PCM decoder 34 thus decodes and outputs a PCM audio signal in the reproduction signal. At the same time, the PCM region signal generator 35 in the PCM decoder 34 generates a PCM region signal representative of a PCM audio signal in such a manner as described above. Thus, the PCM region signal generator 35 generates, for example, such a PCM region signal which presents a low level in a PCM audio region but presents a high level in a video signal region as seen from a waveform (b) of FIG. 30.

Figure 30:
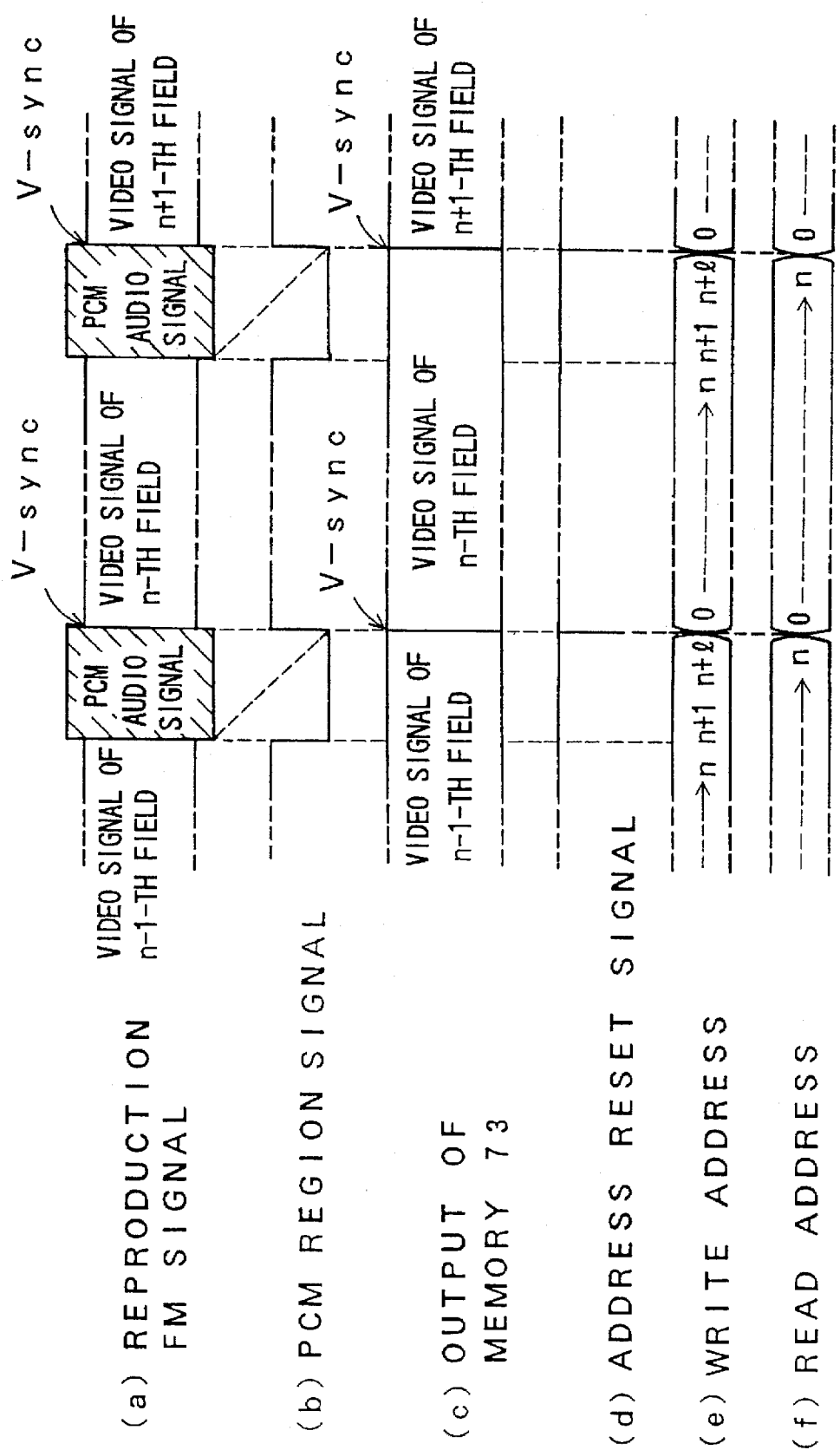
FIG. 30 is a waveform diagram illustrating operation of the magnetic recording and reproducing apparatus of FIG. 29.

Meanwhile, the reproduction FM signal having such a waveform as shown by a waveform (a) in FIG. 30 is converted into a digital signal by the A/D converter 72. The digital signal outputted from the A/D converter 72 is then stored into the memory 73 in response to a write clock signal synchronized with a sampling clock supplied to the A/D converter 72. The write address of the memory 73 is set such that it is cleared in response to such write clock signal and a PCM region signal from the PCM region signal generator 35 at a point of time when the PCM region signal changes from a low level to a high level, and after then, it is incremented successively in response to the write clock signal as seen from a waveform (e) of FIG. 30. Thus, the reproduction FM signal for one field is successively written into the memory 73 in accordance with such write address. It is to be noted that n+1 in FIG. 30 represents a number of samples of a reproduction FM signal for one field while 1 denotes a number of samples of a PCM audio signal.

When the thus stored data are to be read out from the memory 73, a read clock signal is produced in such a manner as given by the following expression:

(read clocks)=(write clocks)×(m/(m+1))

so that the PCM audio signal data of the stored reproduction FM signal data may not be read out. Thus, the read address of the memory 73 is set such that it is cleared at a point of time when the PCM region signal changes from a low level to a high level, and it is successively incremented in response to the read clock signal in response to the thus produced read clock signal and the PCM region signal described above. Thus, the reproduction signal data except the PCM audio signal data are read out from the memory 73 in accordance with such read address, thereby obtaining such an output signal as seen from a waveform (c) in FIG. 30.

A signal free from a PCM audio signal is produced in this manner from a reproduction FM signal. The signal thus produced is re-converted into an analog signal by the D/A converter 74 and then transmitted to the reproduction equalizer 20. At the reproduction equalizer 20, a frequency characteristic of a reproduction FM video signal of the reproduction signal transmitted thereto is compensated for, and an output signal of the reproduction equalizer 20 is transmitted to the FM demodulator 21, at which it is FM demodulated. The FM demodulated reproduction video signal is then transmitted to the de-emphasis circuit 22, at which high frequency components emphasized by the pre-emphasis circuit 10 in the recording system are de-emphasized so that a reproduction video signal from which high frequency noises have been removed and also a PCM audio signal has been removed is obtained.

Thus, with the magnetic recording and reproducing apparatus described just above, a PCM audio signal can be removed from a reproduction FM signal, and synchronizing separation is performed from a video signal after FM demodulation of such reproduction FM signal, synchronizing separation can be performed accurately without being influenced by a PCM audio signal which makes a noise in the course of such FM demodulation, and consequently, a stabilized reproduction video signal can be obtained. It is to be noted that, if a video signal is time base elongated and FM demodulated in the course of removal of a PCM audio signal, the level of the reproduced video signal will relatively drop comparing with a video signal level upon recording. However, such level of the video signal can be corrected by a time base correcting circuit (not shown) which may be connected to the de-emphasis circuit 22.

Figure 31:
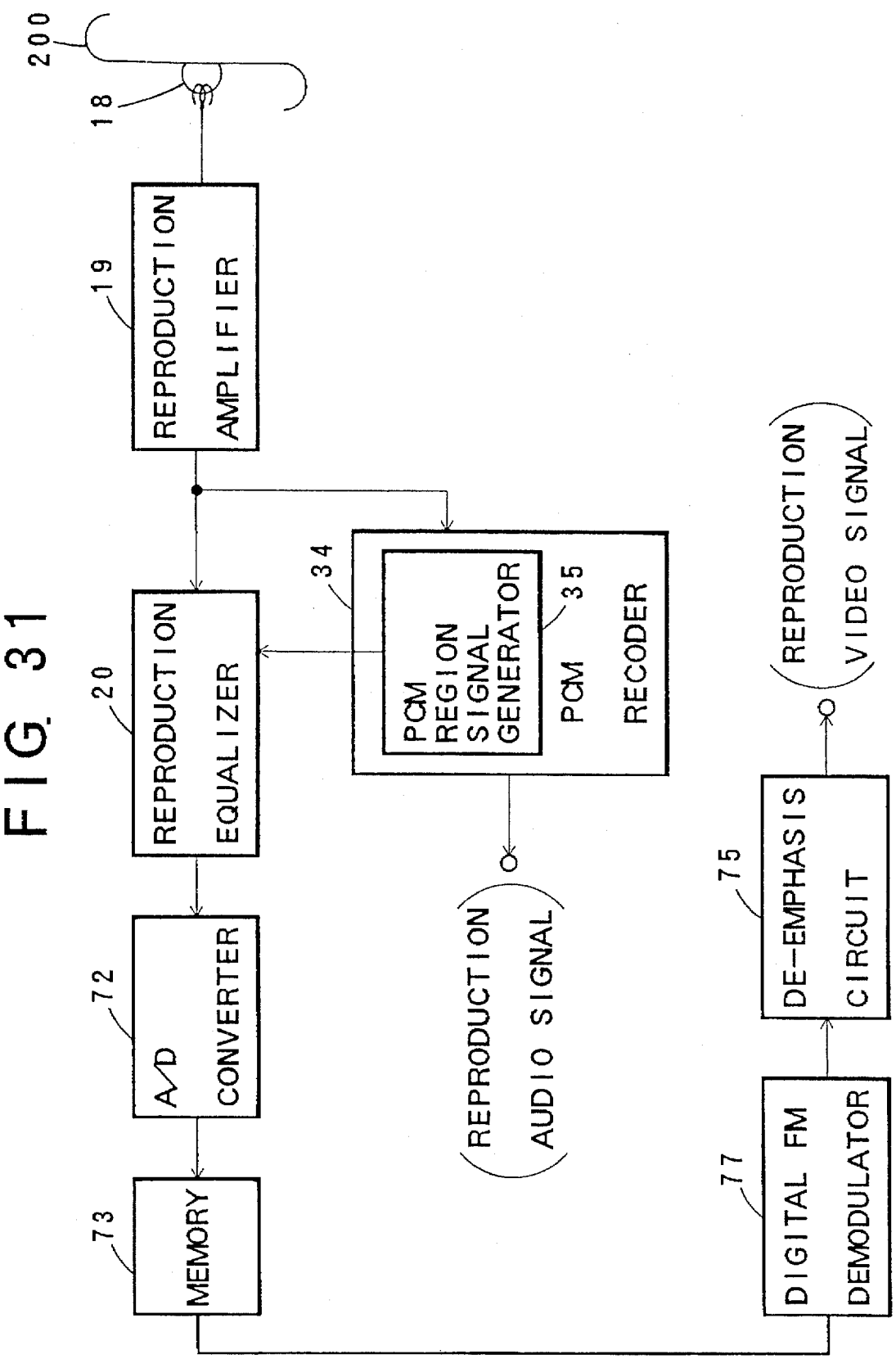
FIG. 31 is a block diagram showing a modification to the magnetic recording and reproducing apparatus of FIG. 29.

Referring now to FIG. 31, there is shown a modification to the reproducing system of the magnetic recording and reproducing apparatus of FIG. 29. The reproducing system is modified such that the reproduction equalizer 20 is interposed between the reproduction amplifier 19 and the A/D converter 72 and a de-emphasis circuit 75 which has a same characteristic as the de-emphasis circuit 22 but processes not an analog signal but a digital signal is provided in place of the de-emphasis circuit 22 while a digital FM demodulator 77 is provided in place of the D/A converter 74 and FM modulator 21 and interposed between the memory 73 and the de-emphasis circuit 75. The digital FM demodulator 77 receives a reproduction FM signal in the form of a digital signal from the memory 73 and FM demodulates the thus received reproduction FM signal. An output reproduction signal from the FM demodulator 77 is inputted to the de-emphasis circuit 75, at which it is de-emphasized digitally. The de-emphasis circuit 75 thus outputs a reproduction signal in the form of a digital signal.

In operation, upon reproduction, a reproduction signal read out from the magnetic tape 200 by means of the reproducing magnetic head 18 is first amplified by the reproduction amplifier 19 and then transmitted to the reproduction equalizer 20 and the PCM decoder 34. The PCM decoder 34 thus decodes and outputs a PCM audio signal in the reproduction signal. Simultaneously, the PCM region signal generator 35 in the PCM decoder 34 generates a PCM region signal representative of a PCM audio signal in a similar manner as in the magnetic recording and reproducing apparatus of FIG. 29.

Meanwhile, the reproduction equalizer 20 to which the reproduction FM signal having such a waveform as shown by the waveform (a) in FIG. 30 is inputted compensates for a frequency characteristic of the inputted reproduction FM video signal, and an output of the reproduction equalizer 20 is inputted to the A/D converter 72, at which it is converted into a digital FM signal. Then, the reproduction digital FM signal from the A/D converter 72 is successively stored into the memory 73 in accordance with a write address which is produced so as to successively increase in response to a write clock signal after the memory 73 was cleared at a point of time when the PCM region signal from the PCM region signal generator 35 changed from a low level to a high level.

When the thus stored data are to be read out from the memory 73, a read clock signal is set in such a manner as described hereinabove so that the PCM audio signal data of the stored reproduction FM signal data may not be read out. Thus, the read address of the memory 73 is set such that it is cleared at a point of time when the PCM region signal changes from a low level to a high level, whereafter it is successively incremented in response to the read clock signal described above. Thus, the reproduction signal data except the PCM audio signal data are read out from the memory 73 in accordance with such read address, thereby obtaining such an output signal as seen from a waveform (c) in FIG. 30.

The digital FM signal from which such PCM audio signal has been removed is FM demodulated by the digital FM demodulator 77, and then high frequency components which were emphasized by the pre-emphasis circuit 10 in the recording system are de-emphasized by the de-emphasis circuit 75 so that a reproduction video signal from which high frequency noises have been removed and also a PCM audio signal has been removed is obtained.

Thus, with the magnetic recording and reproducing apparatus described just above, similarly as in the magnetic recording and reproducing apparatus of FIG. 29, since an FM signal obtained by removal of a PCM audio signal from a reproduction FM signal is FM demodulated and synchronizing separation is performed using the thus FM demodulated video signal, synchronizing separation can be performed accurately, and consequently, a stabilized reproduction video signal can be obtained. It is to be noted that, if a video signal is time base elongated and FM demodulated in the course of removal of a PCM audio signal, the level of the reproduced video signal will relatively drop comparing with a video signal level upon recording. However, such level of the video signal can be corrected by a time base correcting circuit (not shown) which may be connected to the de-emphasis circuit.

While the magnetic recording and reproducing apparatus of FIG. 29 and 31 are constructed such that a PCM audio signal is inserted into a vertical blanking period of a video signal upon recording, even when a video signal for one field or for one frame is divided into a plurality of tracks and a PCM audio signal is added to a first end or a last end of each of such tracks upon recording, synchronizing separation can be performed accurately and a stabilized reproduction video signal can be obtained if similar means to that of the magnetic recording and reproducing apparatus of FIG. 29 is employed.

Figure 32:
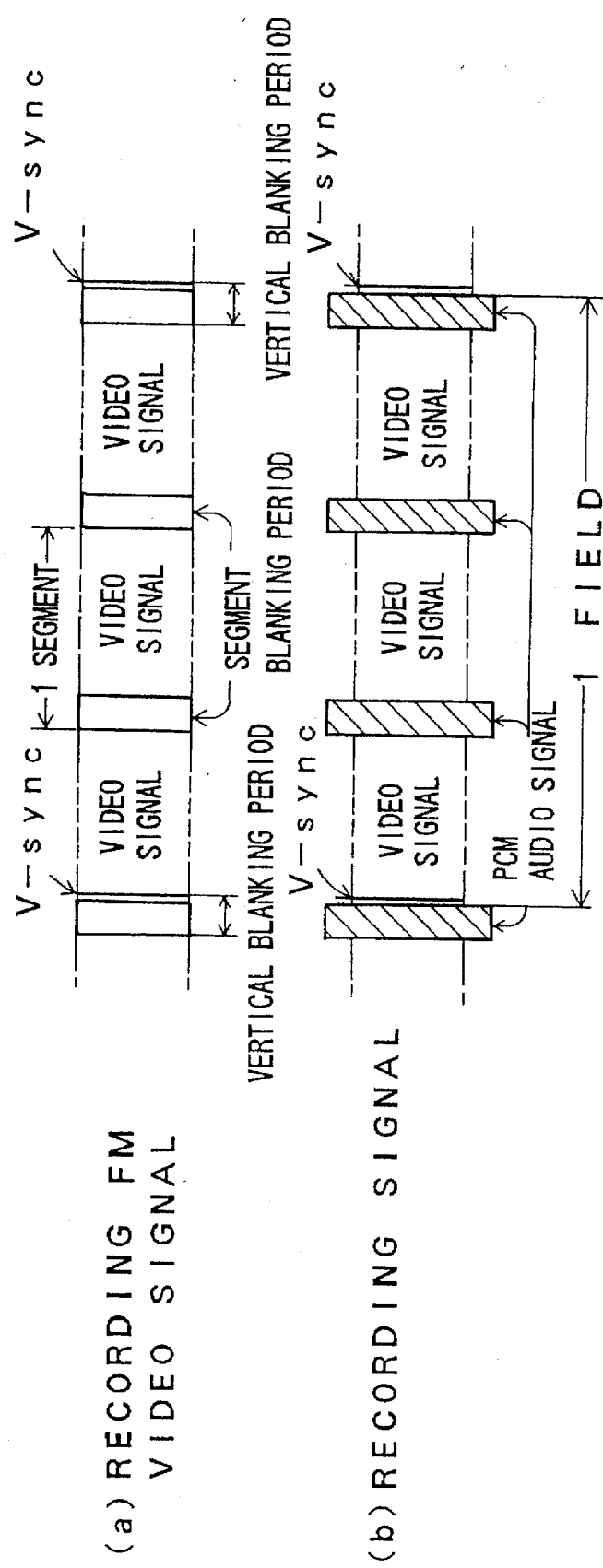
FIG. 32 is a time chart illustrating addition of a PCM audio signal to a first or last end of each of tracks on which a video signal is recorded.

For example, a video signal for one field can be recorded divisionally onto three tracks by the magnetic recording and reproducing apparatus shown in FIG. 29. In particular, upon recording, a video signal for one field is divided into three segments while a vertical blanking period is divided into three portions such that a segment blanking period may be provided between adjacent ones of the segments as seen from a waveform (a) in FIG. 32, and then the video signal is FM modulated. Then, a PCM audio signal and the FM video signal are added to each other in such a manner as seen from a waveform (b) of FIG. 32 by the adder 15 in response to a suitable change over operation of the switches 13 and 14.

Upon reproduction, a reproduction signal read out from the magnetic tape 200 by means of the reproducing magnetic head 18 is first amplified by the reproduction amplifier 19 and then transmitted to the A/D converter 72 and the PCM decoder 34. The PCM decoder 34 thus decodes a PCM audio signal in the reproduction signal and outputs a reproduction audio signal. Simultaneously, the PCM region signal generator 35 in the PCM decoder 34 generates a PCM region signal representative of a PCM audio signal in a similar manner as in the magnetic recording and reproducing apparatus of FIG. 29 (refer to a waveform (b) in FIG. 33).

Figure 33:
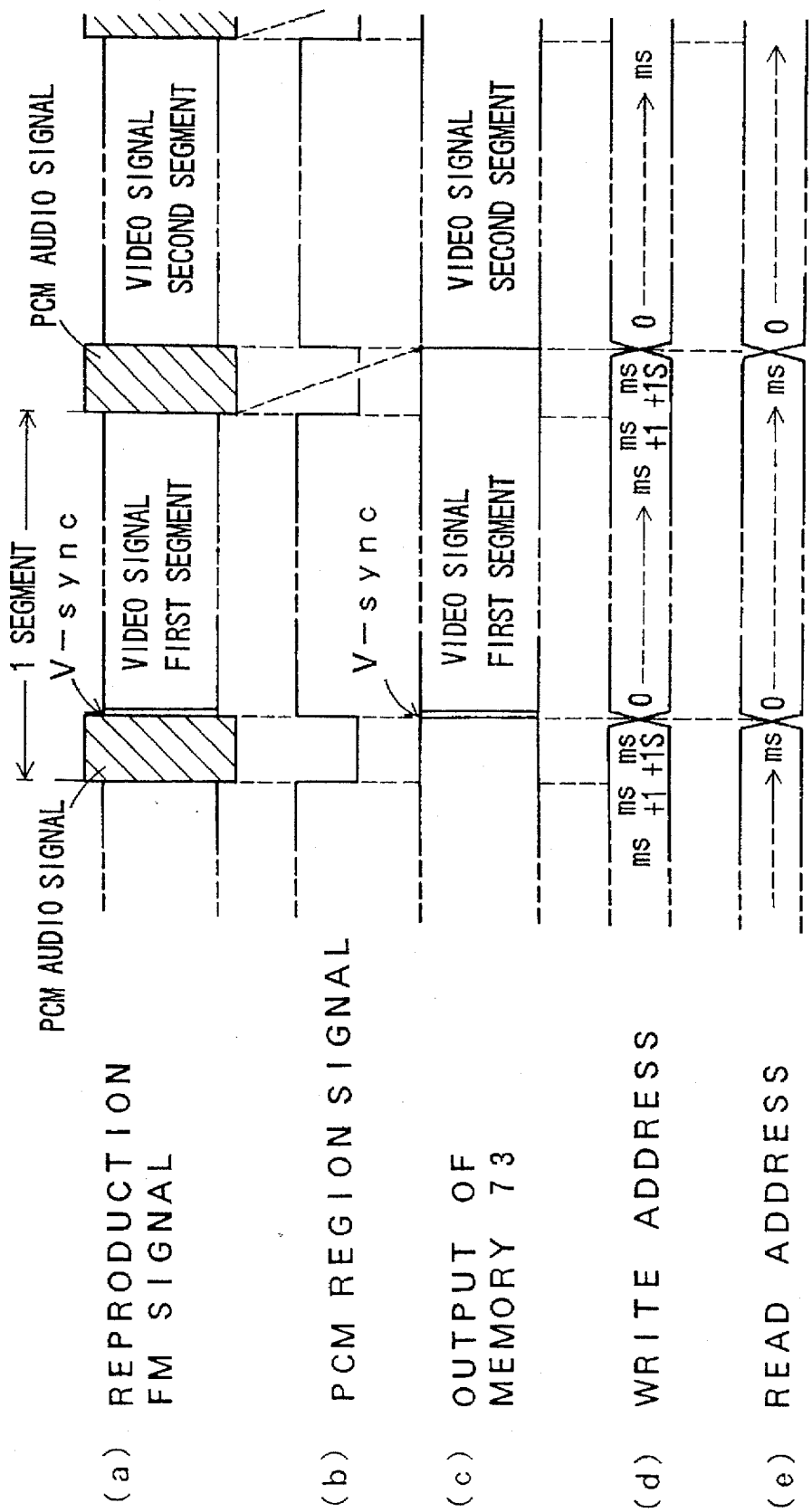
FIG. 33 is a time chart illustrating alternative operation of the magnetic recording and reproducing apparatus of FIG. 29.

Meanwhile, the reproduction FM signal having such a waveform as shown by a waveform (a) in FIG. 33 is converted into a digital signal by the A/D converter 72. The digital signal outputted from the A/D converter 72 is then stored into the memory 73 in response to a write clock signal synchronized with a sampling clock supplied to the A/D converter 72. The write address of the memory 73 is set such that it is cleared in response to such write clock signal and a PCM region signal from the PCM region signal generator 35 at a point of time when the PCM write address signal changes from a low level to a high level, and after then, it is incremented successively in response to the write clock signal as seen from a waveform (d) of FIG. 33. Thus, the reproduction FM signal for one segment is written into the memory 73 in accordance with such write address. It is to be noted that ms+ls is in FIG. 33 represents a number of samples of a reproduction FM signal for one segment while ls denotes a number of samples of a PCM audio signal.

When the thus stored data are to be read out from the memory 73, a read clock signal is produced in such a manner as given by the following expression:

(read clocks)=(write clocks)×(ms/(ms+ls))

so that the PCM audio signal data of the stored reproduction FM signal data may not be read out. Thus, the read address of the memory 73 is set such that it is cleared at a point of time when the PCM region signal changes from a low level to a high level, whereafter it is successively incremented in response to the read clock signal. Thus, the reproduction signal data except the PCM audio signal data are read out from the memory 73 in accordance with such read address, thereby obtaining such an output signal as seen from a waveform (c) in FIG. 33.

The output signal from the memory 73 free from a PCM audio signal is then re-converted into an analog signal by the D/A converter 74 and then transmitted to the reproduction equalizer 20, at which a frequency characteristic thereof is compensated for. Then, an output signal of the reproduction equalizer 20 is transmitted to the FM demodulator 21, at which it is FM demodulated. The FM demodulated reproduction video signal is then transmitted to the de-emphasis circuit 22, at which high frequency components emphasized by the pre-emphasis circuit 10 in the recording system are de-emphasized. Consequently, a reproduction video signal from which a PCM audio signal has been removed is FM demodulated.

While the case wherein a video signal for one field is recorded divisionally onto three tracks, even in another case wherein a video signal for one field or for one frame is recorded divisionally onto n (an integer equal to or greater than 2) tracks while a PCM audio signal is recorded additionally at a first end or a last end of each of such tracks, similar effects can be achieved by using similar means.

The modified magnetic recording and reproducing apparatus shown in FIG. 31 can be employed in order to realize such divisional recording of a video signal. In particular, a PCM region signal representative of a PCM audio signal region is generated from a reproduction FM signal by the PCM region signal generator 35 in the PCM decoder 34. A frequency characteristic of a reproduction FM signal from the reproduction amplifier 19 is compensated for by the reproduction equalizer 20, and an output of the reproduction equalizer 20 is converted into a digital FM signal by the A/D converter 72. Then, the reproduction digital FM signal is successively stored into the memory 73 in accordance with a write address which is produced so as to successively increase in response to a write clock signal after the memory 73 was cleared at a point of time when the PCM region signal from the PCM region signal generator 35 changed from a low level to a high level.

When the thus stored data are to be read out from the memory 73, a read clock signal is set in such a manner as described hereinabove so that the PCM audio signal data of the stored reproduction FM signal data may not be read out. Here, the read address of the memory 73 is set such that it is cleared at a point of time when the PCM region signal changes from a low level to a high level, whereafter it is successively incremented in response to the read clock signal. Thus, the reproduction digital FM signal data except the PCM audio signal data are read out from the memory 73 in accordance with such read address.

The digital FM signal from which such PCM audio signal has been removed is FM demodulated by the digital FM demodulator 77, and then high frequency components therein which were emphasized by the pre-emphasis circuit 10 in the recording system are de-emphasized by the de-emphasis circuit 75 so that a reproduction video signal from which a PCM audio signal has been removed is obtained.

While, in the foregoing description of the magnetic recording and reproducing apparatus shown in FIGS. 29 and 31, a reproduction FM signal written in the memory 73 is read out in a time base elongated condition in accordance with a PCM region signal generated by the PCM region signal generator 35 so that a PCM audio signal may be removed from the reproduction FM signal, it may be read out in a different manner. For example, a reproduction FM signal is written into the memory 73 in a similar manner as described hereinabove (refer to a waveform (e) of FIG. 34), and when it is to be read out from the memory 73, a period of a read clock signal is set equal to that of a write clock signal. The read address is reset at a point of time when the PCM region signal changes from a low level to a high level, and is thereafter incremented successively in response to the read clock signal (refer to a waveform (f) in FIG. 34). Then, the reproduction FM signal stored in the memory 73 is read out in accordance with such read address. Consequently, such an output signal as seen from a waveform (c) of FIG. 34 wherein a former portion of a video signal for one field follows a latter portion of the video signal of the same field, that is, a signal from which a PCM audio signal has been removed, is obtained.

Figure 35:
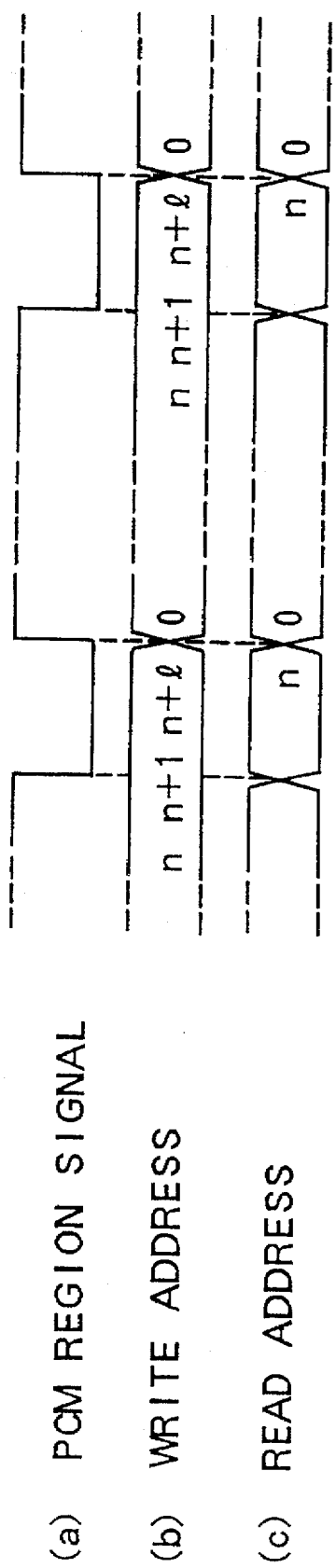
FIG. 35 is a time chart illustrating a further alternative operation of the magnetic recording and reproducing apparatus of FIG. 29.

It is also possible to set the read address otherwise such that it is reset at a point of time when the PCM region signal changes from a low level to a high level, whereafter it is successively incremented while the PCM region signal remains at a high level but is successively decremented after the PCM region signal changes from a high level to a low level (refer to a waveform (c) of FIG. 35). Then, if the stored reproduction FM signal is read out from the memory 73 in accordance with the address, then a video signal from which a PCM audio signal has been removed is obtained.

Alternatively, the read address may be set such that it is reset at a point of time when the PCM region signal changes from a low level to a high level, whereafter it is successively incremented while the PCM region signal remains at a high level, but after the PCM region signal changes from a high level to a low level, part of the addresses is repeated while the PCM region signal remains at a high level. Then, if the stored reproduction FM signal is read out from the memory 73 in accordance with the read address, a video signal from which a PCM audio signal has been removed is obtained.

Or else, the read address may be set such that it is reset at a point of time when the PCM region signal changes from a low level to a high level, whereafter it is successively incremented while the PCM region signal remains at a high level, but part of the addresses is repeated while the PCM region signal remains at a low level. Also in this instance, if the stored reproduction FM signal is read out from the memory 73 in accordance with the read address, then a video signal from which a PCM audio signal has been removed is obtained.

In any case, since a reproduction FM signal from which a PCM audio signal has been removed is FM modulated to obtain a video signal and synchronizing separation is performed for such video signal, synchronizing separation can be performed accurately, and consequently, a stabilized reproduction video signal can be obtained.

Figure 36:
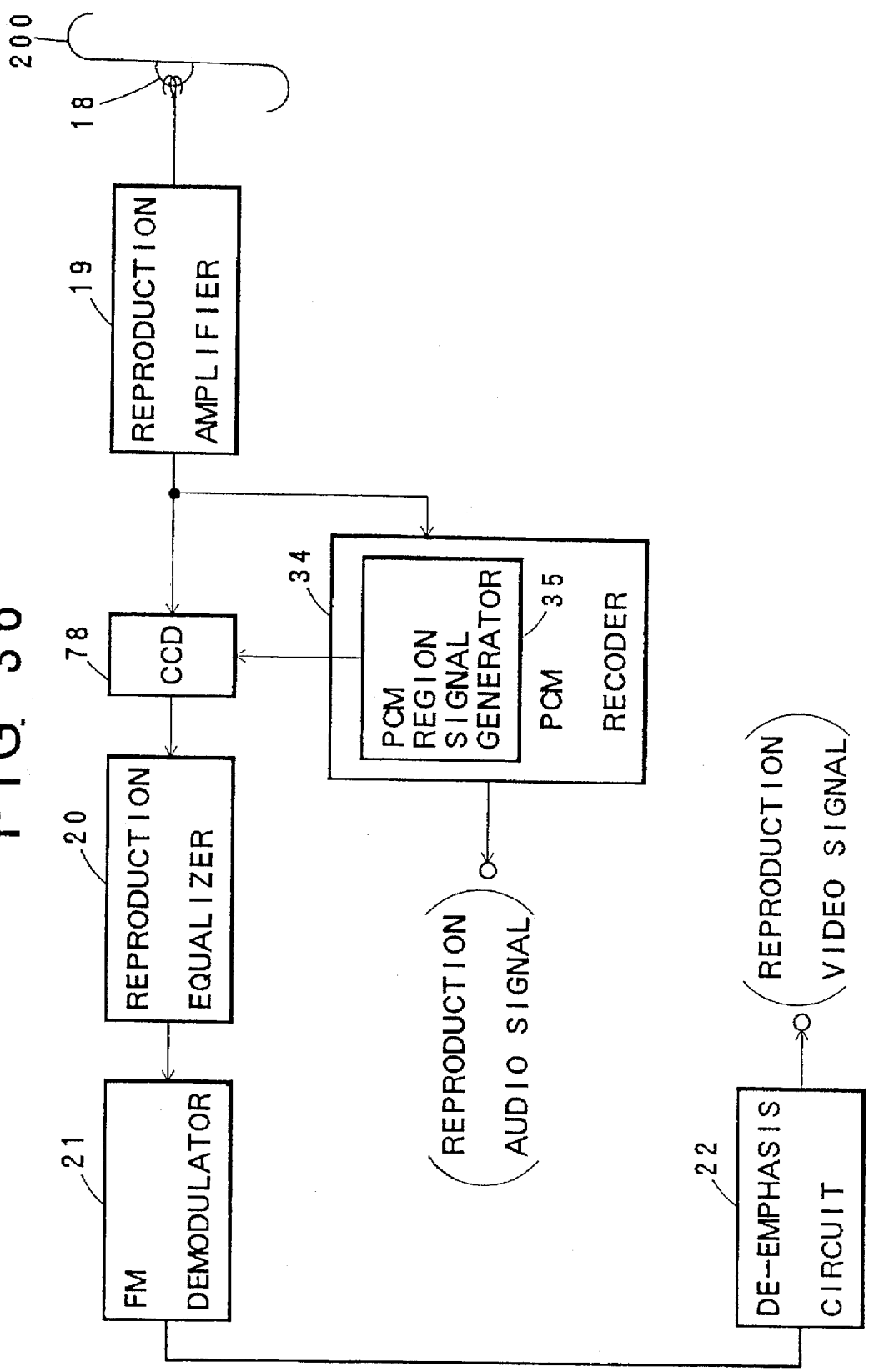
FIG. 36 is a block diagram showing another modification to the magnetic recording and reproducing apparatus of FIG. 29.

Referring now to FIG. 36, there is shown a modification to the reproducing system of the magnetic recording and reproducing apparatus of FIG. 29. The modified reproducing system includes a CCD (charge coupled device) 78 for storing a reproduction FM signal therein, in place of the A/D converter 72, memory 73 and D/A converter 74.

In operation, upon reproduction, a reproduction signal read out from the magnetic tape 200 by means of the reproducing magnetic head 18 is first amplified by the reproduction amplifier 19 and transmitted to the CCD 78 and the PCM decoder 34. The PCM decoder 34 thus decodes a PCM audio signal in the reproduction signal and outputs a reproduction audio signal. Simultaneously, the PCM region signal generator 35 in the PCM decoder 34 generates a PCM region signal representative of a PCM audio signal in a similar manner as described hereinabove (refer to a waveform (c) in FIG. 37).

Figure 37:
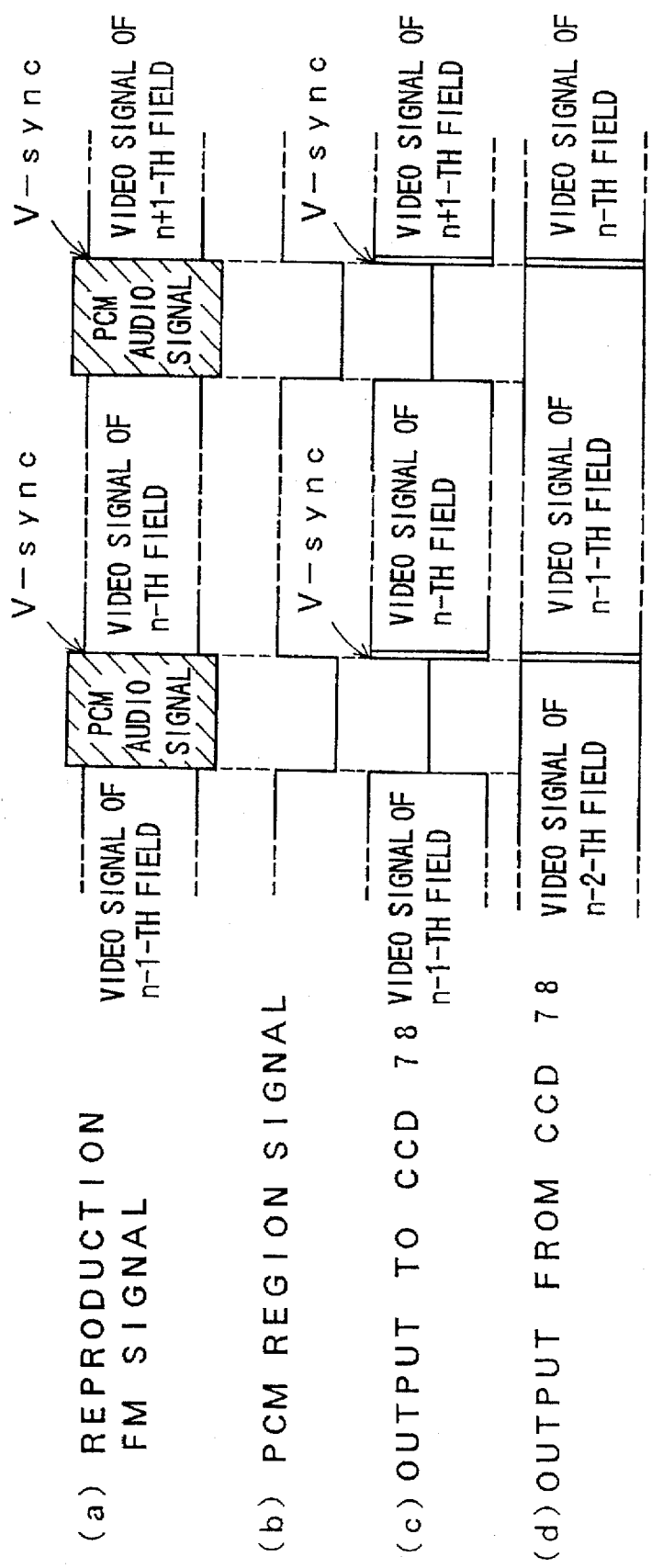
FIG. 37 is a time chart illustrating operation of the modified magnetic recording and reproducing apparatus of FIG. 36.

Meanwhile, the reproduction FM signal for one field from which the PCM audio signal has been removed is successively stored into the CCD 78 in response to a write clock signal beginning with a point of time when the PCM region signal changes from a low level to a high level, but in a PCM audio signal region, such write clock signal is stopped to stop writing into the CCD 78 (refer to a waveform (c) of FIG. 37).

When the thus stored data are to be read out from the CCD 78, a read clock signal is produced in such a manner as given by the following expression:

(read clocks)=(write clocks)×(mc/(mc+lc))

where lc is a period of a PCM audio signal for one field and mc+lc is a period of one field, so that a reproduction FM signal for one field except a PCM audio signal may be time base elongated to make a signal for one field period. Using such read clock, a signal except a PCM audio signal is read out from the CCD 78 (refer to a waveform (d) of FIG. 37.

The output signal from the CCD 78 free from a PCM audio signal is then transmitted to the reproduction equalizer 20, at which a frequency characteristic thereof is compensated for. Then, an output signal of the reproduction equalizer 20 is transmitted to the FM demodulator 21, at which it is FM demodulated. The FM demodulated reproduction video signal is transmitted to the de-emphasis circuit 22, at which high frequency components emphasized by the pre-emphasis circuit 10 in the recording system are de-emphasized. Consequently, synchronizing separation is performed using a video signal obtained by demodulation of a reproduction FM signal from which a PCM audio signal has been removed is performed, and accordingly, synchronizing separation can be performed accurately without being influenced by a PCM audio signal which makes a noise in the course of FM demodulation. Consequently, a stabilized reproduction video signal can be obtained.

The reproducing system may be used also for such case wherein a video signal for one field or for one frame is recorded divisionally onto a plurality of tracks and a PCM audio signal is recorded additionally at a first end or a last end of each of the tracks. In this instance, a reproduction signal for each segment is written into the CCD 78, and then the stored reproduction is read out from the CCD 78 in a time base elongated condition while a read clock signal is set so that a PCM audio signal may be removed. Consequently, similar effects can be achieved.

Figure 34:
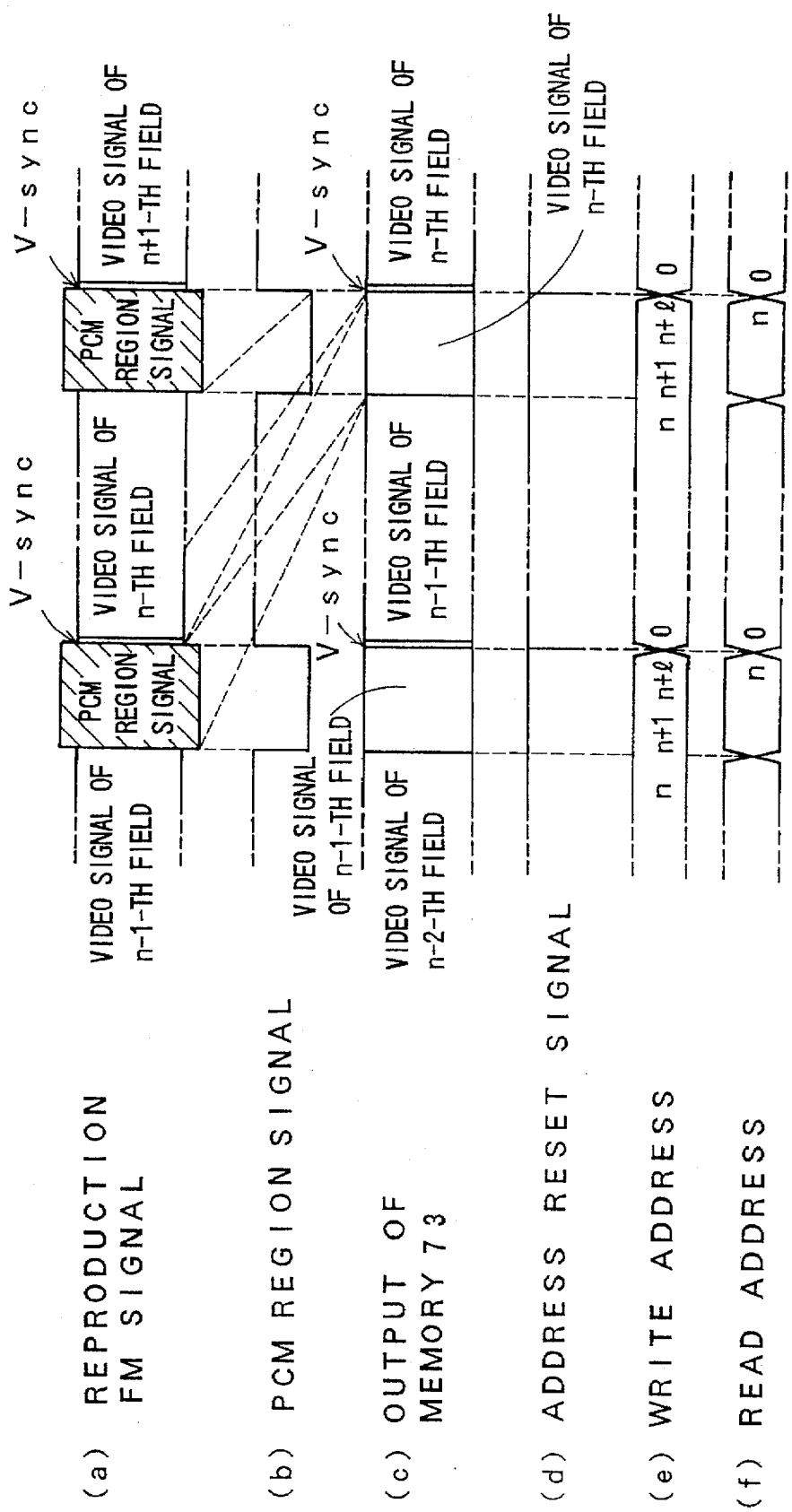
FIG. 34 is a similar view but illustrating another alternative operation of the magnetic recording and reproducing apparatus of FIG. 29.

Such control as described hereinabove with reference to FIG. 34 may be performed with the recording system of FIG. 36. In this instance, a reproduction FM signal is written into the CCD 78 in such a manner as described above. Meanwhile, a period of a read clock signal which is used upon reading from the CCD 78 is set equal to that of a write clock signal. After the PCM region signal changes from a high level to a low level, the reproduction FM signal stored in the CCD 78 is successively read out beginning with the top data thereof, but after the PCM region signal changes from a low level to a high level, the stored reproduction FM signal is successively read out beginning with the top data thereof again. Consequently, a signal from which a PCM audio signal has been removed is obtained.

Similar effects can be attained otherwise if the stored reproduction FM signal is successively read out, after the PCM region signal changes from a high level to a low level, from the CCD 78 beginning with the first data thereof, and after the PCM region signal changes from a low level to a high level, the stored reproduction FM signal is read out beginning with particular data thereof again.

Further, also in case a video signal for one field or for one frame is divided into a plurality of channels and then each of the channels is divided into a plurality of tracks and a PCM audio signal is recorded additionally at a first end or a last end of each of the tracks, similar effects can be attained if the memory 73 or the CCD 78 is operated in a similar manner as described hereinabove.

It is to be noted that similar effects can be attained if only demodulation of a PCM audio signal is inhibited when a reproduction FM signal is digitally demodulated.

Figure 38:
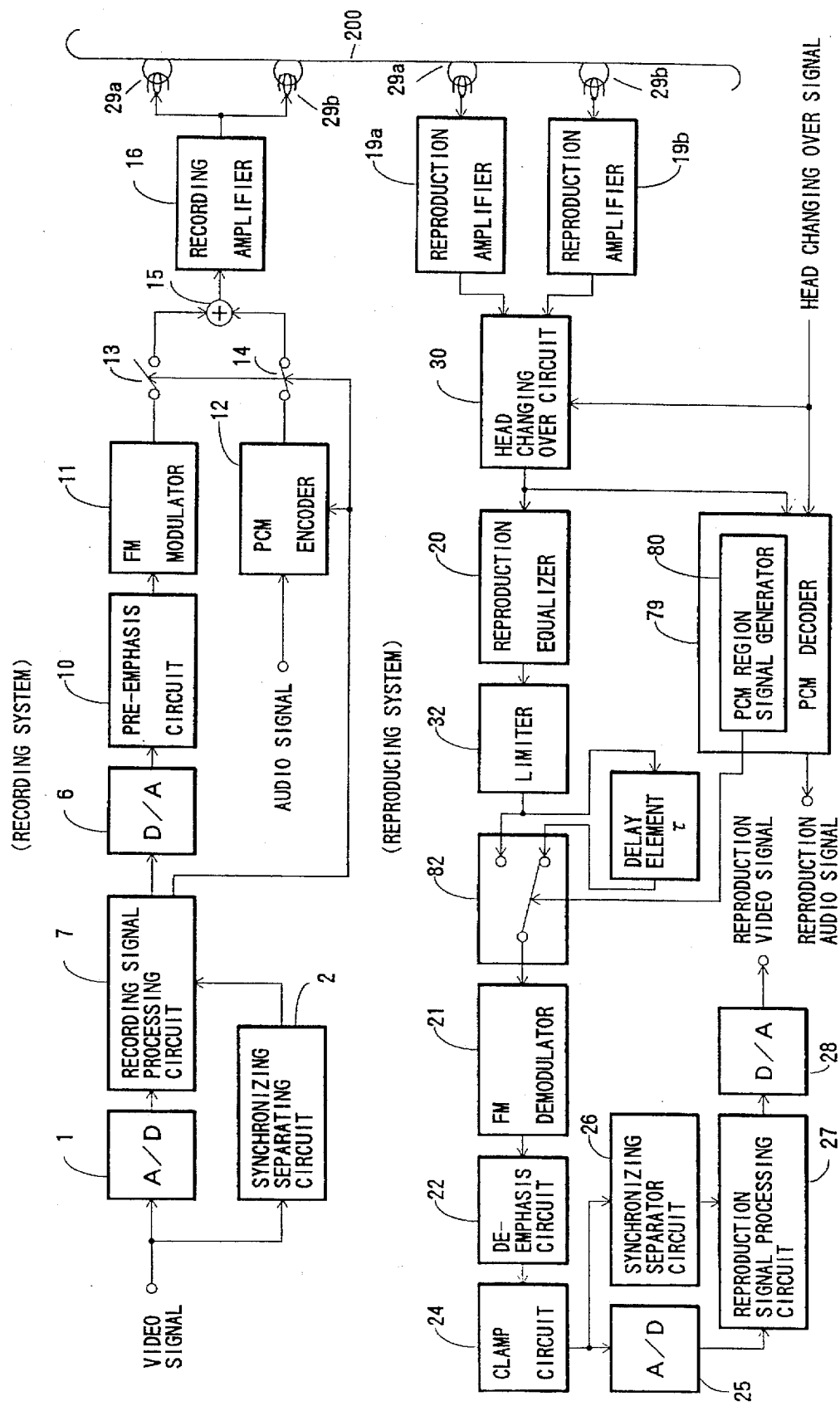
FIG. 38 is a block diagram of a yet further magnetic recording and reproducing apparatus showing a sixth preferred embodiment of the present invention.

Referring now to FIG. 38, there is shown a magnetic recording and reproducing apparatus according to a sixth preferred embodiment of the present invention. The magnetic recording and reproducing apparatus includes a recording system which is similar in construction to the recording system of the magnetic recording and reproducing apparatus shown in FIG. 23 except that it includes a recording signal processing circuit 7 and a digital to analog (D/A) converter 6 in place of the recording signal processing circuit 3, vertical blanking data generator 57 and selector 58 and the D/A converter 59, respectively, of the magnetic recording and reproducing apparatus of FIG. 23 and additionally includes a pre-emphasis circuit 10 connected to the D/A converter 6. The recording signal processing circuit 7 performs recording signal processing such as to insert blanking data into an input video signal with reference to a synchronizing signal outputted from the first synchronizing separator circuit 2. The recording signal processing circuit 7 further operates to generate a timing pulse for inserting a PCM audio signal into an FM video signal. Such timing signal is transmitted to the PCM encoder 12 and also to the switches 13 and 14 so as to close or open the switches 13 and 14 in accordance therewith. An input video signal processed by the recording signal processing circuit 7 is inputted to the D/A converter 6, at which it is converted from a digital signal into an analog signal. An analog output video signal of the D/A converter 6 is inputted to the pre-emphasis circuit 10, at which high frequency components thereof are emphasized, and then inputted to the FM modulator 11. It is to be noted that the magnetic recording and reproducing apparatus includes a pair of rotary heads 29a and 29b which each acts as a recording head and a reproducing head upon recording and reproduction, respectively. It is also to be noted that, different from the recording system of the magnetic recording and reproducing apparatus of FIG. 23, the recording signal processing circuit 7 and D/A converter 6 of the present recording system do not operate upon reproduction.

The recording system of the magnetic recording and reproducing apparatus of FIG. 38 is substantially similar to the recording system of the conventional magnetic recording and reproducing apparatus shown in FIG. 59 and described hereinabove.

The magnetic recording and reproducing apparatus further includes a reproducing system which is also similar in construction to the reproducing system of the magnetic recording and reproducing apparatus of FIG. 23 except that it includes a pair of reproduction amplifiers 19a and 19b and a PCM decoder 79 in place of the single reproduction amplifier 19 and the PCM decoder 23, respectively, and additionally includes a head change over circuit 30 interposed between the reproduction amplifiers 19a and 19b and the reproduction equalizer 20, a limiter 32 connected to the reproduction equalizer 20, a switch circuit 82 interposed between the limiter 32 and the FM demodulator 21, a delay circuit 81 interposed between the limiter 32 and the switch circuit 82, and a de-emphasis circuit 22 interposed between the FM demodulator 21 and clamp circuit 24. The reproduction amplifiers 19a and 19b amplify reproduction signals from the rotary heads 29a and 29b, respectively, and the thus amplified reproduction signals are selectively transmitted by way of the head changing over circuit 30 in response to a head changing over signal. The PCM decoder 79 is similar in construction to the PCM decoder 61 described hereinabove and includes a PCM region signal generator 80 which is also similar in construction to the PCM region signal generator 62 in the PCM decoder 61. The limiter 32 receives an output reproduction FM video signal of the reproduction equalizer 20 and removes amplitude variation components from the received reproduction FM video signal. The delay element 81 has a delay period τ and delays an output signal bf the limiter 32 by such delay period τ. The switch circuit 82 selects one of an output signal of the limiter 32 and an output signal of the delay element 81 in accordance with a PCM region signal received from the PCM region signal generator 80 of the PCM decoder 79. The de-emphasis circuit 22 has a reverse characteristic to that of the pre-emphasis circuit 10 of the recording system.

Figure 59:
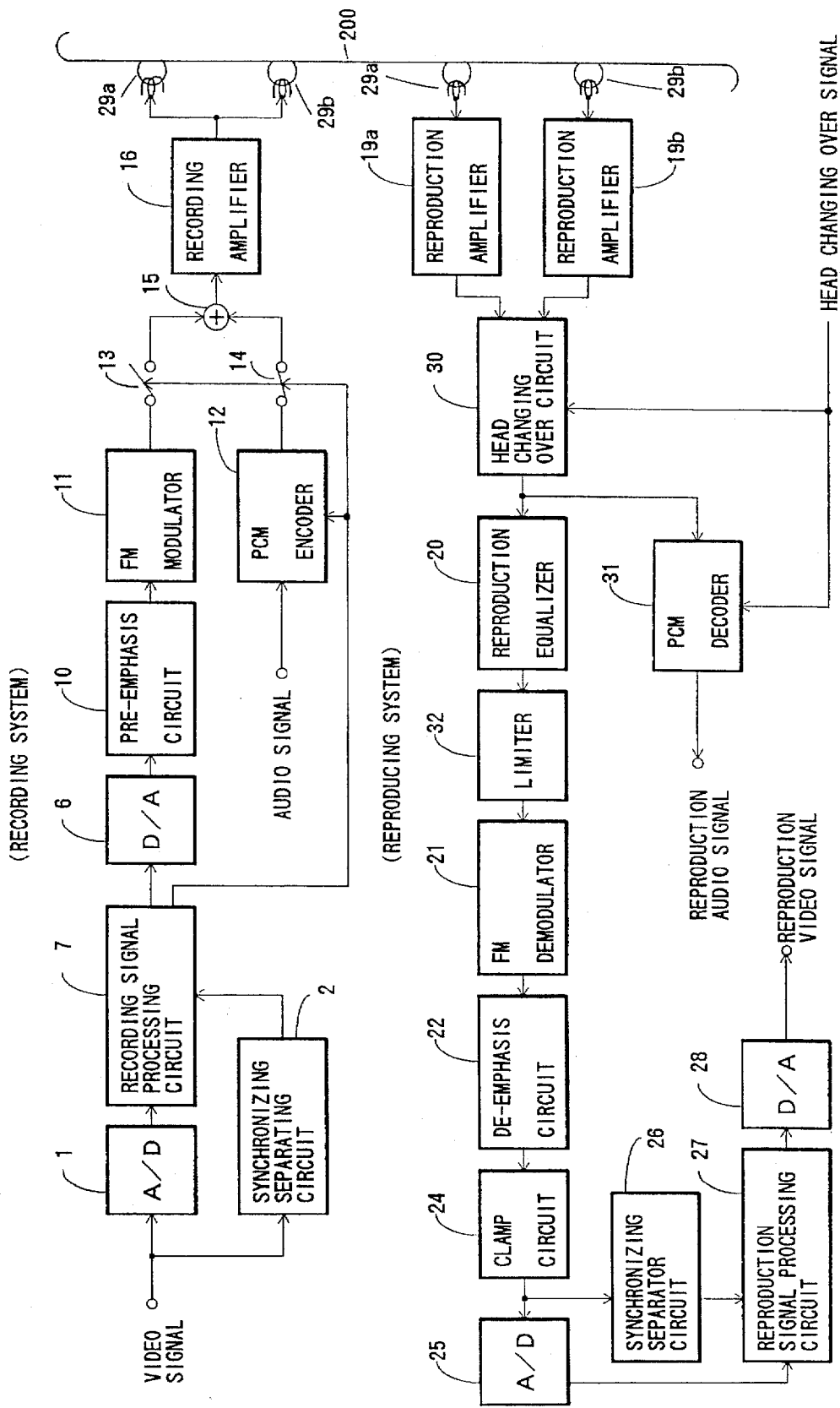
FIG. 59 is a block diagram showing a further conventional magnetic recording and reproducing apparatus.

The reproducing system of the magnetic recording and reproducing apparatus of FIG. 38 is thus similar in construction to the reproducing system of the conventional magnetic recording and reproducing apparatus of FIG. 59 except that it includes, in place of the PCM decoder 31, the PCM decoder 79 including the PCM region signal generator 80 therein and additionally includes the delay element 81 and switch circuit 82.

In operation, an input video signal is first converted from an analog signal into a digital signal by the A/D converter 1 and then outputted to the recording signal processing circuit 7. At the recording signal processing circuit 7, such recording signal processing as to insert blanking data is performed in accordance with a synchronizing separation output of the first synchronizing separator 2. The recording signal processing circuit 7 also generates and outputs a timing pulse for inserting a PCM audio signal into an FM video signal. An output recording signal of the recording signal processing circuit 7 is converted from a digital signal into an analog signal by the D/A converter 6 and then inputted to the pre-emphasis circuit 10, at which high frequency components thereof are emphasized. The recording video signal is subsequently supplied to the FM modulator 11 while an input audio signal is supplied to the PCM encoder 12, whereafter the video signal and audio signal are processed by the FM modulator 11 and PCM encoder 12, switches 13 and 14, adder 15 and recording amplifier 16 in a similar manner as in the magnetic recording and reproducing apparatus of FIG. 23 described hereinabove and then recorded onto a magnetic tape 200 by means of the rotary heads 29a and 29b. In this instance, a change over operation of the switches 13 and 14 is performed in response to a timing pulse transmitted thereto from the recording signal processing circuit 7. Also the PCM encoder 12 operates in response to such timing pulse from the recording signal processing circuit 7.

Figure 60:
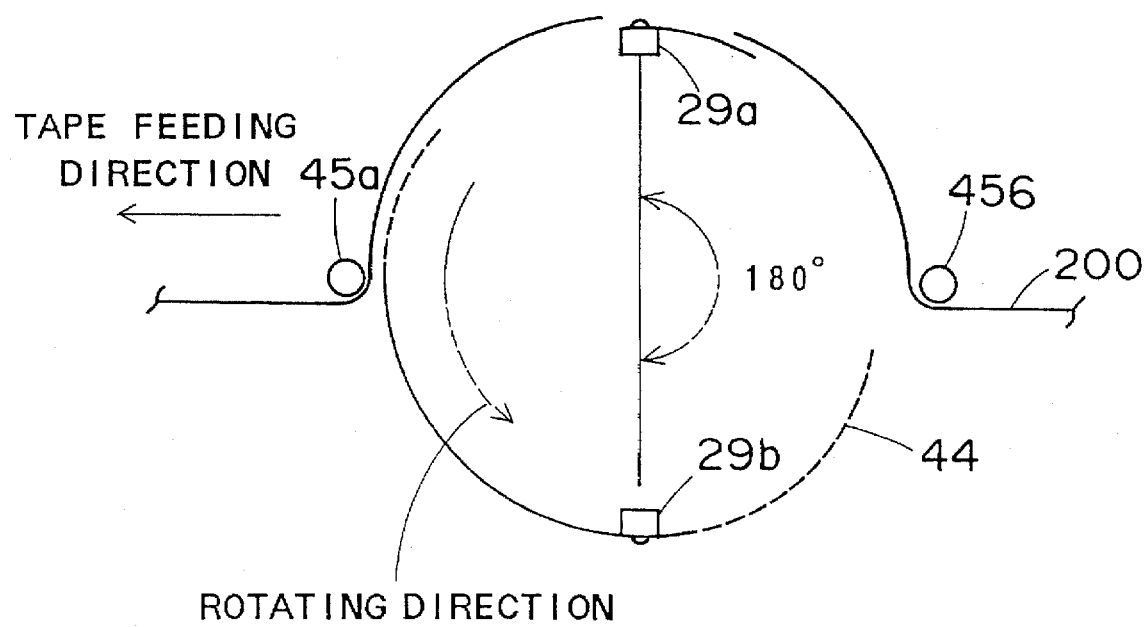
FIG. 60 is a diagrammatic representation showing a rotary drum as viewed from above.
Figure 61:
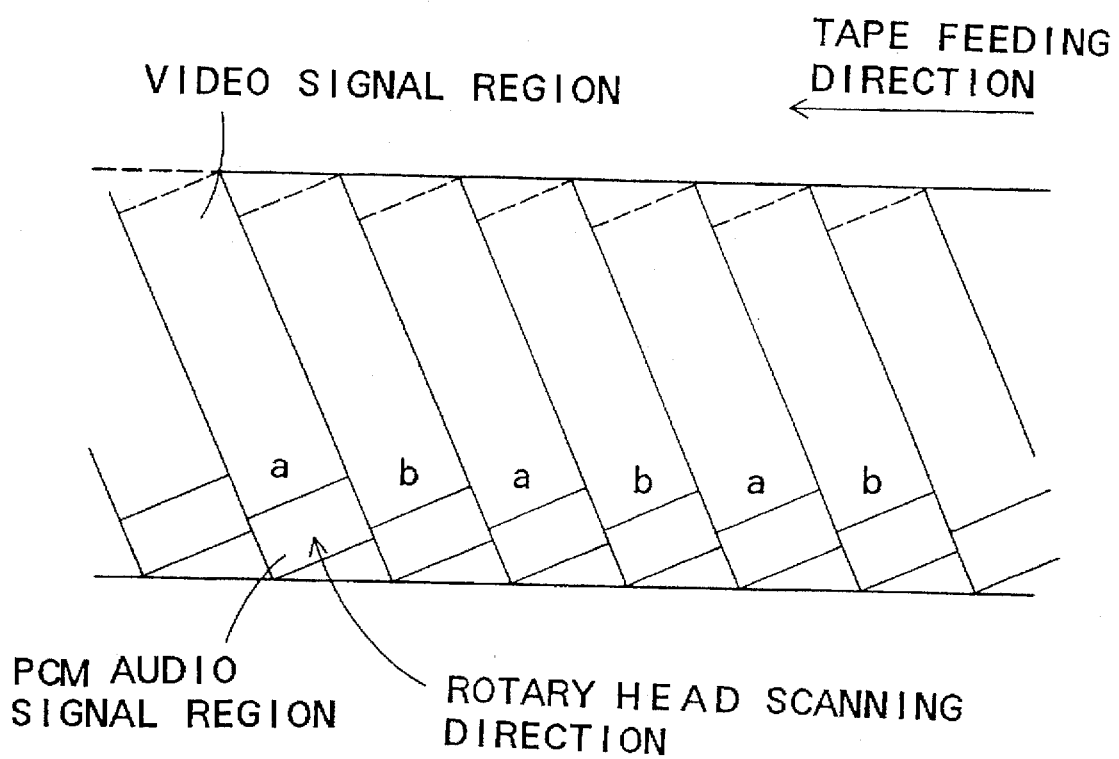
FIG. 61 is a diagrammatic view showing a record pattern on a magnetic tape.

It is to be noted that, in this instance, the recording signal is recorded into two regions or tracks a and b by the rotary heads 29a and 29b, respectively, while the rotary drum vertical blanking data generator 44 (FIG. 60) makes one full rotation such that a recording signal for one field is recorded onto one track, and a PCM audio signal is recorded in a time division multiplexed condition in a vertical blanking period of an FM video signal and thus at each of hatched portions of the tracks a and b, similarly as in the conventional magnetic recording and reproducing apparatus of FIG. 59.

Figure 62:
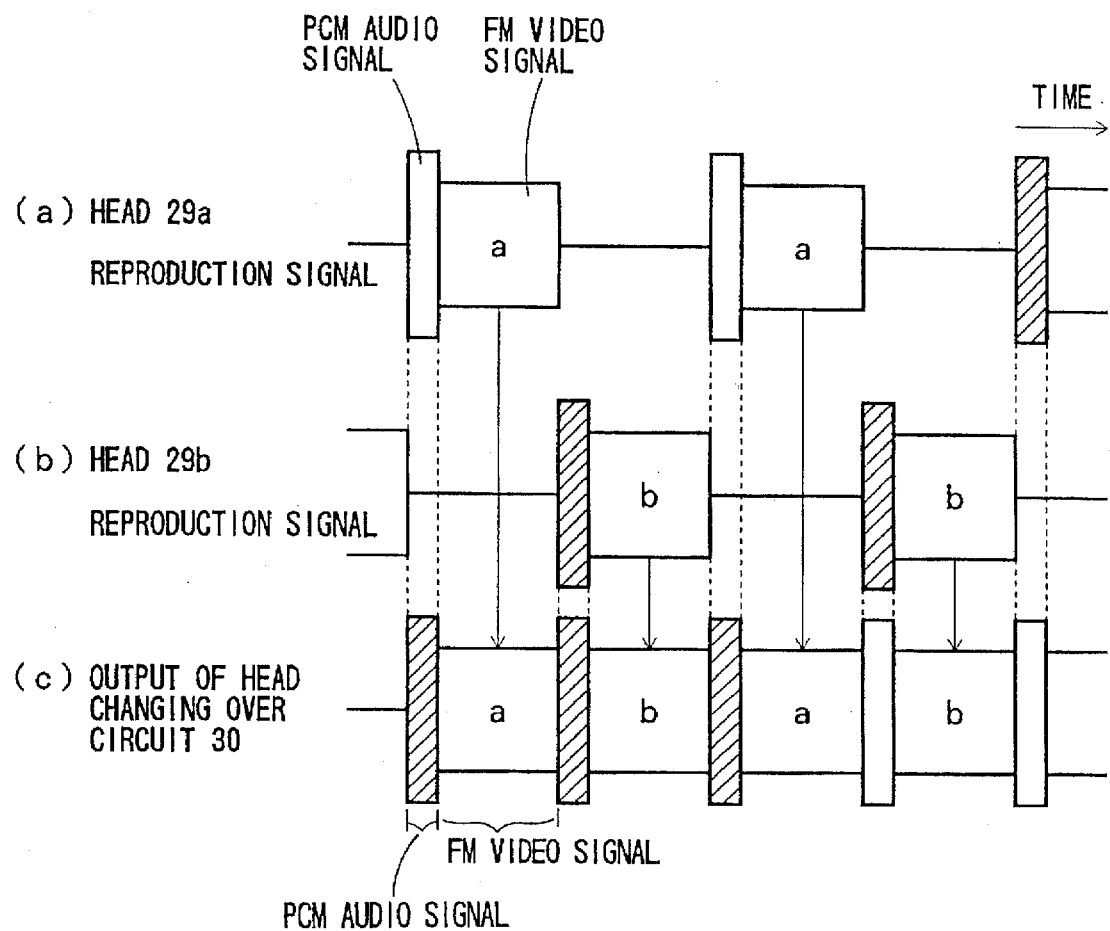
FIG. 62 is a waveform diagram illustrating operation of a head changing over circuit of the conventional magnetic recording and reproducing apparatus of FIG. 59.
Figure 64:
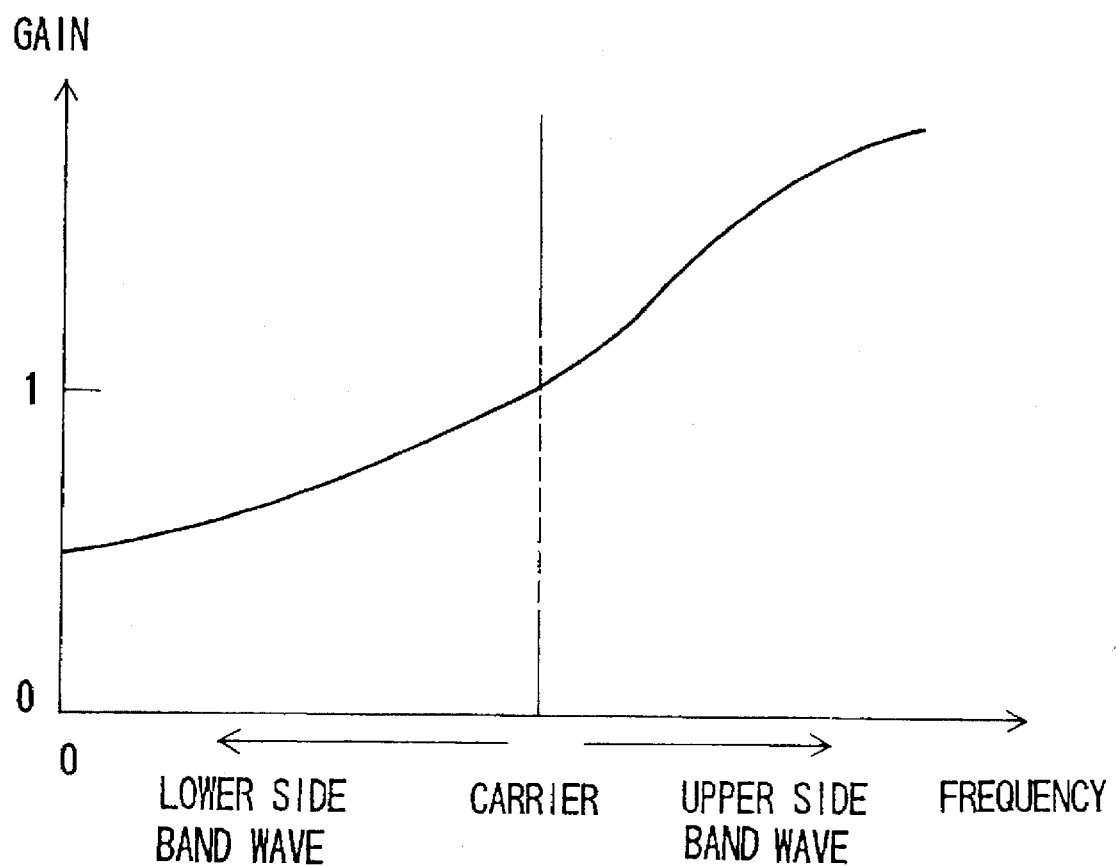
FIG. 64 is a diagram showing a frequency characteristic of the reproduction equalizer of the conventional magnetic recording and reproducing apparatus of FIG. 59.
Figure 65:
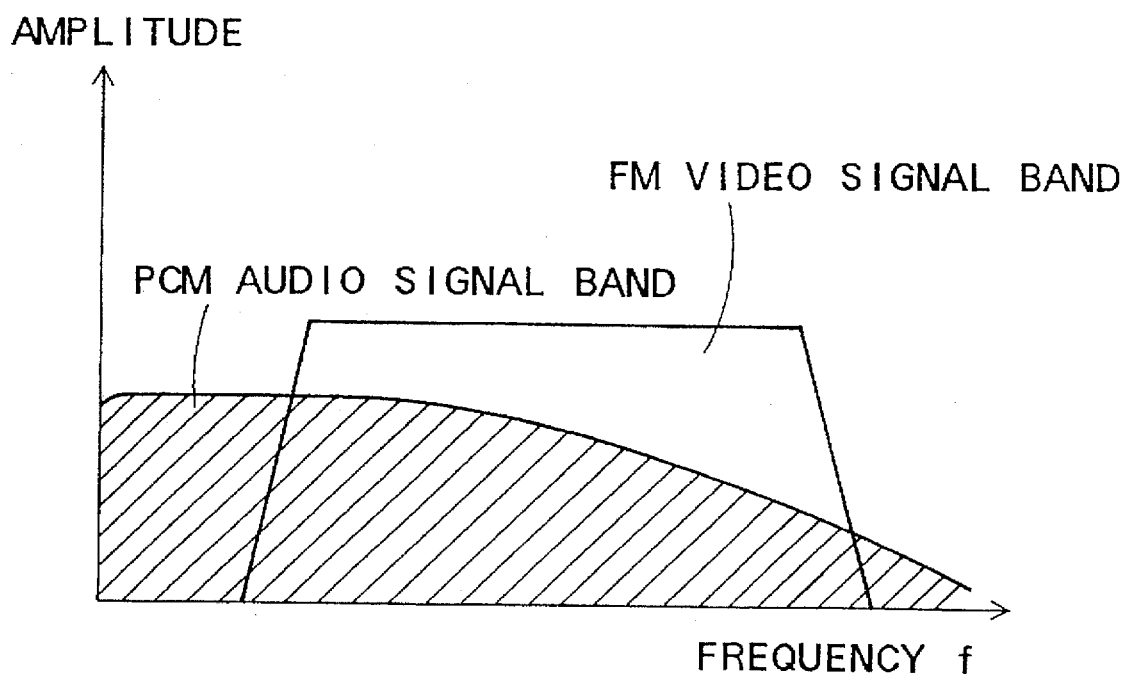
FIG. 65 is a diagram showing an FM video signal band and a PCM audio signal band of the conventional magnetic recording and reproducing apparatus of FIG. 59 upon reproduction.

The thus recorded FM video signal and PCM audio signal are reproduced from the magnetic tape 200 by means of the rotary heads 29a and 29b and then amplified by the reproducing amplifiers 19a and 19b. Then, such reproduction signals outputted from the reproduction amplifiers 19a and 19b as seen from the waveforms (a) and (b) shown in FIG. 62 are selectively transmitted by the head change over circuit 30 in response to a head changing over signal so that a reproduction signal of a rotary head (FIG. 60) which currently contacts with the magnetic head 200 may be selected thereby to form such a single reproduction signal as shown by the waveform (c) of FIG. 62. The reproduction signal from the head changing over circuit 30 is then transmitted to the reproduction equalizer 20 and also to the PCM decoder 79. At the PCM decoder 79, a PCM audio signal for one field inserted in a vertical blanking period of the received reproduction signal is detected and then such signal processing as error correction, de-shuffling, error modification and so forth is performed for the thus detected PCM audio signal to restore an original audio signal. The thus restored audio signal is outputted as an output signal of the recording system from the PCM decoder 79. Meanwhile, at the reproduction equalizer 20, a frequency characteristic of a reproduction FM video signal of the inputted reproduction signal is compensated for, and then an output signal of the reproduction equalizer 20 is transmitted to the limiter 32, at which amplitude variation components of the reproduction FM video signal are removed.

By the way, if a reproduction FM video signal and a PCM audio signal multiplexed in a vertical blanking period of such reproduction FM video signal are FM demodulated as they are by the FM demodulator 21, the reproduction FM demodulated video signal presents such an output signal waveform (a) as shown in FIG. 39 as if it includes noises in its PCM audio signal region, similarly as in the conventional magnetic recording and reproducing apparatus of FIG. 59.

Thus, the reproduction signal outputted from the limiter 32 is transmitted to the switch circuit 82 and delay element 81 so that a signal in a PCM audio signal region may be replaced by a reproduction FM video signal of a preceding field as seen from a waveform (b) of FIG. 39. Here, a PCM region signal generated in a similar manner as described hereinabove by the PCM region signal generator 80 in the PCM decoder 79 and representative of a PCM audio signal region is transmitted to the switch circuit 82.

Figure 40:
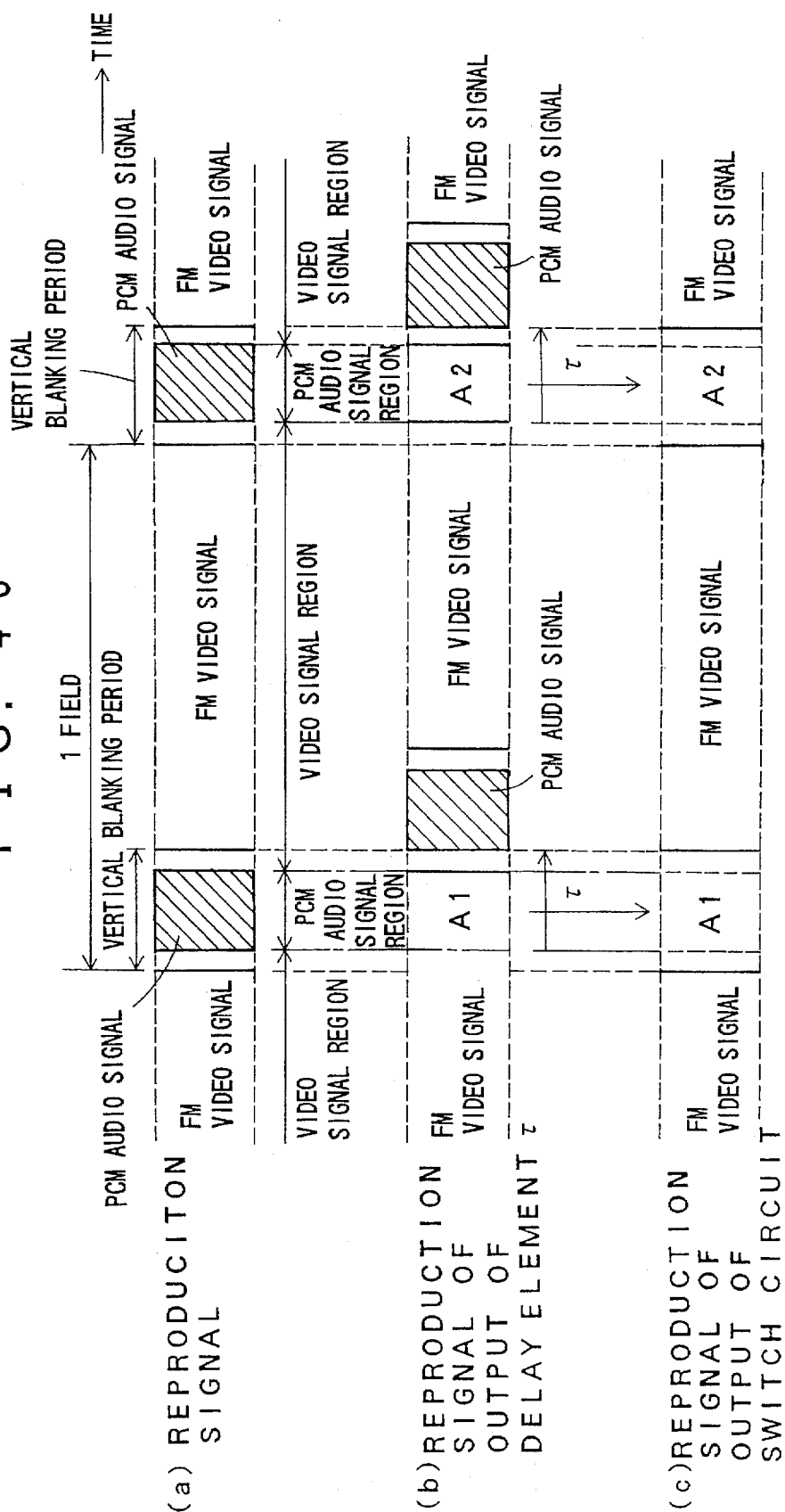
FIG. 40 is a waveform diagram illustrating operation of a PCM region signal generator, a delay element and a switch circuit of the magnetic recording and reproducing apparatus of FIG. 38.

The switch circuit 82 is thus changed over in accordance with the thus received PCM region signal such that it selects, in a video signal region, a reproduction signal (waveform (a) in FIG. 40) outputted from the limiter 32, but selects, in a PCM audio signal region, such an output of the delay element 81 having the delay time τ as shown by a waveform (b) in FIG. 40. Since the delay element 81 outputs a reproduction FM signal obtained by delaying a signal of a preceding field to the PCM audio signal region by the delay time τ, the signal in the PCM audio signal region is such a reproduction FM signal delayed for a period of the delay time τ of the preceding field as indicated by a portion A1 or A2 of a waveform (c) in FIG. 40.

Accordingly, a reproduction FM signal outputted from the switch circuit 82 and inputted to the FM demodulator 21 is such a signal wherein a reproduction FM signal obtained by delaying, for a period of the time τ, a signal of a preceding field to a vertical blanking period in which a PCM audio signal is inserted is inserted into a PCM audio signal region as shown by the waveform (c) of FIG. 40. Consequently, if an output of the switch circuit 82 is demodulated by the FM demodulator 21 and high frequency components thereof emphasized by the pre-emphasis circuit 10 in the recording system are de-emphasized by the de-emphasis circuit 22, such a reproduction video signal wherein high frequency noises are reduced as shown by the waveform (b) of FIG. 39 is obtained. Thus, since a signal in a PCM audio signal region is replaced by a reproduction video signal of a preceding field, synchronizing separation of a reproduction video signal can be performed accurately, and consequently, the clamp circuit 24 operates normally. Further, a synchronizing signal is added also to a signal in a PCM audio signal region, and consequently, a signal can be clamped also in a PCM audio signal region and sags can be reduced.

A reproduction video signal outputted from the de-emphasis circuit 22 is inputted to the clamp circuit 24, at which an end portion of a synchronizing signal thereof is clamped at a predetermined dc voltage level. An output reproduction video signal of the clamp circuit 24 is converted from an analog signal into a digital signal by the A/D converter 25 and transmitted to the reproduction signal processing circuit 27. Meanwhile, the second synchronizing separator circuit 26 separates a synchronizing signal from the reproduction video signal from the clamp circuit 24. The reproduction signal processing circuit 27 performs such reproduction signal processing of the reproduction video signal from the A/D converter 25 as time base correction or dropout compensation in accordance with a synchronizing separation output of the second synchronizing separator circuit 26, and a reproduction video signal outputted from the reproduction signal processing circuit 27 is then converted from a digital signal into an analog signal by the D/A converter 28 to produce an analog reproduction video signal. A good reproduction video signal is thus obtained and outputted as an output signal of the reproducing system.

It is to be noted that, while the delay time of the delay element 81 of the magnetic recording and reproducing apparatus of FIG. 38 is set to t equal to a period of a PCM audio signal region and a PCM audio signal is multiplexed into a vertical blanking period of a recording video signal and then, upon reproduction, a PCM audio signal in such PCM audio signal region is replaced by a reproduction FM video signal of a preceding field prior by a period corresponding to the delay time τ before it is FM demodulated, it need not be such specific delay time, but may have any other delay time. Thus, similar effects can be exhibited if a signal in a PCM audio signal region is replaced by a reproduction FM video signal other than a signal in such PCM audio signal region.

Figure 41:
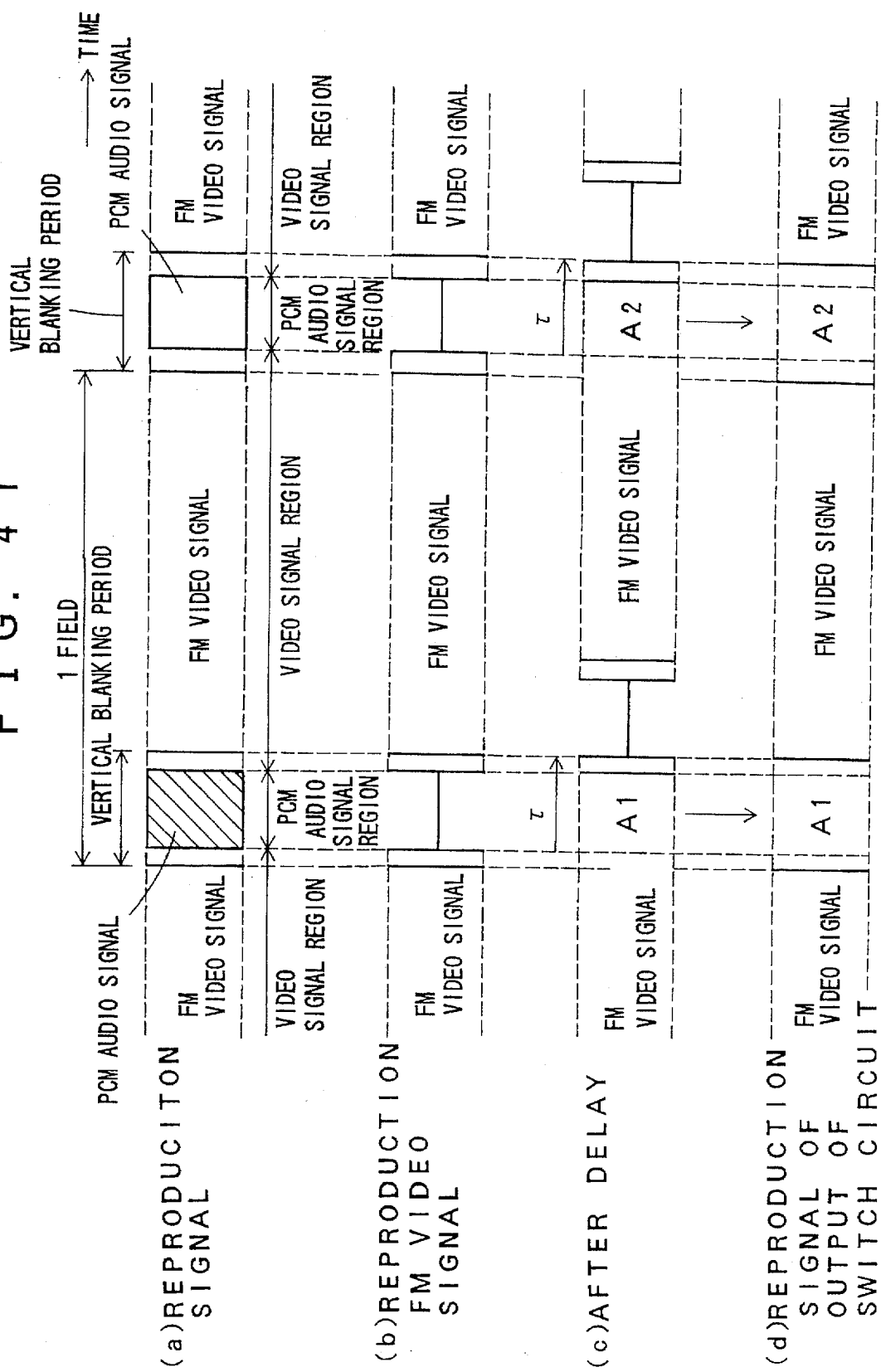
FIG. 41 is a similar view but illustrating alternative operation of the PCM region signal generator, delay element and switch circuit of the magnetic recording and reproducing apparatus of FIG. 38.

Further, while such a PCM audio signal mixed with a reproduction FM video signal as seen from a waveform (a) of FIG. 41 is processed, upon reproduction, as it is as a reproduction signal in the magnetic recording and reproducing apparatus of FIG. 38, also where the magnetic recording and reproducing apparatus is constructed otherwise such that an FM video signal and a PCM audio signal of a reproduction signal are separated as seen from a waveform (b) in FIG. 41 at an output, for example, of the limiter 32, a reproduction video signal after FM demodulation will make such a noise in a PCM audio signal region as seen from the waveform (c) in FIG. 57 and also from FIG. 54. Accordingly, similarly as in the magnetic recording and reproducing apparatus of FIG. 38, the switch 82 is changed over in accordance with a PCM region signal outputted from the PCM region signal generator 80 to select, in a video signal region, such reproduction FM video signal (waveform (b) in FIG. 41), but select, in a PCM audio signal region, a signal (waveform (c) in FIG. 41) obtained by delaying the reproduction FM video signal by the delay time T by means of the delay element 81. With such alternative construction, similar effects to those of the magnetic recording and reproducing apparatus of FIG. 38 can be attained.

Further, while the PCM region signal generator 80 of the magnetic recording and reproducing apparatus of FIG. 38 generates a PCM region signal by such construction that it detects an end timing of a PCM audio signal region in a reproduction signal and predicts a starting time of a next PCM audio signal region from a result of such detection, a PCM region signal may be generated in any other manner or by any other means. For example, a PCM region signal may be generated in accordance with a timing of a head changing over signal.

Further, while a PCM audio signal is inserted into a vertical blanking period of an FM modulated video signal in accordance with a suitable change over operation of the switches 13 and 14 in the magnetic recording and reproducing apparatus of FIG. 38, it may be inserted in some other way into an FM modulated video signal. For example, a PCM audio signal may be inserted in several separate parts into a horizontal blanking period of an FM modulated video signal. Further, also in the case wherein a PCM audio signal for one field is inserted in several parts into a segment blanking period and a vertical blanking period of an FM modulated video signal and recorded onto and then reproduced from a magnetic tape in a video tape recorder of the type wherein a video signal for one field is separated into a plurality of segments (a case wherein a video signal is separated into two segments is illustrated in FIG. 58) and recorded onto and reproduced from a magnetic tape, if such construction is employed that a region of a PCM audio signal mixed with a reproduction FM video signal in a reproduction signal is identified upon reproduction to generate a controlling signal representative of such PCM audio signal region and the switch circuit 82 is changed over in accordance with such controlling signal, then similar effects can be exhibited with such a recording format wherein a PCM audio signal is recorded in a segment blanking period.

Further, while the magnetic recording and reproducing apparatus of FIG. 38 is constructed such that a magnetic tape is wound over an angle of 180 degrees on an outer periphery of a rotary drum and a recording signal is recorded in one track for one field onto the magnetic tape, the winding angle and the recording format are not limited such specific ones. For example, a signal for one field may otherwise be recorded in a plurality of tracks as in a multi-channel multi-segment recording system.

Figure 42:
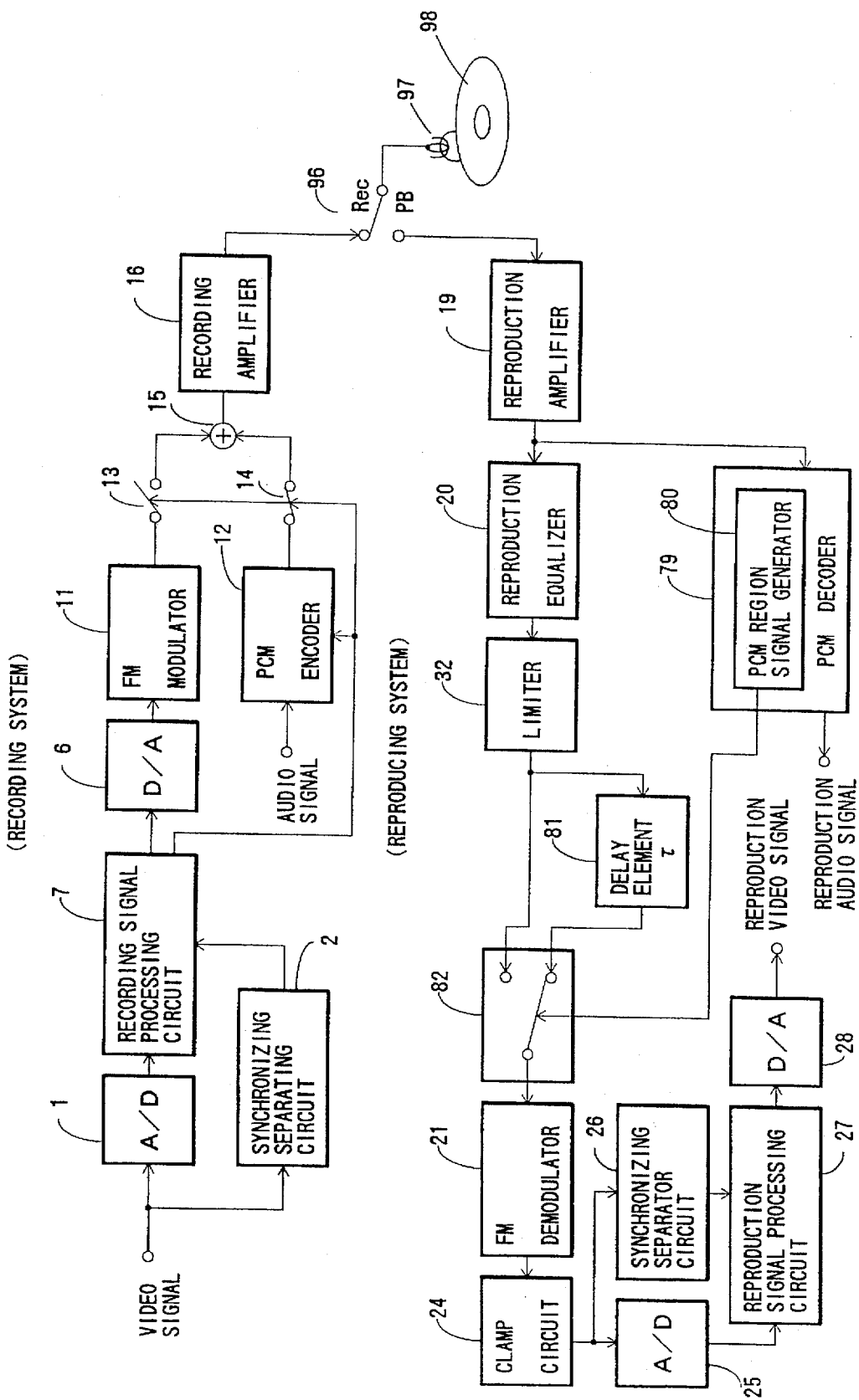
FIG. 42 is a block diagram showing a modification to the magnetic recording and reproducing apparatus of FIG. 38.

While the magnetic recording and reproducing apparatus shown in FIG. 38 and described above is in the form of a video tape recorder wherein an FM video signal is recorded onto and reproduced from a magnetic tape by means of a rotary head, it may have any other form only if an FM modulated video signal is recorded and/or reproduced in a time division multiplexed condition with a digital audio signal. For example, the magnetic recording and reproducing apparatus may be a video signal recording and reproducing apparatus such as a laser disk (LD) apparatus or an opto-magnetic disk apparatus or may be such a video signal recording and reproducing apparatus wherein a video signal is FM modulated and recorded onto and reproduced from a record medium in the form of a disk as shown in FIG. 42. Referring to FIG. 42, the magnetic recording and reproducing apparatus shown is substantially similar in construction to the magnetic recording and reproducing apparatus of FIG. 38 except that a recording signal outputted from the recording amplifier 16 is recorded, upon recording when a switch 96 is closed to the recording system (REC) side, onto a disk-shaped record medium 98 by means of a recording/reproducing head 97, and the thus recorded signal is reproduced, upon reproduction when the switch 96 is closed to the reproducing system (PB) side, from the disk-shaped record medium 98 by the recording/reproducing head 97.

Also with the magnetic recording and reproducing apparatus of FIG. 42, similar effects to those of the magnetic recording and reproducing apparatus of FIG. 38 can be attained.

Figure 43:
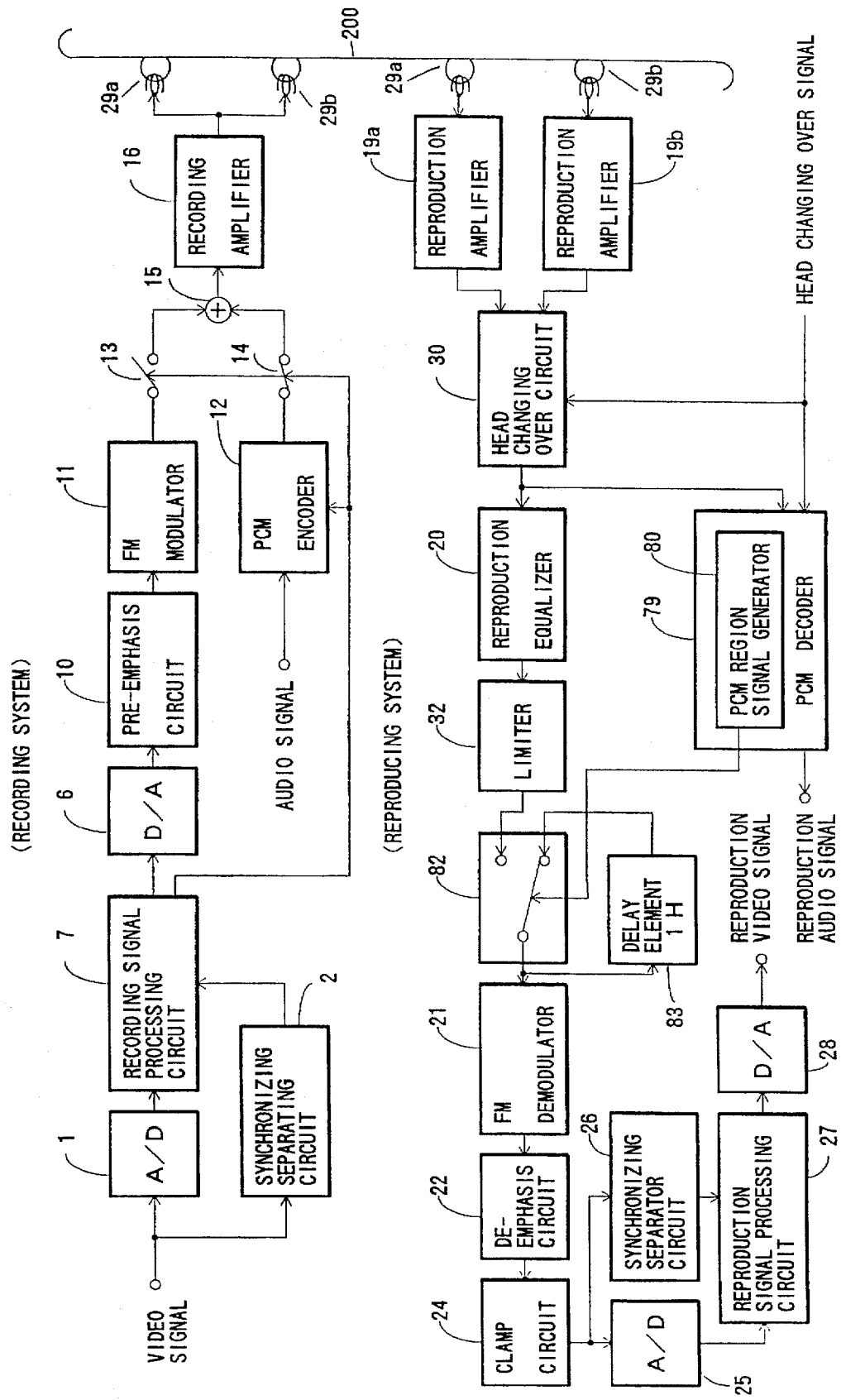
FIG. 43 is a similar view but showing another modification to the magnetic recording and reproducing apparatus of FIG. 38.

Referring now to FIG. 43, there is shown another modification to the magnetic recording and reproducing apparatus shown in FIG. 38. The present magnetic recording and reproducing apparatus is modified such that it includes a delay element 83 having a delay time equal to a horizontal scanning period (1 H) of a video signal in place of the delay element 81 the delay time of which is t equal to a period of a PCM audio signal region such that a signal in a PCM audio signal region is replaced, due to a suitable switching operation of the switch circuit 82, by a reproduction FM video signal including a repetition of data of a last line of a preceding field to a blanking period in which a PCM audio signal.

In particular, the switch circuit 82 is changed over, in accordance with a PCM region signal from the PCM region signal generator 80 in the PCM decoder 79, to select and transmit, in a video signal region, a reproduction FM video signal outputted from the limiter 32 to the FM demodulator 21 as it is, but select, in a PCM audio signal region, an output of the delay element 83 having a delay time equal to a horizontal scanning period 1 H. Since a reproduction FM video signal which is data of a last line of a preceding field to the PCM audio signal region is outputted repetitively from the delay element 83, a signal in a PCM audio signal region of a reproduction signal outputted from the switch circuit 82 is a signal including a repetition of a reproduction FM video signal which is data of a last line of a preceding field. Then, an output of the switch circuit 82 is FM demodulated by the FM demodulator 21, and high frequency components thereof emphasized by the pre-emphasis circuit 10 in the recording system are de-emphasized by the de-emphasis circuit 22. Consequently, a reproduction video signal wherein high frequency noises are reduced is obtained. In the reproduction video signal thus obtained, a signal in a PCM audio signal region is replaced repetitively by a reproduction video signal of a last line of a preceding field. Accordingly, synchronizing separation of a reproduction video signal can be performed accurately, and the clamp circuit 24 can operate normally. Further, a synchronizing signal is added also to a signal in a PCM audio signal region. Consequently, a signal in a PCM audio signal region can be clamped, and sags can be reduced.

It is to be noted that, while the delay time of the delay element 83 of the magnetic recording and reproducing apparatus of FIG. 43 is set to 1 H, that is, a horizontal scanning period of a video signal and a PCM audio signal is multiplexed into a vertical blanking period of a recording video signal and then, upon reproduction, a PCM audio signal in such PCM audio signal region is repetitively replaced by a reproduction FM video signal of a last line of a preceding field before it is FM demodulated, it need not be such specific delay time, but may be equal to or longer than two horizontal scanning periods 2 H. Thus, similar effects can be exhibited if a signal in a PCM audio signal region is replaced repetitively by a reproduction FM video signal other than a signal in such PCM audio signal region.

Further, while such a PCM audio signal mixed with a reproduction FM video signal as seen from the waveform (a) of FIG. 41 is processed, upon reproduction, as it is as a reproduction signal in the modified magnetic recording and reproducing apparatus of FIG. 43, also where the magnetic recording and reproducing apparatus is constructed otherwise such that an FM video signal and a PCM audio signal of a reproduction signal are separated as seen from the waveform (b) in FIG. 41 at an output, for example, of the limiter 32, a reproduction video signal after FM demodulation will make such a noise in a PCM audio signal region as seen from the waveform (c) in FIG. 57 and also from FIG. 54. Accordingly, similarly as in the magnetic recording and reproducing apparatus of FIG. 38, the switch 82 is changed over in accordance with a PCM region signal outputted from the PCM region signal generator 80 to select, in a video signal region, such reproduction FM video signal, but select, in a PCM audio signal region, a signal obtained by delaying the reproduction FM video signal by the delay time 1 H by means of the delay element 81. With such alternative construction, similar effects to those of the magnetic recording and reproducing apparatus of FIG. 38 can be attained.

Further, while the PCM region signal generator 80 of the magnetic recording and reproducing apparatus of FIG. 38 generates a PCM region signal by such construction that it detects an end timing of a PCM audio signal region in a reproduction signal and predicts a starting time of a next PCM audio signal region from a result of such detection, a PCM region signal may be generated in any other manner or by any other means. For example, a PCM region signal may be generated in accordance with a timing of a head change over signal.

Further, while a PCM audio signal is inserted into a vertical blanking period of an FM video signal in accordance with a suitable changing over operation of the switches 13 and 14 in the magnetic recording and reproducing apparatus of FIG. 43, it may be inserted in some other way into an FM modulated video signal. For example, a PCM audio signal may be inserted in several separate parts into a horizontal blanking period of an FM modulated video signal. Further, also in the case wherein a PCM audio signal for one field is inserted in several parts into a segment blanking period and a vertical blanking period of an FM modulated video signal and recorded onto and then reproduced from a magnetic tape in a video tape recorder of the type wherein a video signal for one field is separated into a plurality of segments (a case wherein a video signal is separated into two segments is illustrated in FIG. 58) and recorded onto and reproduced from a magnetic tape, if such construction is employed that a region of a PCM audio signal mixed with a reproduction FM video signal in a reproduction signal is identified upon reproduction to generate a controlling signal representative of such PCM audio signal region and the switch circuit 82 is changed over in accordance with such controlling signal, then similar effects can be exhibited with such a recording format wherein a PCM audio signal is recorded in a segment blanking period.

Further, while the magnetic recording and reproducing apparatus of FIG. 43 is constructed such that a magnetic tape is wound over an angle of 180 degrees on an outer periphery of a rotary drum and a recording signal is recorded in one track for one field onto the magnetic tape, the winding angle and the recording format are not limited such specific ones. For example, a signal for one field may otherwise be recorded in a plurality of tracks as in a multi-channel multi-segment recording system.

Figure 44:
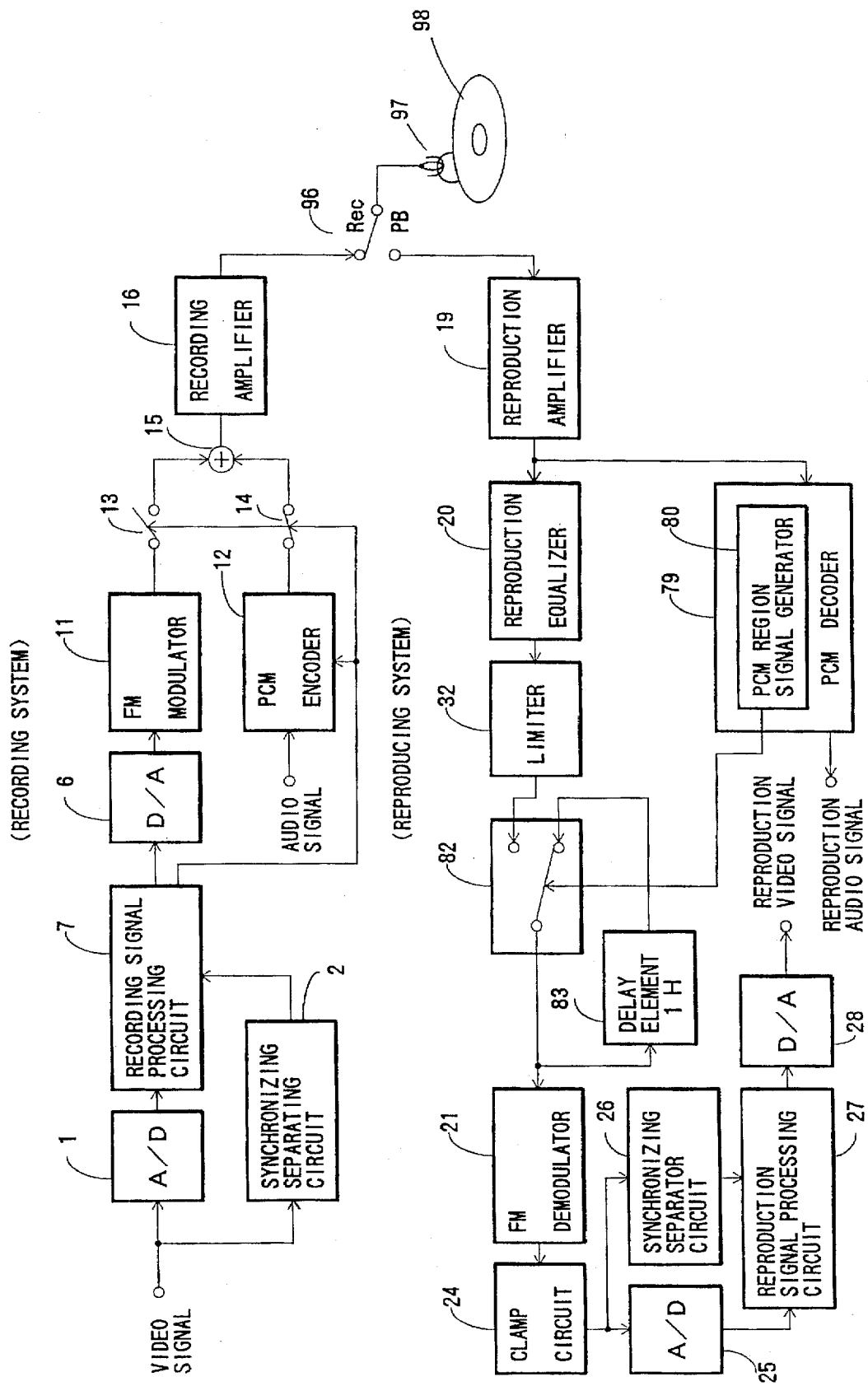
FIG. 44 is a similar view but showing a modification to the modified magnetic recording and reproducing apparatus of FIG. 43.

While the magnetic recording and reproducing apparatus shown in FIG. 43 and described above is in the form of a video tape recorder wherein an FM video signal is recorded onto and reproduced from a magnetic tape by means of a rotary head, it may have any other form only if a digital audio signal is recorded and/or reproduced in a time division multiplexed condition with an FM modulated video signal. For example, the magnetic recording and reproducing apparatus may be a video signal recording and reproducing apparatus such as a laser disk (LD) apparatus or an opto-magnetic disk apparatus or may be such a video signal recording and reproducing apparatus wherein a video signal is FM modulated and recorded onto and reproduced from a record medium in the form of a disk as shown in FIG. 44. Referring to FIG. 44, the magnetic recording and reproducing apparatus shown is substantially similar in construction to the magnetic recording and reproducing apparatus of FIG. 43 except that a recording signal outputted from the recording amplifier 16 is recorded, upon recording when a switch 96 is closed to the recording system (REC) side, onto a disk-shaped record medium 98 by means of a recording/reproducing head 97, and the thus recorded signal is reproduced, upon reproduction when the switch 96 is closed to the reproducing system (PB) side, from the disk-shaped record medium 98 by the recording/reproducing head 97, similarly as in the magnetic recording and reproducing apparatus shown in FIG. 42. Also with the magnetic recording and reproducing apparatus of FIG. 44, similar effects to those of the magnetic recording and reproducing apparatus of FIG. 43 can be attained.

Figure 45:
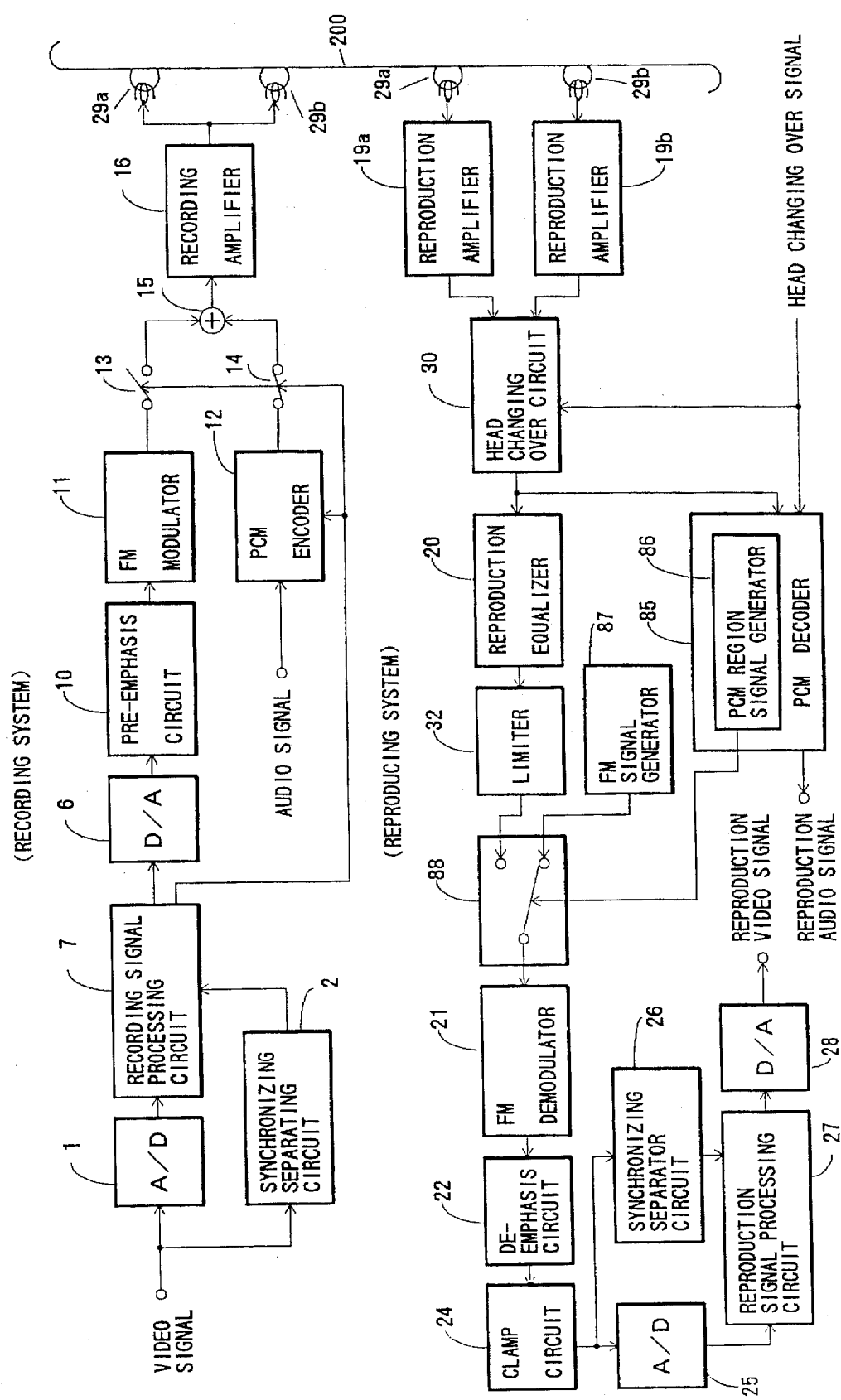
FIG. 45 is a similar view but showing a further modification to the magnetic recording and reproducing apparatus of FIG. 38.

Referring now to FIG. 45, there is shown a further modification to the magnetic recording and reproducing apparatus of FIG. 38. The present magnetic recording and reproducing apparatus is modified such that it includes a PCM decoder 85 including a PCM region signal generator 86 therein, an FM signal generator 87 and a switch 88 in place of the PCM decoder 79 including the PCM region signal generator 80 therein, the delay element 81 and the switch 82, respectively.

The PCM decoder 85 detects a PCM audio signal for one field period inserted in a vertical blanking period of a reproduction signal transmitted thereto from the head change over circuit 30 and performs such processing as error correction, de-shuffling and error modification to restore an original audio signal. The PCM audio signal generator 86 in the PCM decoder 85 identifies a PCM audio signal region of a reproduction signal and generates a PCM region signal representative of such PCM audio signal region in such a manner as described hereinabove. The FM signal generator 87 generates an FM signal including a carrier having a frequency fc, which is to make, after FM demodulation thereof, a signal overlapped with a gray level and having a fixed frequency fP and an amplitude B. The switch circuit 88 is changed over in response to a PCM region signal outputted from the PCM region signal generator 86 to select one of a reproduction signal outputted from the limiter 32 and an output of the FM signal generator 87.

In operation, the recording system of the magnetic recording and reproducing apparatus of FIG. 45 operates, upon recording, in a similar manner to the recording system of the magnetic recording and reproducing apparatus of FIG. 38.

On the other hand, upon reproduction, the rotary heads 29a and 29b, reproduction amplifiers 19a and 19b and head change over circuit 30 of the reproducing system of the magnetic recording and reproducing apparatus of FIG. 45 operate in a similar manner to those of the reproducing system of the magnetic recording and reproducing apparatus of FIG. 38. Thus, such a single reproduction signal as seen from the waveform (c) of FIG. 62 is outputted from the head change over circuit 30. The reproduction signal is transmitted to the reproduction equalizer 20 and also to the PCM decoder 85. The PCM decoder 85 detects a PCM audio signal for one field period inserted in a vertical blanking period of the reproduction signal and performs such processing as error correction, de-shuffling and error modification to restore and output an original audio signal therefrom.

Meanwhile, the reproduction equalizer 20 compensates for a frequency characteristic of a reproduction FM video signal of the received reproduction signal, and an output of the reproduction equalizer 20 is transmitted to the limiter 32, at which amplitude variation components of the reproduction FM video signal are removed.

By the way, if a PCM audio signal multiplexed in a vertical blanking period with a reproduction FM video signal is FM demodulated as it is by the FM demodulator 21, then a reproduction video signal outputted from the FM demodulator 21 in a PCM audio signal region will present such an output signal waveform as shown by the waveform (a) in FIG. 39 as if it includes noise.

Thus, the FM signal generator 87 generates an FM demodulation signal, for example, having a carrier frequency fC which is to make, after FM demodulation thereof, a signal overlapped with a gray level and having a fixed frequency fP and an amplitude B, and an output of the FM signal generator 87 and a reproduction signal outputted from the limiter 32 are inputted to the switch circuit 88, which is changed over in accordance with a PCM region signal representative of a PCM audio signal region and generated in such a manner as described hereinabove from the PCM region signal generator 86 in the PCM decoder 85, so as to obtain a signal from which such a reproduction video signal having a waveform as shown in FIG. 17 can be produced by FM demodulation thereof.

Figure 46:
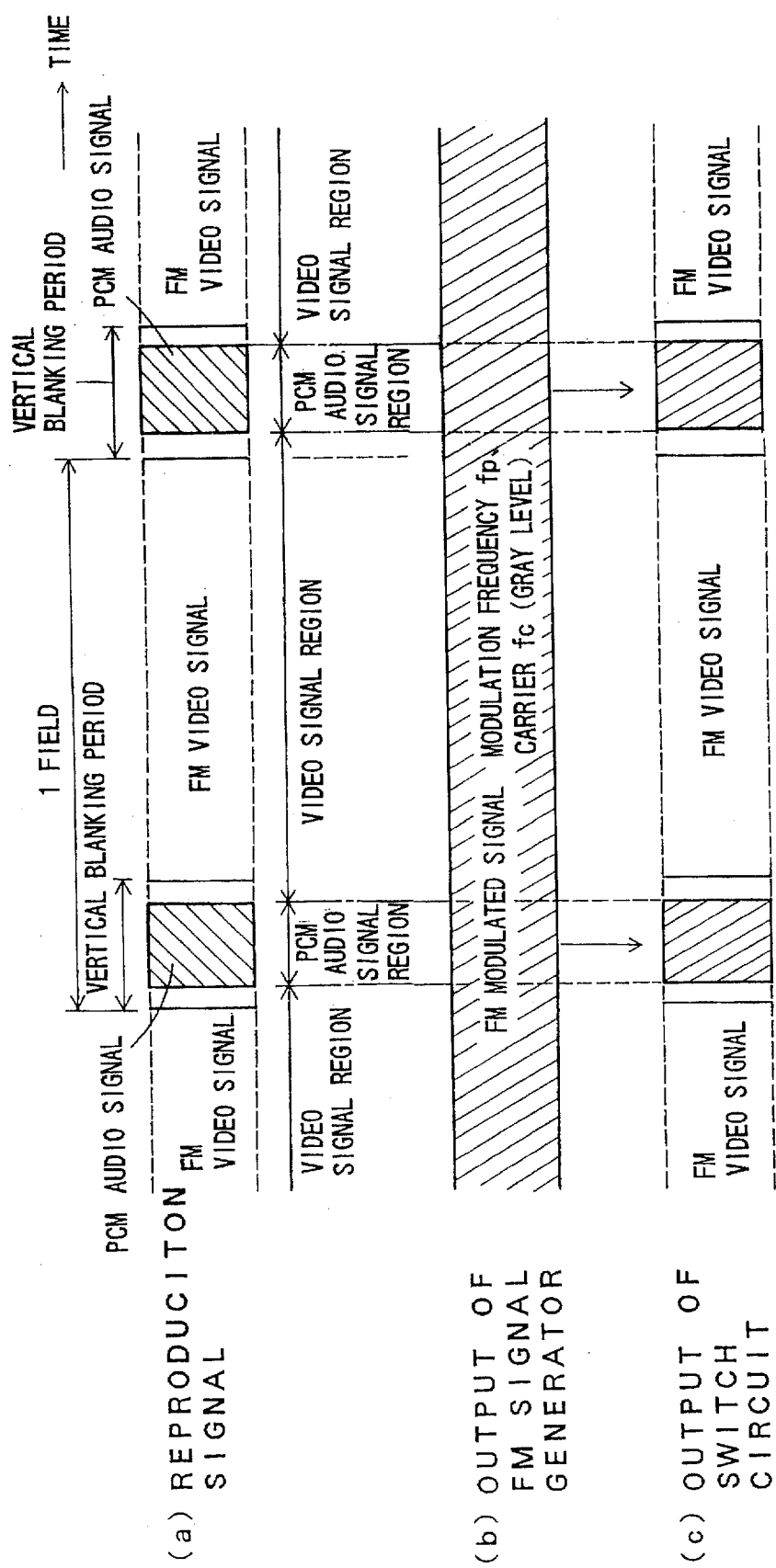
FIG. 46 is a waveform diagram illustrating operation of a PCM region signal generator, an FM signal generator and a switch circuit of the magnetic recording and reproducing apparatus of FIG. 45.

In particular, the switch circuit 88 is changed over, in accordance with a pulse representative of a PCM audio signal region and a video signal region and received from the PCM region signal generator 86 in the PCM decoder 85, to select and transmit, in a period of a video signal region, a reproduction signal (waveform (a) in FIG. 46) outputted from the limiter 32, but select, in a period of a PCM audio signal region, an output (waveform (b) in FIG. 46) of the FM signal generator 87. Consequently, an output of the switch circuit 88 presents such a waveform (c) as shown in FIG. 46. Accordingly, if the output of the switch circuit 88 is transmitted to and FM demodulated by the FM demodulator 21 and passed through the de-emphasis circuit 22, a signal in a PCM audio signal region of an output reproduction video signal of the de-emphasis circuit 22 presents such a waveform as shown in FIG. 17 wherein a signal of a frequency fP and an amplitude B is overlapped with a gray level.

Where such construction is employed, a signal in a PCM audio signal region of an FM demodulated reproduction video signal can be formed as a signal overlapped with a gray level and having the fixed frequency fP and the amplitude B, and consequently, synchronization separation of a reproduction video signal can be performed accurately. Further, since a signal selected in a PCM audio signal region does not include only a dc level signal, sags can be reduced.

A reproduction signal outputted from the switch circuit 88 is subsequently supplied to the FM demodulator 21. Consequently, the reproduction signal is thereafter processed successively by the FM demodulator 21, de-emphasis circuit 22, clamp circuit 24, A/D converter 25, second synchronizing separator circuit 26, reproduction signal processing circuit 27 and D/A converter 28 in a similar manner as in the magnetic recording and reproducing apparatus of FIG. 43. Consequently, a groove reproduction video signal can be obtained.

It is to be noted that, while the FM signal generator 87 of the magnetic recording and reproducing apparatus of FIG. 45 generates and outputs an FM signal which has a carrier frequency $f_c$ and is to make a signal having a fixed frequency $f_p$ and an amplitude B and overlapped with a gray level after FM demodulation thereof, it need not generate such specific FM signal, but similar effects can be obtained by any other construction if it generates an FM modulating signal different from a fixed dc current level signal and having such a frequency at which sags can be reduced between a pedestal level and a white level after FM demodulation thereof.

Further, while the PCM region signal generator 86 of the magnetic recording and reproducing apparatus of FIG. 45 generates a PCM region signal by such construction that it detects an end timing of a PCM audio signal region in a reproduction signal and predicts a starting time of a next PCM audio signal region from a result of such detection, a PCM region signal may be generated in any other manner or by any other means. For example, a PCM region signal may be generated in accordance with a timing of a head change over signal.

Figure 47:
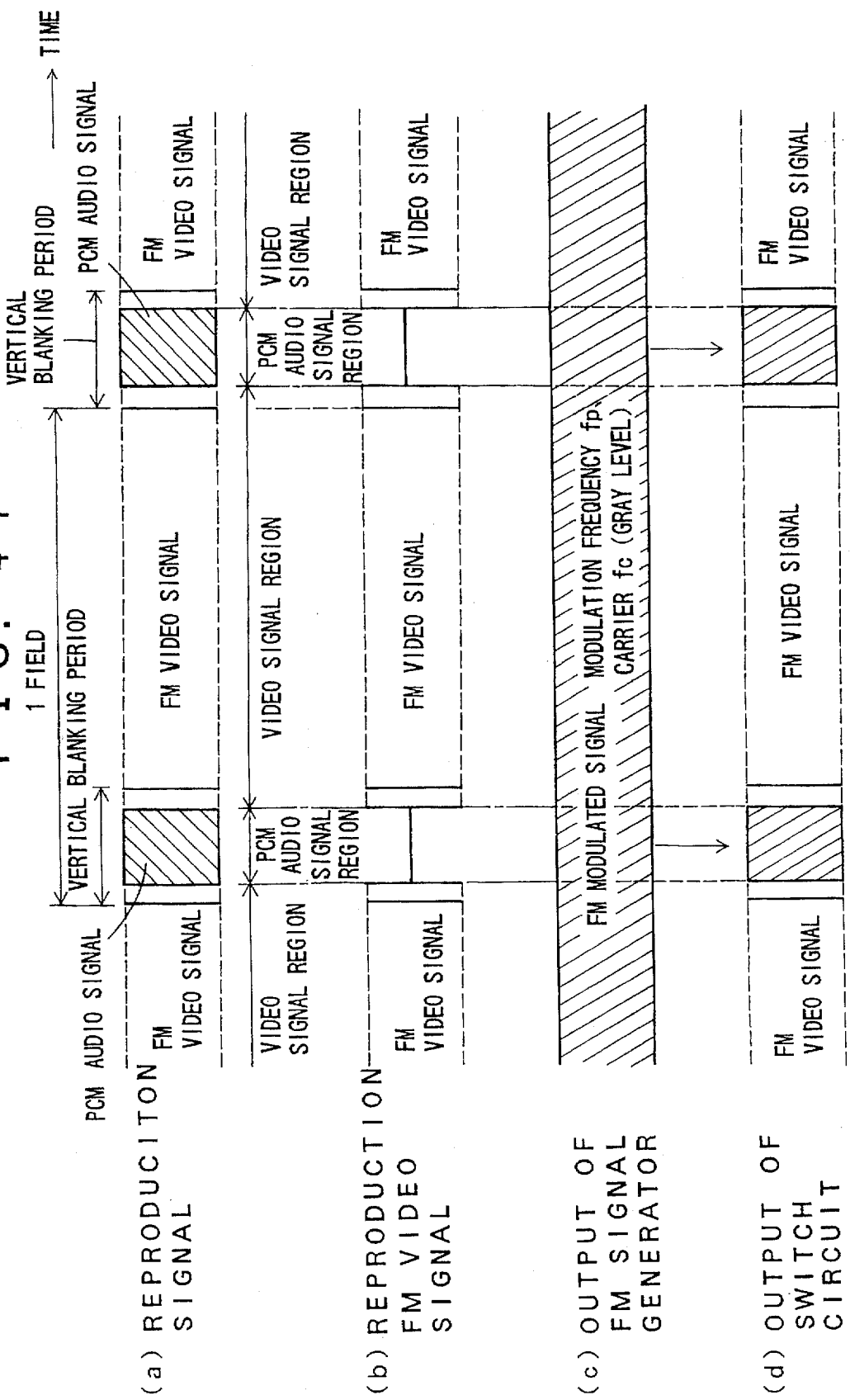
FIG. 47 is a waveform diagram illustrating operation of the FM signal generator and switch circuit of the magnetic recording and reproducing apparatus of FIG. 45 when an FM video signal and a PCM audio signal of a reproduction signal are separated and processed.

Further, while a PCM audio signal mixed with a reproduction FM video signal is processed, upon reproduction, as it is as a reproduction signal in the modified magnetic recording and reproducing apparatus of FIG. 45, also where the magnetic recording and reproducing apparatus is constructed otherwise such that an FM video signal and a PCM audio signal of a reproduction signal are separated as seen from a waveform (b) in FIG. 47 at an output, for example, of the limiter 32, a reproduction video signal after FM demodulation will make such a noise in a PCM audio signal region as seen from the waveform (c) in FIG. 57 and also from FIG. 54. Accordingly, similarly as in the magnetic recording and reproducing apparatus of FIG. 38, the switch 88 is changed over in accordance with a PCM region signal outputted from the PCM region signal generator 86 to select, in a video signal region, such reproduction FM video signal (waveform (b) in FIG. 47), but select, in a PCM audio signal region, an output (waveform (c) in FIG. 47) of the FM signal generator 87. With such alternative construction, similar effects to those of the magnetic recording and reproducing apparatus of FIG. 38 can be attained.

Further, while a PCM audio signal is inserted into a vertical blanking period of an FM video signal in accordance with a suitable change over operation of the switches 13 and 14 in the magnetic recording and reproducing apparatus of FIG. 45, it may be inserted in some other way into an FM modulated video signal. For example, a PCM audio signal may be inserted in several separate parts into a horizontal blanking period of an FM modulated video signal. Further, also in the case wherein a PCM audio signal for one field is inserted in several parts into a segment blanking period and a vertical blanking period of an FM modulated video signal and recorded onto and then reproduced from a magnetic tape in a video tape recorder of the type wherein a video signal for one field is separated into a plurality of segments (a case wherein a video signal is separated into two segments is illustrated in FIG. 58) and recorded onto and reproduced from a magnetic tape, if such construction is employed that a region of a PCM audio signal mixed with a reproduction FM video signal in a reproduction signal is identified upon reproduction to generate a controlling signal representative of such PCM audio signal region and the switch circuit 88 is changed over in accordance with such control signal, similar effects can be exhibited with such a recording format wherein a PCM audio signal is recorded in a segment blanking period.

Further, while the magnetic recording and reproducing apparatus of FIG. 45 is constructed such that a magnetic tape is wound over an angle of 180 degrees on an outer periphery of a rotary drum and a recording signal is recorded in one track for one field onto the magnetic tape, the winding angle and the recording format are not limited such specific ones. For example, a signal for one field may otherwise be recorded in a plurality of tracks as in a multi-channel multi-segment recording system.

Figure 48:
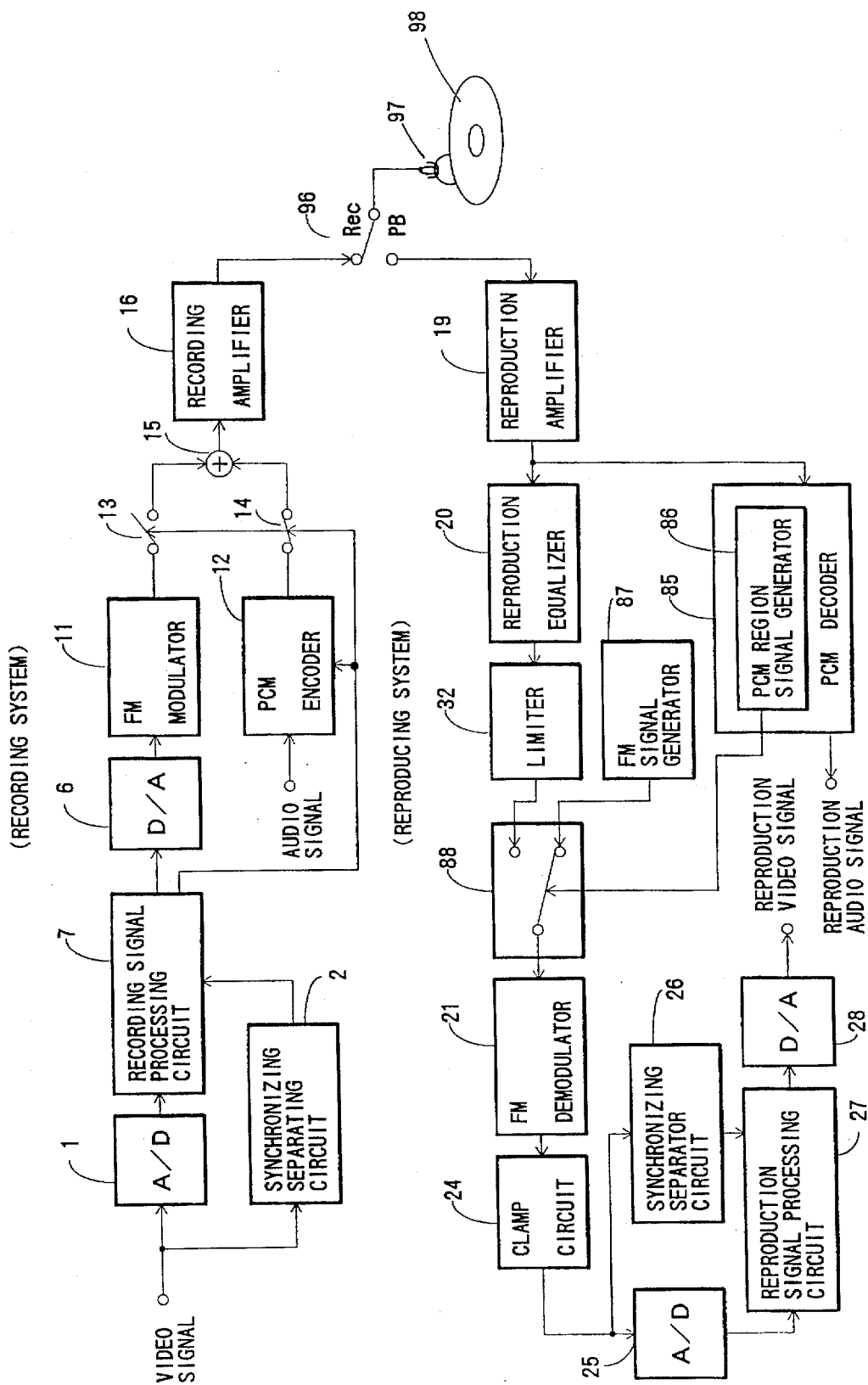
FIG. 48 is a block diagram showing a modification to the modified magnetic recording and reproducing apparatus of FIG. 45.
Figure 48:
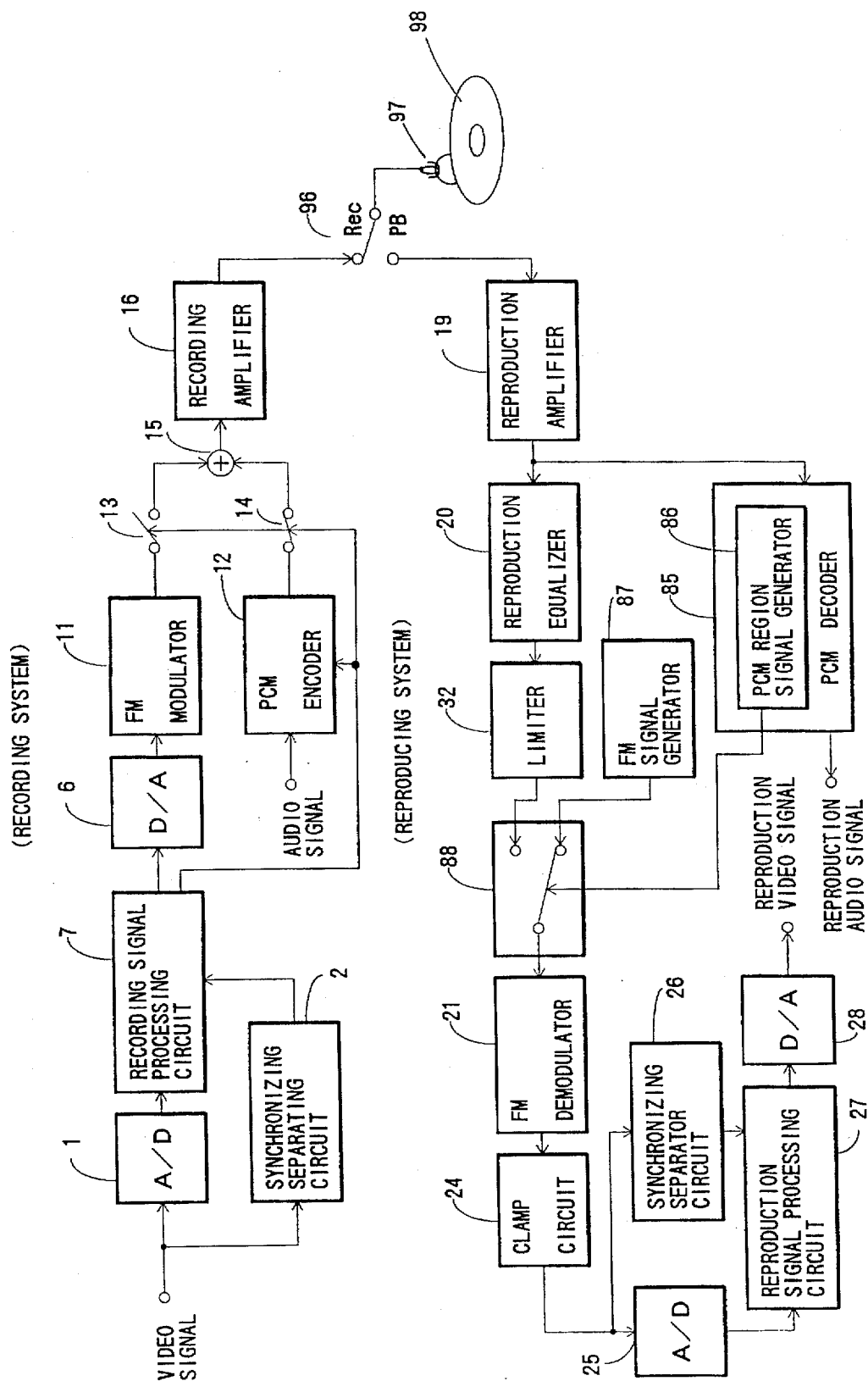

While the magnetic recording and reproducing apparatus shown in FIG. 45 is in the form of a video tape recorder wherein an FM video signal is recorded onto and reproduced from a magnetic tape by means of a rotary head, it may have any other form only if a digital audio signal is recorded and/or reproduced in a time division multiplexed condition with an FM modulated video signal. For example, the magnetic recording and reproducing apparatus may be a video signal recording and reproducing apparatus such as a laser disk (LD) apparatus or an opto-magnetic disk apparatus or may be such a video signal recording and reproducing apparatus wherein a video signal is FM modulated and recorded onto and reproduced from a record medium in the form of a disk as shown in FIG. 48. Referring to FIG. 48, the magnetic recording and reproducing apparatus shown is substantially similar in construction to the magnetic recording and reproducing apparatus of FIG. 45 except that a recording signal outputted from the recording amplifier 16 is recorded, upon recording when a switch 96 is closed to the recording system (REC) side, onto a disk-shaped record medium 98 by means of a recording/reproducing head 97, and the thus recorded signal is reproduced, upon reproduction when the switch 96 is closed to the reproducing system (PB) side, from the disk-shaped record medium 98 by the recording/reproducing head 97, similarly as in the magnetic recording and reproducing apparatus shown in FIG. 42 and 44. Also with the magnetic recording and reproducing apparatus of FIG. 48, similar effects to those of the magnetic recording and reproducing apparatus of FIG. 43 can be attained.

Referring now to FIG. 49, there is shown a yet further modification to the magnetic recording and reproducing apparatus of FIG. 38. The present magnetic recording and reproducing apparatus is modified such that it includes a PCM decoder 93 including a PCM region signal generator 94 therein in place of the PCM decoder 79 including the PCM region signal generator 80 and further includes a pair of delay elements I 89 and II 90 and a pair of switches 91 and 92 in place of the delay element 81 and the switch 82, respectively. In particular, the PCM decoder 93 detects a PCM audio signal for one field period inserted in a vertical blanking period of a reproduction signal transmitted thereto from the rotary head 19a or 19b and performs such processing as error correction, de-shuffling and error modification to restore an original audio signal. The PCM audio signal generator 94 in the PCM decoder 93 accurately identifies a PCM audio signal region of a reproduction signal and generates a PCM region signal representative of such PCM audio signal region in such a manner as described hereinabove. The delay element I 89 delays a reproduction signal received from the reproduction amplifier 19a by a delay time τ while the other delay element II 90 delays a reproduction signal received from the other reproduction amplifier 19b by the same delay time τ. The switches 91 and 92 are changed over in accordance with a PCM region signal outputted from the PCM region signal generator 93.

In operation, the recording system of the magnetic recording and reproducing apparatus of FIG. 49 operates, upon recording, in a similar manner to the recording system of the magnetic recording and reproducing apparatus of FIG. 38.

On the other hand, upon reproduction, the rotary heads 29a and 29b and reproduction amplifiers 19a and 19b of the reproducing system of the magnetic recording and reproducing apparatus of FIG. 49 operate in a similar manner to those of the reproducing system of the magnetic recording and reproducing apparatus of FIG. 38. Thus, reproduction signals amplified by the reproduction amplifiers 19a and 19b are transmitted to the switch circuits 91 and 92 and delay elements 89 and 90, respectively, and also transmitted to the PCM decoder 93. The PCM decoder 93 detects a PCM audio signal for one field inserted in a vertical blanking period of a reproduction signal transmitted thereto from the reproduction amplifier 19a or 19b and performs deshuffling, error modification and so forth to restore an original audio signal. The thus restored original audio signal is outputted from the PCM decoder 93 as an output reproduction audio signal of the reproducing system of the magnetic recording and reproducing apparatus.

By the way, if a PCM audio signal multiplexed in a vertical blanking period with a reproduction FM video signal is FM demodulated as it is by the FM demodulator 21, a reproduction video signal outputted from the FM demodulator 21 in a PCM audio signal region will present such an output signal waveform as shown by the waveform (a) in FIG. 39 as if it includes noises.

Figure 50:
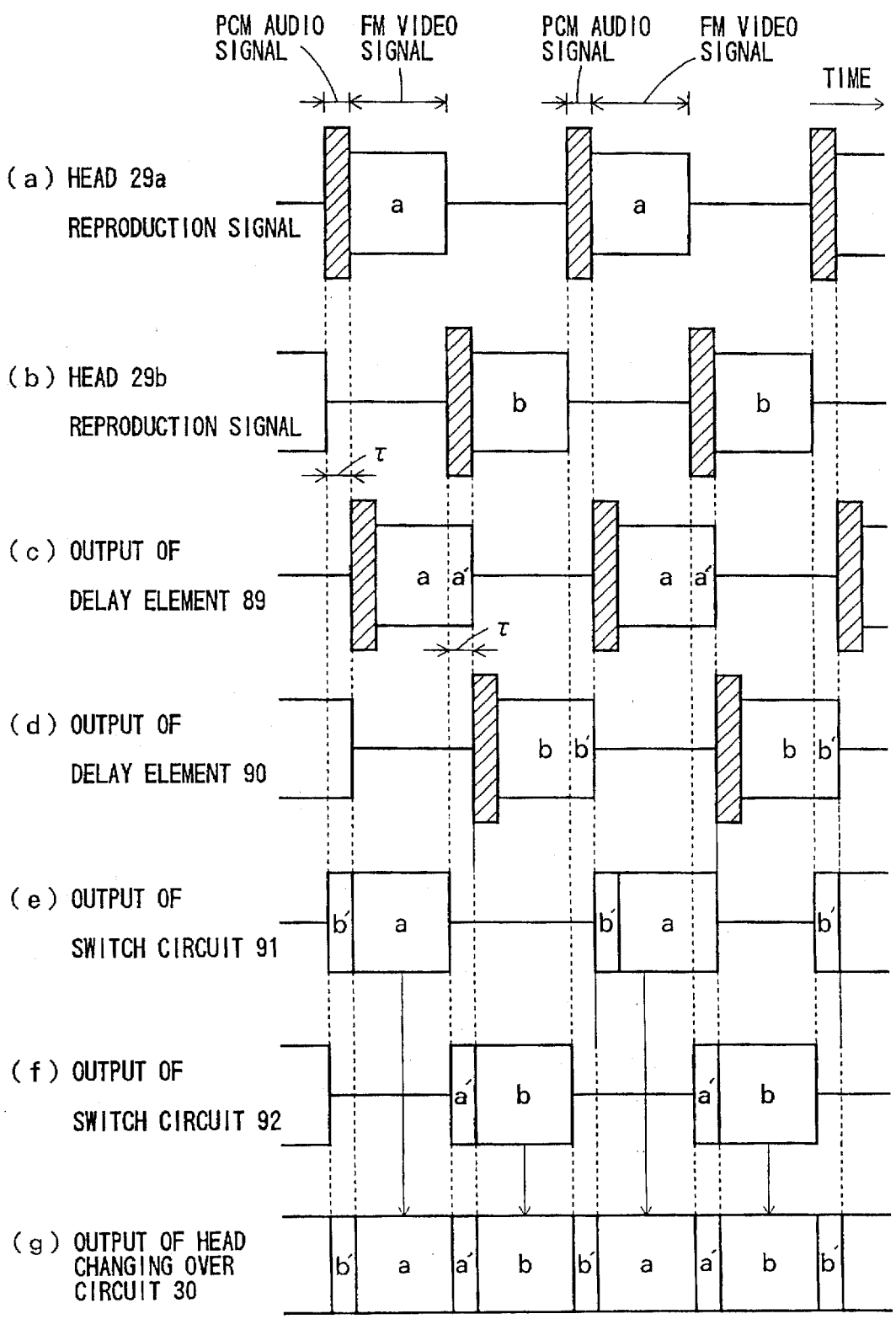
FIG. 50 is a waveform diagram illustrating operation of a PCM region signal generator, delay elements and switch circuits of the magnetic recording and reproducing apparatus of FIG. 49.

Thus, a reproduction signal outputted from the reproduction amplifier 19a and having such a waveform (a) as shown in FIG. 50 is inputted to the switch circuit 91 and the delay circuit I 89 while another reproduction signal outputted from the reproduction amplifier 19b and having such a waveform (b) as shown in FIG. 50 is inputted to the switch circuit 92 and the delay element II 90. Then, the switch circuits 91 and 92 are changed over so that a signal in a PCM audio signal region of a reproduction video signal after FM demodulation may be replaced by a signal of a line preceding by a period equal to a period of a PCM audio signal region of a preceding field as seen from the waveform (b) in FIG. 39. A PCM region signal generated in such a manner as described hereinabove by the PCM region signal generator 94 in the PCM decoder 93 is transmitted to the switches 91 and 92.

The switch 91 thus selects, in a video signal region, a reproduction signal (waveform (a) in FIG. 50) of the rotary head 29a outputted from the reproduction amplifier 19a, but selects, in a PCM audio signal region, another reproduction signal (waveform (b) in FIG. 50) of the other rotary head 29b outputted from the reproduction amplifier 19b so that an output of the delay element II 90 delayed by the time τ may be selected as seen from a waveform (d) in FIG. 50. On the other hand, the switch circuit 92 selects, in a video signal region, a reproduction signal (waveform (b) in FIG. 50) of the rotary head 29b outputted from the reproduction amplifier 19b, but selects, in a PCM audio signal region, a reproduction signal (waveform (a) in FIG. 50) of the rotary head 29a outputted from the reproduction amplifier 19a so that an output of the delay element I 89 delayed by the time τ may be selected. Thus, from the delay element I 89, a reproduction FM video signal is outputted which is produced by delaying a signal of a preceding field to a PCM audio signal region of a reproduction signal from the reproduction amplifier 19a by the delay time τ. On the other hand, from the other delay element II 90, another reproduction FM video signal is outputted which is produced by delaying a signal of a preceding field to a PCM audio signal region of a reproduction signal of the reproduction amplifier 19b by the delay time τ. Consequently, an output of the switch circuit 91 presents such a waveform (e) as shown in FIG. 50 while an output of the other switch circuit 92 presents such a waveform (f) as shown in FIG. 50. Accordingly, a signal in a PCM audio signal region of a reproduction signal from each of the rotary heads 29a and 29b is a reproduction FM video signal for a period of the delay time τ of a preceding field to the PCM audio signal region.

Outputs of the switch circuits 91 and 92 are inputted to the head change over circuit 30, which is changed over in response to a head change over signal so as to select a reproduction signal from one of the rotary heads 29a and 29b which contacts with the magnetic tape 200 to make a single reproduction signal. Such reproduction signal outputted from the head changing over circuit 30 presents such a waveform (g) as shown in FIG. 50. The reproduction signal outputted from the head changing over circuit 30 is transmitted to the reproduction equalizer 20, at which a frequency characteristic of a reproduction FM video signal thereof is compensated for. Then, an output reproduction signal of the reproduction equalizer 20 is inputted to the limiter 32, at which amplitude variation components of the reproduction FM video signal are removed. An output of the limiter 32 is then supplied to and FM demodulated by the FM demodulator 21, and then it is supplied to the de-emphasis circuit 22, at which high frequency components emphasized by the pre-emphasis circuit 10 in the recording system are de-emphasized. Consequently, such a reproduction video signal in which high frequency noises have been reduced as shown by the waveform (b) in FIG. 39 is obtained. Thus, since a signal in a PCM audio signal region is replaced by a reproduction video signal of a preceding field, synchronizing separation of a reproduction video signal can be performed accurately and the clamp circuit 24 at a next stage operates normally. Further, since a synchronizing signal is added also to a signal in a PCM audio signal region, a signal can be clamped also in a PCM audio signal region, and the sags are reduced.

A reproduction signal outputted from the de-emphasis circuit 22 is subsequently supplied to the clamp circuit 24, and consequently, the reproduction signal is thereafter processed successively by the clamp circuit 24, A/D converter 25, second synchronizing separator circuit 26, reproduction signal processing circuit 27 and D/A converter 28 in a similar manner as in the magnetic recording and reproducing apparatus of FIG. 43. Consequently, a groove reproduction video signal can be obtained.

It is to be noted that, while the delay time of the delay elements 89 and 90 of the magnetic recording and reproducing apparatus of FIG. 49 is set to t equal to a period of a PCM audio signal region and a PCM audio signal in such PCM audio signal region is replaced by a reproduction FM video signal of a preceding field prior by a period corresponding to the delay time τ, it need not be such specific delay time, but may have any other delay time. Thus, similar effects can be exhibited if a signal in a PCM audio signal region is replaced by a reproduction FM video signal other than a signal in such PCM audio signal region.

Further, while the PCM region signal generator 84 of the magnetic recording and reproducing apparatus of FIG. 45 generates a PCM region signal by such construction that it detects an end timing of a PCM audio signal region in a reproduction signal and predicts a starting time of a next PCM audio signal region from a result of such detection, a PCM region signal may be generated in any other manner or by any other means. For example, a PCM region signal may be generated in accordance with a timing of a head changing over signal.

Figure 51:
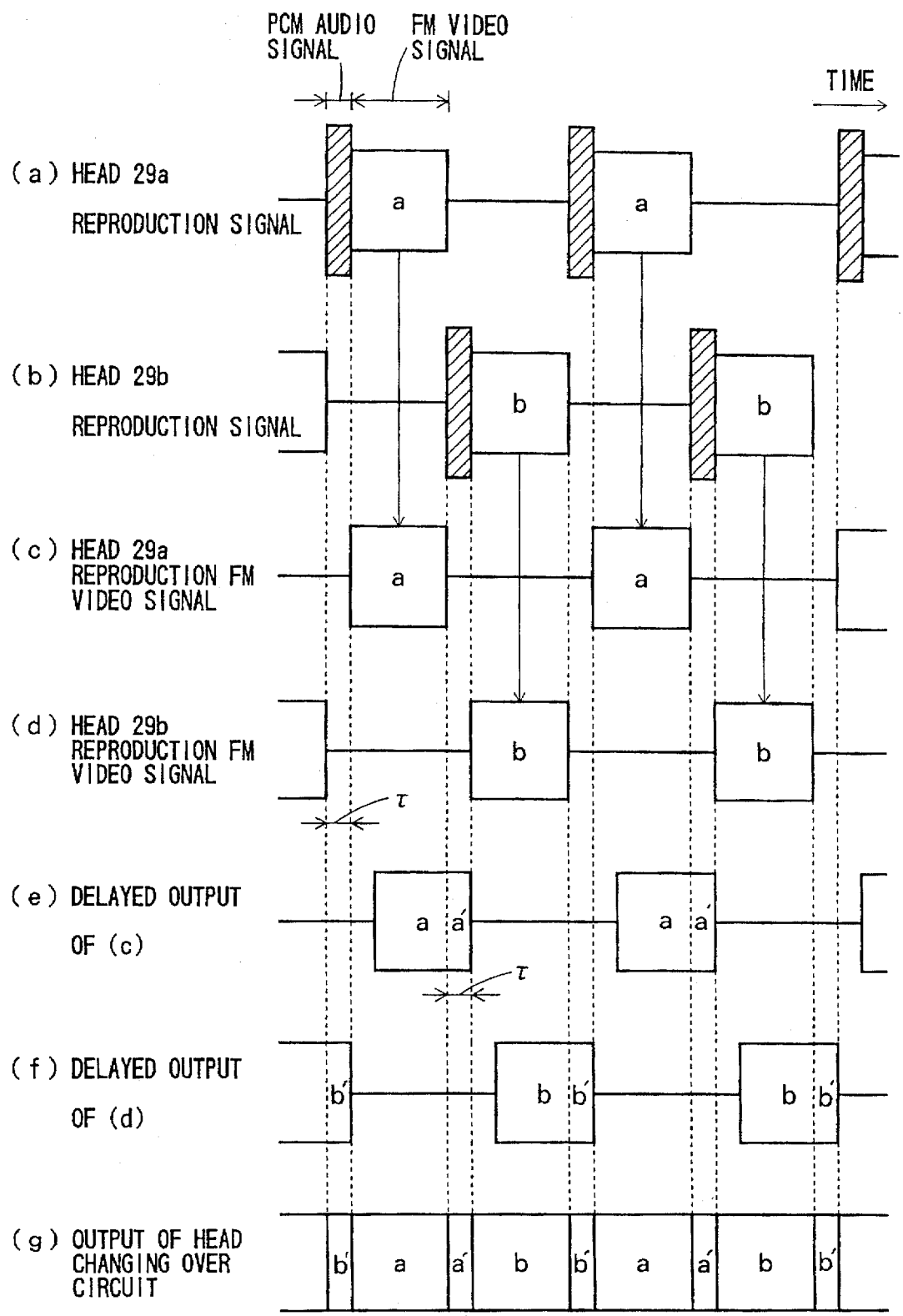
FIG. 51 is a waveform diagram illustrating operation of the delay elements and switch circuits of the magnetic recording and reproducing apparatus of FIG. 49 when an FM video signal and a PCM audio signal of a reproduction signal are separated and processed.

Further, while a reproduction FM video signal and a PCM audio signal mixed with such reproduction FM video signal are processed, upon reproduction, as they are as reproduction signals by a suitable change over operation of the switch circuits 91 and 92 of the magnetic recording and reproducing apparatus of FIG. 49, similar effects can be attained also where the reproducing system is constructed otherwise such that, for example, each of the reproduction amplifiers provides such a pair of separate reproduction signals including an FM video signal and a PCM audio signal as seen from waveforms (c) and (d) of FIG. 51 and such FM video signals and PCM audio signals are inputted to the switch circuits and the delay elements while the switch circuits are changed over in accordance with a PCM region signal, whereupon an output of the head change over circuit presents such a waveform (g) as shown in FIG. 51.

Further, while a PCM audio signal is inserted into a vertical blanking period of an FM video signal in accordance with a suitable change over operation of the switches 13 and 14 in the magnetic recording and reproducing apparatus of FIG. 49, it may be inserted in some other way into an FM modulated video signal. For example, a PCM audio signal may be inserted in several separate parts into a horizontal blanking period of an FM modulated video signal. Further, also in the case wherein a PCM audio signal for one field is inserted in several parts into a segment blanking period and a vertical blanking period of an FM modulated video signal and recorded onto and then reproduced from a magnetic tape in a video tape recorder of the type wherein a video signal for one field is separated into a plurality of segments (a case wherein a video signal is separated into two segments is illustrated in FIG. 58) and recorded onto and reproduced from a magnetic tape, if such construction is employed that a region of a PCM audio signal mixed with a reproduction FM video signal in a reproduction signal is identified upon reproduction to generate a controlling signal representative of such PCM audio signal region and the switch circuits 91 and 92 are changed over in accordance with such controlling signal, similar effects can be exhibited with such a recording format wherein a PCM audio signal is recorded in a segment blanking period.

Further, while the magnetic recording and reproducing apparatus of FIG. 49 is constructed such that a magnetic tape is wound over an angle of 180 degrees on an outer periphery of a rotary drum and a recording signal is recorded in one track for one field onto the magnetic tape, the winding angle and the recording format are not limited such specific ones. For example, a signal for one field may otherwise be recorded in a plurality of tracks as in a multi-channel multi-segment recording system.

Having now fully described the invention, it will be apparent to one of ordinary skill in the art that many changes and modifications can be made thereto without departing from the spirit and scope of the invention as set forth herein.

What is claimed is:

1. A recording and reproducing apparatus wherein a video signal, recorded on the recording medium, has a digital signal inserted by a time division multiplexing mode, comprising:

a demodulator;

identifying means for identifying a period of an inserted digital signal region in a video signal which has the inserted digital signal and for producing a first signal indicative of a period of the inserted digital signal region in response thereof; and compensating means, in response to the first signal, for during reproduction, replacing contents within the period of the inserted digital signal with a preceding field of the video signal, thereby eliminating any effectual characteristics that the inserted digital signal has on a demodulation process performed by said demodulator.

2. The recording and reproducing apparatus of claim 1, wherein during reproduction, said compensating means reduces sags and increases stability of the video signal produced from an output of said demodulator.

3. The record and reproducing apparatus of claim 1, said compensating means including delaying means for delaying the video signal, during reproduction, for a period related to the period of the inserted digital signal region so as to obtain the preceding field of the video signal.

4. The recording and reproducing apparatus of claim 3, wherein said delaying means delays the video signal for a period equal to one synchronizing signal block in the reproduction video signal.

5. The recording and reproducing apparatus of claim 3, wherein, during reproduction, said delaying means delays the video signal for a period equal to or longer than the period of the inserted digital signal.

6. A video signal recording and reproducing apparatus, wherein blank regions are inserted in a video signal, the video signal is modulated and a digital signal is time-division multiplexed with the modulated video signal in the blank regions so that the modulated video signal and the digital signal are recorded on a recording medium as a combined signal, said video signal recording and reproducing apparatus comprising:

a region signal generator, identifying, upon reproduction, a region of the digital signal in the combined signal and generating a signal representative of the region of the digital signal;

a delay circuit, delaying a field of the modulated video signal preceding the region of the digital signal by a time period related to a period of the region of the digital signal; and a selector, selecting the field of the modulated video signal preceding the region of the digital signal, when the signal representative of the region is generated by said region signal generator, and otherwise selecting a field of the modulated video signal following the region of the digital signal, thereby eliminating a negative effect of the region of the digital signal during demodulation of the combined signal.

7. The video signal recording and reproducing apparatus of claim 6, wherein said delaying means delays a signal in the region of a video signal in a predetermined signal by a period of time equal to one sync block period of the video signal.

8. The video signal recording and reproducing apparatus of claim 6, wherein said delaying means delays a signal in the region of a video signal in a reproduction signal by a period of time equal to or longer than a period of a digital signal region identified by said region signal generating means.

* * * * *